United States Patent [19]
Tamanoi et al.

[11] Patent Number: 6,096,444
[45] Date of Patent: *Aug. 1, 2000

[54] MAGNETO-OPTICAL RECORDING MEDIUM CAPABLE OF DOUBLE MASK READOUT

[75] Inventors: Ken Tamanoi; Koji Matsumoto; Keiji Shono, all of Kawasaki, Japan

[73] Assignee: Fujitsu Limited, Kawasaki, Japan

[*] Notice: This patent is subject to a terminal disclaimer.

[21] Appl. No.: 09/017,649

[22] Filed: Feb. 2, 1998

Related U.S. Application Data

[62] Division of application No. 08/654,063, May 28, 1996, Pat. No. 5,740,133.

[30] Foreign Application Priority Data

| Jun. 9, 1995 | [JP] | Japan | 7-143615 |
| Sep. 22, 1995 | [JP] | Japan | 7-244492 |
| Mar. 19, 1996 | [JP] | Japan | 8-063272 |

[51] Int. Cl.$^7$ ........................................ G11B 5/60

[52] U.S. Cl. .................... 428/694 ML; 428/694 MT; 428/694 RE; 428/694 MM; 428/900; 369/13; 369/14; 369/110; 360/59; 360/114; 365/122

[58] Field of Search ................... 428/694 ML, 694 MT, 428/694 RE, 694 MM, 900; 369/13, 14, 110; 360/59, 114; 365/122

[56] References Cited

U.S. PATENT DOCUMENTS

| 5,168,482 | 12/1992 | Aratani et al. | 369/13 |
| 5,241,520 | 8/1993 | Ohta et al. | 369/13 |
| 5,283,770 | 2/1994 | Nakao et al. | 369/13 |
| 5,309,427 | 5/1994 | Matsumoto | 369/275.2 |
| 5,367,509 | 11/1994 | Fukumoto et al. | 369/13 |
| 5,449,566 | 9/1995 | Fujii et al. | 428/654 EC |
| 5,502,692 | 3/1996 | Osato | 369/13 |
| 5,593,791 | 1/1997 | Fujii et al. | 428/694 ML |
| 5,740,133 | 4/1998 | Tamanoi | 369/13 |
| 5,764,600 | 6/1998 | Fujii et al. | 369/13 |

FOREIGN PATENT DOCUMENTS

| 1143041 | 6/1989 | Japan . |
| 3093058 | 4/1991 | Japan . |
| 393056 | 9/1992 | Japan . |
| 4255946 | 9/1992 | Japan . |
| 4271039 | 9/1992 | Japan . |
| 7240039 | 9/1992 | Japan . |
| 5012731 | 1/1993 | Japan . |
| 5073977 | 3/1993 | Japan . |
| 6139639 | 5/1994 | Japan . |
| 8102101 | 4/1996 | Japan . |

Primary Examiner—Leszek Kiliman
Attorney, Agent, or Firm—Greer, Burns & Crain, Ltd.

[57] ABSTRACT

A magneto-optical recording medium of a three-layered structure (consisting of a readout layer, an intermediate layer, and a recording layer), capable of double-mask magnetically-induced super-resolution readout, has magnetic properties such that the exchange coupled force between the readout layer (a GdFeCo film) and the intermediate layer (a GdFe film) decrease with increasing temperature, while the exchange coupled force between the intermediate layer and the recording layer (a TbFeCo film) increase with increasing temperature. The magnetic property of the readout layer is transition-metal magnetization dominant, and that of the intermediate layer is rare-earth magnetization dominant. When reading the medium, a region (an intermediate-temperature transfer region) where the magnetization in the readout layer is oriented in the direction of magnetization in the recording layer, and a region (a high-temperature rear mask) where the magnetization in the readout layer is oriented in a second specific direction, are simultaneously formed within a beam spot from a state (a low-temperature front mask) in which the magnetization in the readout layer is oriented in a first specific direction, thus achieving a double mask condition in a single step. Overwrite recording and magnetically-induced super-resolution readout are realized on the same magneto-optical recording medium.

9 Claims, 44 Drawing Sheets

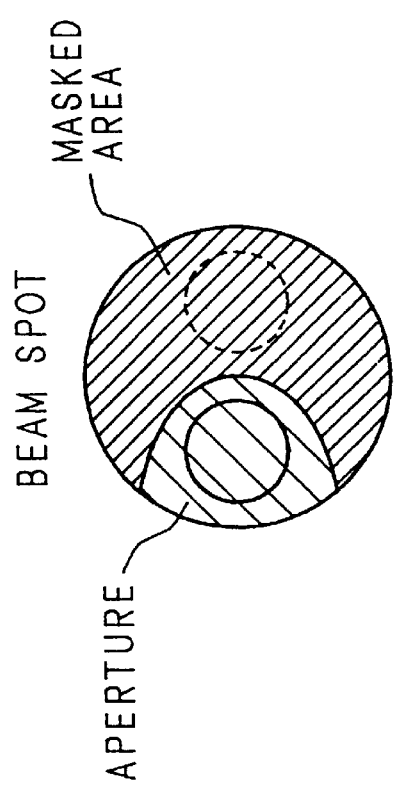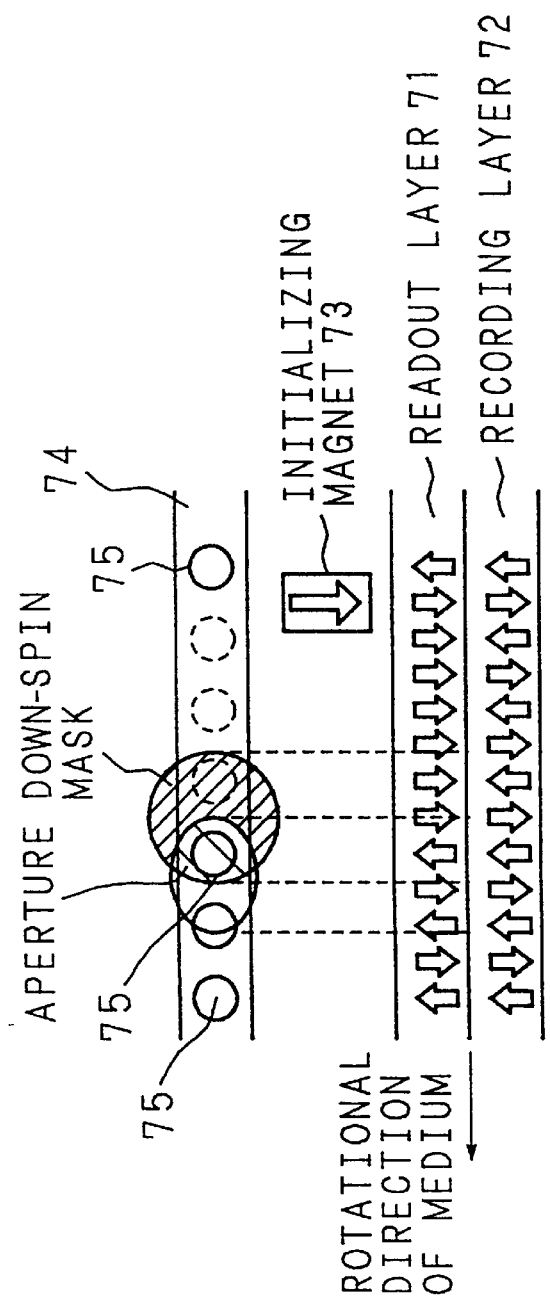
FIG. 2 PRIOR ART

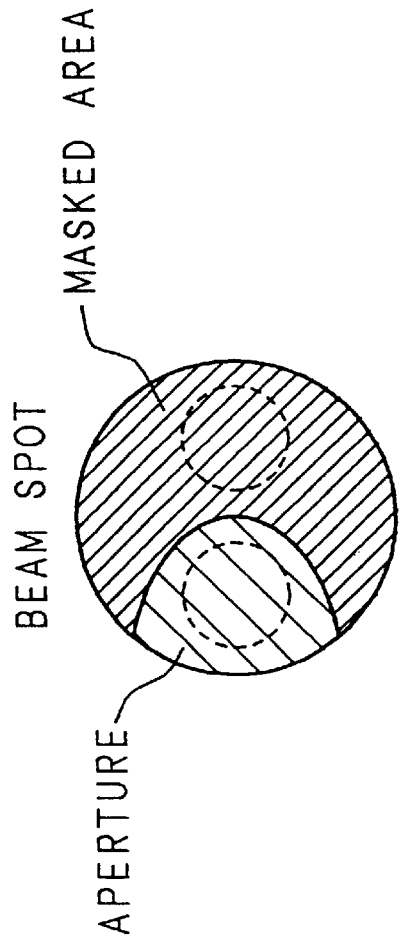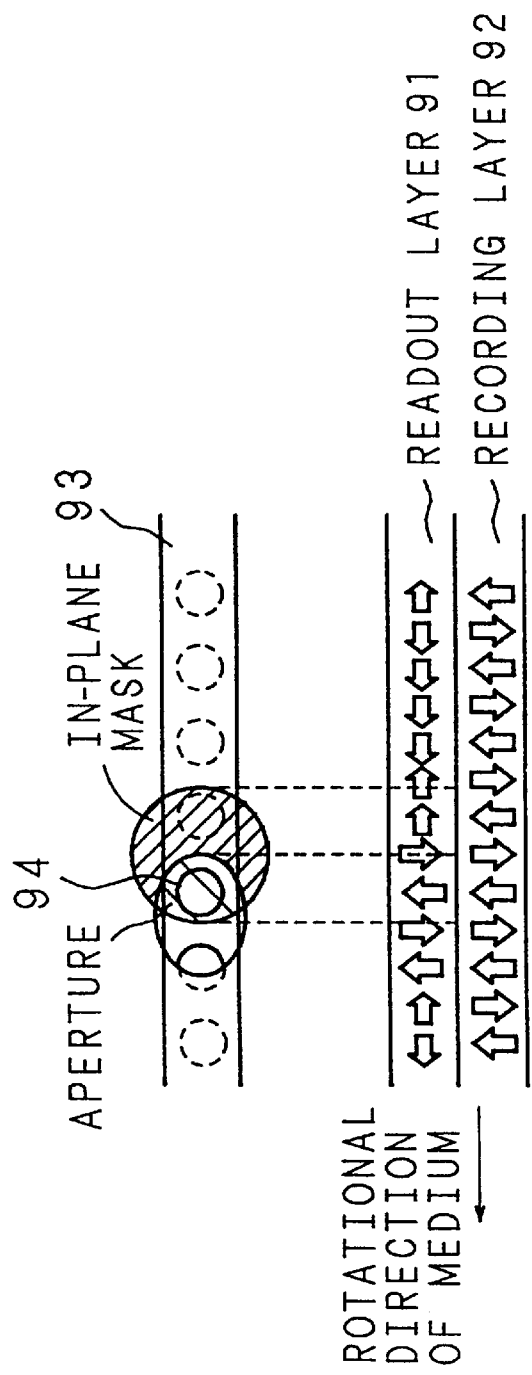
FIG. 4 PRIOR ART

FIG. 40
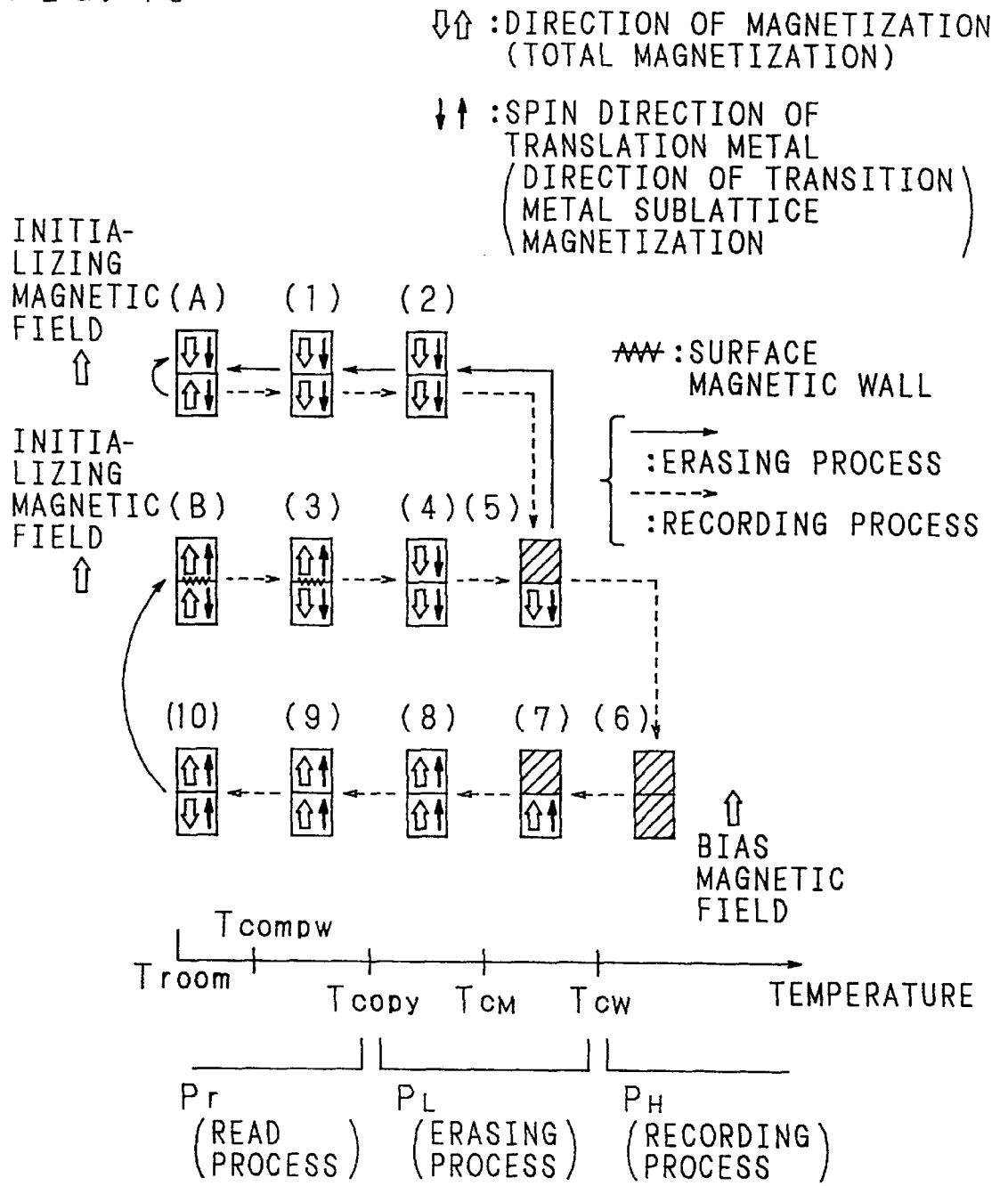
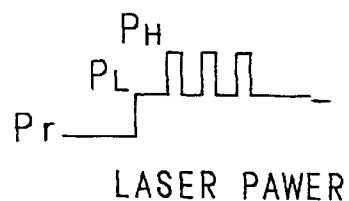
LASER PAWER

MAGNETO-OPTICAL RECORDING MEDIUM CAPABLE OF DOUBLE MASK READOUT

This is a divisional of application Ser. No. 08/654,063, filed May 28, 1996 now U.S. Pat. No. 5,740,133.

BACKGROUND OF THE INVENTION

1. Field of the Invention

The Present invention relates to a magneto-optical recording medium, such as a magneto-optical disk, magneto-optical tape, magneto-optical card, or the like, for use with a magneto-optical recording and reproduction apparatus, and more particularly to a magneto-optical recording medium capable of magnetically-induced super-resolution readout, and a method of reading information recorded on such a magneto-optical recording medium.

2. Description of Related Art

In recent years, magneto-optical disks have been attracting much attention as external storage media for computers. The magneto-optical disk uses an external magnetic field and a laser beam to form recorded bits of submicron size on the medium, and can achieve a drastic increase in storage capacity as compared with the more conventional external storage media such as floppy disks and hard-disks.

A currently commercialized 3.5-inch magneto-optical disk has tracks arranged at 1.4-$\mu$m pitch over a concentric area 24 to 40 mm wide across the disk radius, and contains recorded marks of minimum length of 0.65 $\mu$m recorded along the circular direction thereof, achieving an approximately 230-megabyte storage capacity per side. Since one 3.5-inch floppy disk can hold about 1.3 megabytes of data, it follows that the 3.5-inch magneto-optical disk has a storage capacity 200 times that of the 3.5-inch floppy disk.

When recording an information signal on a rewritable magneto-optical disk, a light beam is applied to heat a small area in a magneto-optical recording layer, and the magnetization in the heated area is reoriented (to form a recorded bit) by simultaneously applying an external magnetic field according to the information to be recorded. Readout of recorded information is done by using the Kerr effect, according to which, when a light beam is applied to the magneto-optical recording layer, the plane of polarization of the reflected light is rotated according to the direction of the magnetization.

Such magneto-optical disks have come to be placed among the most promising storage media for storing ever increasing amounts of data. Because of rapid advances in multimedia applications, the need for higher storage capacities has been increasing. To increase the storage capacity of a magneto-optical disk, that is, to increase the recording density thereof, it is imperative that the bit length be reduced and the spacing between bits be made smaller.

In conventional magneto-optical recording and readout, however, the recording and readout performance is limited by the size of the light beam focused on the medium (i.e., the size of the beam spot). To read bits recorded at shorter frequencies than the beam diameter, the beam should be focused into a smaller spot, but since the size of the beam spot is determined by the wavelength of the light source and the numeric aperture of the objective lens, there is a limit on how small the beam spot can be made.

To achieve higher-density recording, there has been proposed a magnetically-induced super-resolution (MSR) medium that permits readout of recorded bits of size smaller than the beam spot, along with a recording and reading method using the MSR medium (Japanese Patent Application Laid-Open Nos. 1-143041 (1989), 3-93058 (1991), 4-271039 (1992), 5-12731 (1993), etc.). This recording and reading method uses a recording medium consisting of a plurality of magnetic layers, formed one on top of another, whose magnetic properties vary with temperature, and by utilizing the temperature distribution in the recording medium formed within the beam spot, produces an effect equivalent to the effect that would be obtained when the beam was focused into a smaller spot. This ensures reliable readout of recorded information even if the recorded bits are smaller than the size determined by the beam spot. The MSR medium and the recording and reading method for the same will be described below.

First, a description will be given of the method disclosed in Japanese Patent Application Laid-Open No. 1-143041 (1989) (hereinafter referred to as the first prior art method) which a is generally known as the front aperture detection (FAD) method in which a recorded mark is read out from a low-temperature region with a high-temperature region within the beam spot acting as a mask region As shown in FIG. 1, the recording medium has a structure in which a readout layer 61, a switch layer 62, and a recording layer 63 are formed one on top of another in this order on a substrate. At room temperature, the magnetization direction of the readout layer 61 is the same as that of the recording layer 63 because of the exchange coupled force acting via the switch layer 62. However, when the temperature rises by applying a reading laser light, the exchange coupled force from the recording layer 63 is lost in an area where the Curie temperature of the switch layer 62 is exceeded (the high-temperature region); therefore, the magnetization direction of the readout layer 61 in that area is aligned with that of an externally applied read magnetic field (Hr). As a result, the high-temperature region acts as a mask to cover an underlying recorded bit 65 formed on a recording track 64, so that only a recorded bit 65 transferred from the recording layer 63 to the readout layer 61 in the low-temperature region is read out.

The method disclosed in Japanese Patent Application Laid-Open No. 3-93058 (1991) (hereinafter referred to as the second prior art method) is generally known as the rear aperture detection (RAD) method in which a recorded bit is read out from a high-temperature region with a low-temperature region within the beam spot acting as a mask region. As shown in FIG. 2, the recording medium has a structure in which a readout layer 71 and a recording layer 72 are formed one on top of the other in this order on a substrate. Immediately before applying a reading laser light, an initializing magnetic field is applied by an initializing magnet 73 so that the magnetization direction of the readout layer 71 alone is aligned with that of the initializing field as each recorded bit 75 formed on a recording track 74 passes through the initializing field. At this time, the recording layer 72 retains the state of each recorded bit 75. Immediately after the application of the initializing magnetic field, the readout layer 71 is acting as a mask covering data recorded in the recording layer 72. Then, when the reading laser light is applied, the temperature of the readout layer 71 acting as the mask rises. When the exchange coupled force with the recording layer 72 becomes greater than the coercive force of the readout layer 71, the direction of magnetization in the recording layer 72 is transferred. That is, the readout layer 71 is unmasked in this high-temperature region, from which a recorded bit 75 is read out.

The method disclosed in Japanese Patent Application Laid-Open No. 4-271039 (1992) (hereinafter referred to as the third prior art method) is generally known as the RAD double-mask method in which a recorded mark is read out from an intermediate-temperature region with high- and low-temperature regions within the beam spot both acting as mask regions. As shown in FIG. 3, the recording medium has a structure in which a readout layer 81, a control layer 82, an intermediate layer 83, and a recording layer 84 are formed one on top of another in this order on a substrate. As in the case of the second prior art method, immediately before the irradiation of the reading laser light, an initializing magnetic field is applied by an initializing magnet 85, to align the magnetization direction only of the reading layer 81 and control layer 82 with that of the initializing magnetic field. At this time, the recording layer 84 retains the state of each recorded bit 87. In a region (low-temperature region) just subjected to the initializing magnetic field, the readout layer 81 is acting as a mask covering recorded bits recorded in the recording layer 84. When the reading laser light is applied, the exchange coupled force from the recording layer 84 is lost in an area (high-temperature region) where the temperature rises above the Curie temperature of the control layer 82, so that the magnetization direction of the readout layer 81 in that area is aligned with that of an externally applied read magnetic field (Hr). As a result, the high-temperature region acts as a mask covering recorded bits 87 formed on a recording track 86. In this way, with the low- and high-temperature regions both acting as masks, the intermediate-temperature region sandwiched between them forms a transfer region (an aperture) from which a recorded bit is read out.

The method disclosed in Japanese Patent Application Laid-Open No. 5-12731 (1993) (hereinafter referred to as the fourth prior art method) is generally known as the central aperture detection (CAD) method. As shown in FIG. 4, the recording medium has a structure in which a readout layer 91 and a recording layer 92 are formed one on top of the other in this order on a substrate. The readout layer 91 is formed from a magnetic film whose easy axis of magnetization is oriented in an in-plane direction at room temperature but becomes oriented in a direction perpendicular thereto at high temperatures, so that the high-temperature region where the temperature has risen by applying the reading laser light is coupled with the recording layer 92 by the exchange coupled force. As a result, the low-temperature region of the readout layer 91, where the magnetization is oriented in the in-plane direction, acts as a mask to cover recorded bits formed on a recording track 93, while in the high-temperature region, a recorded bit is transferred to the readout layer 91 because of the exchange coupled force with the recording layer 92, and the recorded bit is thus read out from the transfer region.

In this way, each of the prior art methods is able to read out a recorded bit from a region smaller than the spot diameter of the reading laser light, thus in effect achieving a resolution equivalent to the resolution that would be obtained when the readout was done using a beam spot smaller than the spot diameter of the reading laser light.

However, the above-described prior art methods have the following shortcomings. The first prior art method can reduce the overall size of the apparatus since it does not require the provision of an initializing magnet, but is not effective in suppressing crosstalk in which data from adjacent recording tracks are mistakenly read out, since it reads data from a low-temperature region that forms a wide transfer region. On the other hand, the second prior art method is effective in suppressing crosstalk since it reads data from a high-temperature region, but is not effective in reducing the size of the apparatus since it requires the use of an initializing magnet. The third prior art method is effective in suppressing crosstalk and permits an increase in read output, but is not effective in reducing the size of the apparatus, since it requires the use of an initializing magnet, as in the case of the second prior art method: The fourth prior art method does not require the use of an initializing magnet, but cannot obtain a high read output since a transition region, where the magnetization of the readout layer makes a transition from the in-plane to the perpendicular direction, is wide.

SUMMARY OF THE INVENTION

It is an object of the present invention to provide a high-density magneto-optical recording medium (an MSR medium) of a three-layered structure that does not require the provision of an initializing magnet and that is capable of effectively suppressing crosstalk by forming a double mask for completely concealing recorded bits adjacent to the recorded bit to be read out, and a method of reading such a magneto-optical recording medium.

It is another object of the present invention to provide a high-density magneto-optical recording medium (an MSR medium) wherein a first magnetic layer as a readout layer, a second magnetic layer as an intermediate layer, and a third magnetic layer as a recording layer are formed with prescribed composition ratios and/or prescribed film thicknesses so that magnetically-induced super-resolution readout can be achieved with an external magnetic field lower than 1 kOe, thus improving playback characteristics.

It is a further object of the present invention to provide a method of reading a magneto-optical recording medium, wherein a double mask is formed in a single step within a beam spot of applied reading light, thereby achieving a wider reading-light power range over which a readout signal of high power is obtained.

It is a still further object of the present invention to provide a magneto-optical recording medium that permits overwriting by light intensity modulation and yet allows magnetically-induced super-resolution readout.

A magneto-optical recording medium of the present invention has a structure in which a first magnetic layer (readout layer), a second magnetic layer (intermediate layer), and a third magnetic layer (recording layer), magnetically coupled with each other, are deposited one on top of another in this order, their magnetic properties being such that the exchange coupled force between the first magnetic layer and the second magnetic layer decreases with increasing temperature and the exchange coupled force between the second magnetic layer and the third magnetic layer increases with increasing temperature. Preferably, the first magnetic layer, second magnetic layer, and third magnetic layer are each formed from a rare-earth/transition-metal alloy; further preferably, the magnetic property of the first magnetic layer is transition-metal magnetization dominant, the magnetic property of the second magnetic layer is rare-earth magnetization dominant, and the first magnetic layer, second magnetic layer, and third magnetic layer are substantially equal in thickness.

In the magneto-optical recording medium of the above structure, to read information recorded in the third magnetic layer, a reading light beam is applied to the magneto-optical recording medium, along with an external magnetic field, thereby forming a high-temperature region, an intermediate-temperature region, and a low-temperature region within a beam spot; in the low-temperature region, a magnetic mask is obtained by orienting the magnetization in the first magnetic layer in the direction opposite to the direction of the external magnetic field through magnetic reversal in the second magnetic layer exchange-coupled with the first magnetic layer, while in the high-temperature region, a magnetic mask is obtained by orienting the magnetization in the first magnetic layer alone in the direction of the external magnetic field.

The magneto-optical recording medium formed from rare-earth/transition-metal magnetic films, according to the present invention, has the first magnetic layer as the readout layer (preferably, transition-metal magnetization dominant), the second magnetic layer as the intermediate layer (preferably, rare-earth magnetization dominant), and the third magnetic layer as the recording layer, these magnetic layers being substantially equal in thickness. With this structure, the relationship between the magnitude of the exchange coupled force acting between the first and second magnetic layers (decreasing with increasing temperature) and the magnitude of the exchange coupled force acting between the second and third magnetic layers (increasing with increasing temperature) is reversed between a low-temperature condition and a high-temperature condition. That is, in a low-temperature condition, the exchange coupled force between the first and second magnetic layers is greater than the exchange coupled force between the second and third magnetic layers, this relationship being reversed for a high-temperature condition. Accordingly, when an external magnetic field of a certain magnitude is applied, in a low medium temperature region the magnetization in the first magnetic layer exchange-coupled with the second magnetic layer is reversed into the direction opposite to the direction of the external magnetic field through the magnetic reversal of the second magnetic layer responding to the applied external magnetic field; in a high medium temperature region, on the other hand, the magnetization in the first magnetic layer alone is aligned with the direction of the external magnetic field. This achieves the formation of magnetization states, i.e., the masks for concealing recorded bits, in the high- and low-temperature regions within the beam spot; in this situation, in the intermediate-temperature region between these two regions, a recorded bit is transferred from the third magnetic layer to the first magnetic layer, and the readout of the recorded bit is thus accomplished.

As described above, the magneto-optical recording medium uses the phenomenon in which the relationship between the magnitude of the exchange coupled force between the first and second layers and the magnitude of the exchange coupled force between the second and third magnetic layers is reversed depending on the temperature; in this way, a mask is formed in the low-temperature region with the magnetization in the first magnetic layer being oriented in the direction opposite to the direction of the external magnetic field through the magnetic reversal of the second magnetic layer, and also a mask is formed in the high-temperature region with the magnetization in the first magnetic layer being oriented in the direction of the external magnetic field. Since the mask regions are formed in both the low-temperature and high-temperature regions, the same condition as when the beam is focused into a smaller spot can be achieved, thus achieving a high reading resolution substantially free from crosstalk.

Another magneto-optical recording medium of the present invention has a structure in which a first magnetic layer (readout layer) formed from a GdFeCo film, a second magnetic layer (intermediate layer) formed from a GdFe film, and a third magnetic Layer (recording layer) formed from a TbFeCo film, are deposited one on top of another in this order, the magnetic property of the second magnetic layer being rare-earth magnetization dominant. Preferably, the Gd composition ratio in the first magnetic layer is within ±2 atomic % of the compensation ratio thereof, the Gd composition ratio in the second magnetic layer is within a range of 29 to 35 atomic a and the thickness of each of the first and second magnetic layers is within a range of 25 to 60 nm.

In the magneto-optical recording medium of the above-described three-layered structure, a reversal magnetic field for the first and second magnetic fields is lower than 1 kOe, and the magnetization in the first magnetic layer can be reversed with a magnetic field lower than 1 kOe; since this structure does not require the use of an initializing magnet, an increase in the size of the reproduction apparatus can be suppressed, and furthermore, a satisfactory CNR (C/N ratio) value can be obtained.

In a method of reading the magneto-optical recording medium according to the invention, when reading information recorded in the third magnetic layer (recording layer) by transferring the direction of magnetization in the third recording medium (recording layer) to the first magnetic layer (readout layer), a reading light beam is applied along with an external magnetic field, and a region where the magnetization in the first magnetic layer is oriented in the direction of magnetization in the third magnetic layer, and a region where the magnetization in the first magnetic layer is oriented in a second specific direction, are simultaneously formed within a beam spot from a state in which the magnetization in the first magnetic layer is oriented in a first specific direction. To form these two regions simultaneously, at least one parameter is adjusted which is selected from a group of parameters consisting of the saturation magnetization or film thickness of the first magnetic layer, the saturation magnetization, film thickness, or Curie temperature of the second magnetic layer, the combined film thickness of the first, second, and third magnetic layers, the applied read magnetic field, and the linear velocity of the magneto-optical recording medium. The first specific direction is opposite to the direction of the external magnetic field, and the second specific direction is the same as the direction of the external magnetic field.

According to the magneto-optical recording medium reading method of the invention, the region (intermediate-temperature transfer region) where the magnetization in the first magnetic layer is oriented in the direction of magnetization in the third magnetic layer, and the region (high-temperature rear mask) where the magnetization in the first magnetic layer is oriented in the second specific direction, are simultaneously formed within a beam spot from the state (low-temperature front mask) in which the magnetization in the first magnetic layer is; oriented in the first specific direction, thus achieving a double mask condition in a single step. The double mask condition can therefore be maintained over a wide power range of the reading light beam.

As described above, according to the present invention, when reading an MSR magneto-optical recording medium, a transfer region where the direction of magnetization in the recording layer is transferred to the readout layer and a high-temperature mask region are simultaneously formed within a bear spot directly from a state in which the entire beam spot area is a low-temperature mask region, thus achieving a double mask condition in a single step. This serves to widen the optimum read-power range. As a result, a read signal of high output can be obtained over a wide read-power range, and there is no need to impose stringent requirements on the design and use of magneto-optical recording medium drives used, that is, these requirements can be relaxed.

Furthermore, the present invention provides a magneto-optical recording medium that has a structure in which an overwritable medium that permits overwriting of information by modulating applied light intensity is combined with an KSR medium that is capable of magnetically-induced super-resolution readout by which information is read out by forming a double mask within a beam spot of reading light. Overwrite recording and magnetically-induced super-resolution readout are thus realized on one magneto-optical recording medium. In the combined structure, the information reading magnetic layer in the overwritable medium and the information recording magnetic layer in the MSR medium are combined into the same layer.

The magneto-optical recording medium capable of information overwriting and magnetically-induced super-resolution readout has a first magnetic layer (readout layer), a second magnetic layer (intermediate layer), a third magnetic layer (memory layer), and a fourth magnetic layer (recording layer), deposited one on top of another in this order, wherein the first and third magnetic layers each have an easy axis of magnetization in the direction of the deposition, and the second magnetic layer has an easy axis of magnetization in an in-plane-direction, and when the Curie temperatures of the first, second, third, and fourth magnetic layers are denoted by Tc1, Tc2, Tc3, and Tc4, respectively, and the coercivities of the first and third magnetic layers at room temperature are denoted by Hc1 and Hc3, respectively, the relation, Tc2 <Tc1, Tc2<Tc3, Tc3<Tc4, and the relation, Hc1<Hc3, are satisfied. To adjust the exchange coupled force acting between the third and fourth magnetic layers, a magnetic layer exhibiting in-plane magnetization at room temperature may be formed between the third and fourth magnetic layers. Furthermore, to orient the magnetization in the fourth magnetic layer in one direction prior to overwriting, a fifth magnetic layer and a sixth magnetic layer may be formed on top of the fourth layer so that the magnetization in the fourth magnetic layer is oriented by the exchange coupled force between the fifth and sixth magnetic layers.

In the magneto-optical recording medium having the plurality of magnetic layers, as described above, information overwriting can be done by modulating applied light beam intensity, and further, magnetically-induced super-resolution readout can be done with the magnetization aligned in one direction in the low-temperature and high-temperature regions within the beam spot when reading information. Since information can be overwritten to the MSR magneto-optical recording medium by modulating the applied light intensity, the application value of the MSR magneto-optical recording medium can be further enhanced.

The above and further objects and features of the invention will more fully be apparent from the following detailed description with accompanying drawings.

BRIEF DESCRIPTION OF THE DRAWINGS

FIG. 2 is a diagram showing a read principle according to the prior art (a second prior art method);

FIG. 4 is a diagram showing a read principle according to the prior art (a fourth prior art method);

FIG. 40 is a diagram showing how magnetization states change in the overwritable medium;

DESCRIPTION OF THE PREFERRED EMBODIMENTS

The present invention will now be described in detail below with reference to the drawings illustrating the preferred embodiments thereof.

Figure 1:
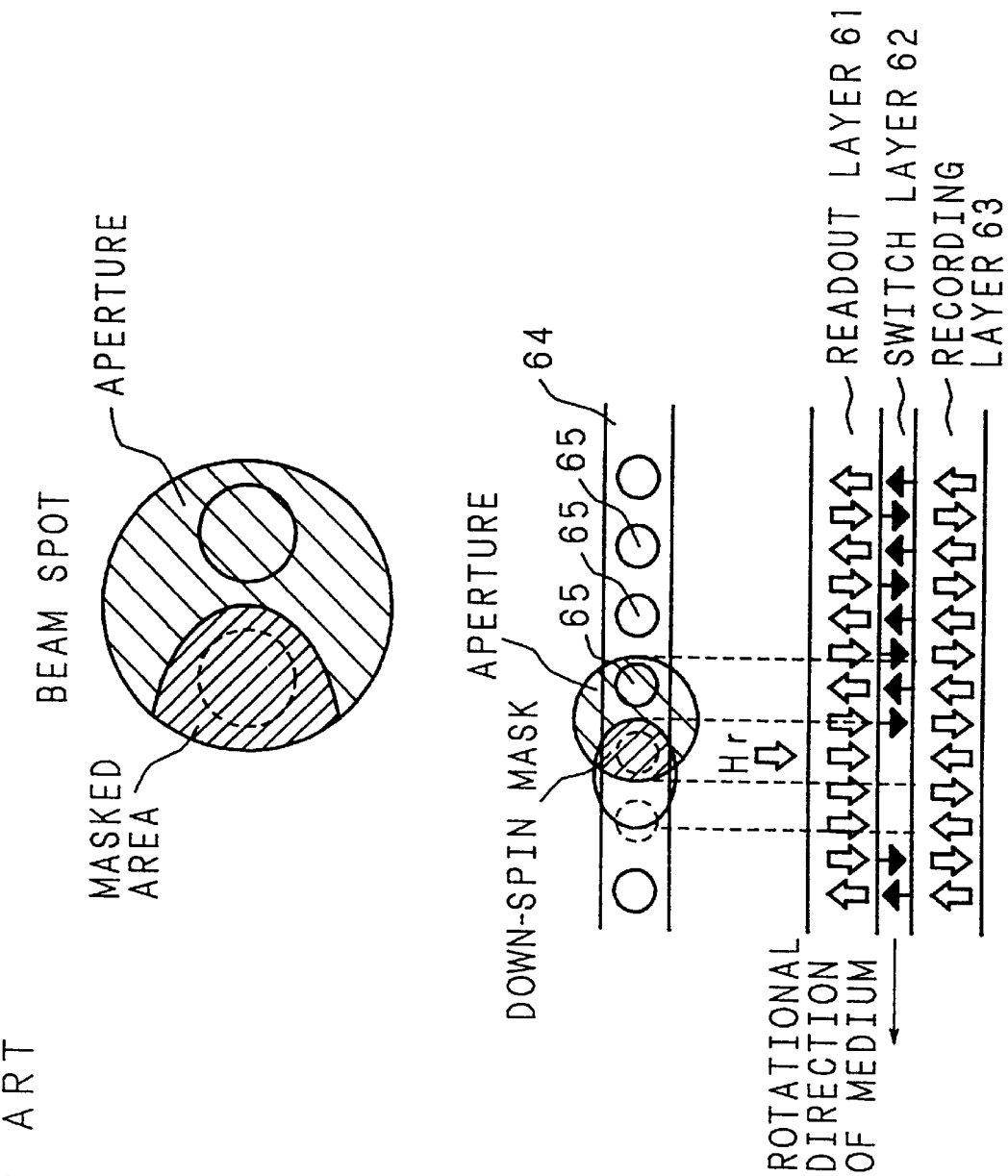
FIG. 1 is a diagram showing a read principle according to the prior art (a first prior art method)
Figure 3:
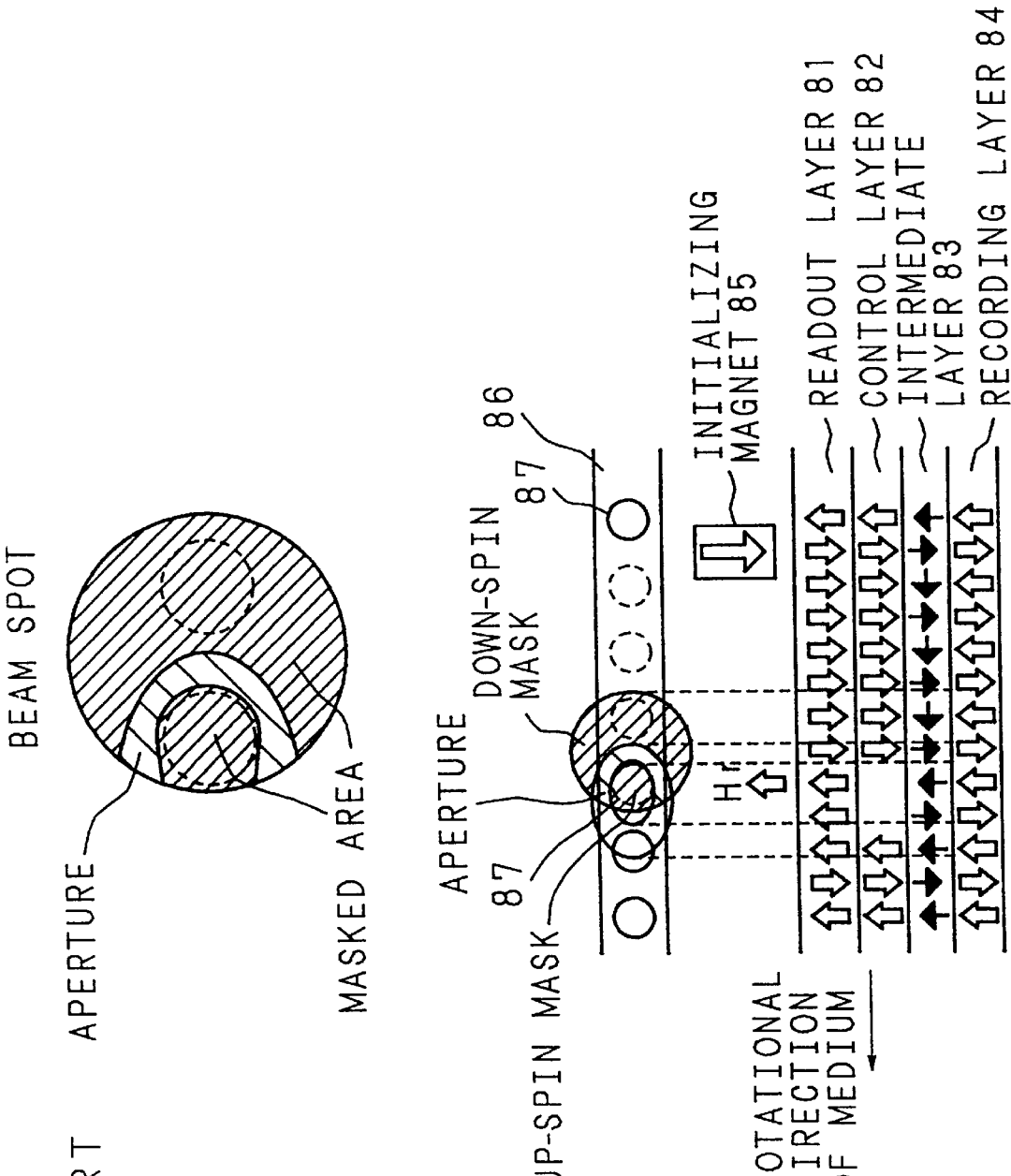
FIG. 3 is a diagram showing a read principle according to the prior art (a third prior art method)
Figure 5:
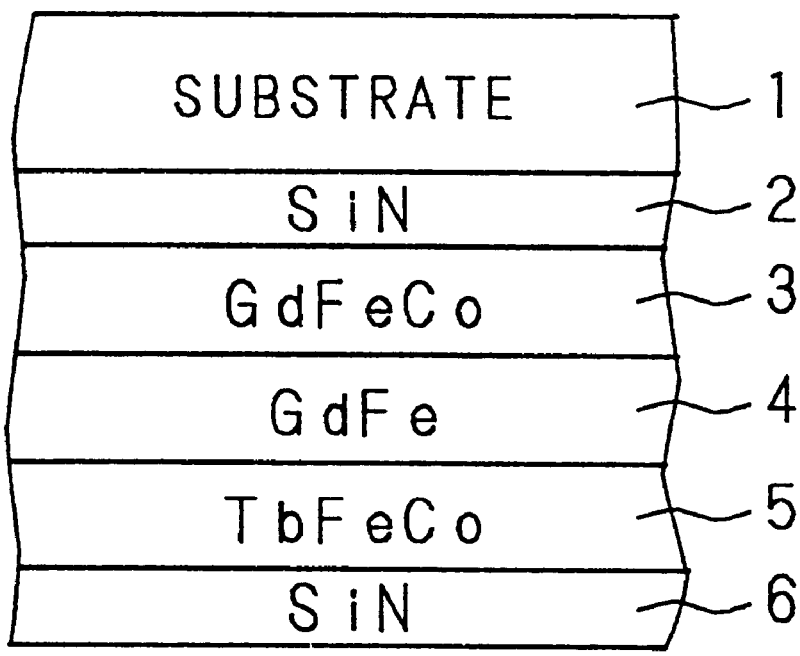
FIG. 5 is a diagram showing the structure of a magneto-optical recording medium according to the present invention.

FIG. 5 is a diagram showing the structure of a magneto-optical disk according to the present invention. In the figure, reference numeral 1 indicates a glass substrate, on which there are formed, one on top of another in the order listed below, a base layer 2 (thickness: 75 nm) formed from a SiN film, a first magnetic layer 3 (thickness: 40 nm) as a readout layer formed from a GdFeCo film (Curie temperature: 330° C., Dominant: Transition-metal magnetization dominant (hereinafter referred to as TM rich)), a second magnetic layer 4 (thickness: 35 nm) as an intermediate layer formed from a GdFe film (Curie temperature: 230° C., Dominant: Rare-earth magnetization dominant (hereinafter referred to as RE rich)), a third magnetic layer 5 (thickness: 40 nm) as a recording layer formed from a TbFeCo film (Curie temperature: 270° C., Dominant: TM rich), and a protective layer 6 (thickness: 65 nm) formed from a SiN film.

The first magnetic layer 3 and the third magnetic layer 5 both have compensation temperatures below room temperatures. On the other hand, the second magnetic layer 4 is formed from a film that does not show a compensation temperature until its Curie temperature is reached. At room temperature, its easy axis of magnetization is aligned in an in-plane direction, but when a certain temperature is exceeded, the magnetization direction changes from the in-plane to the perpendicular direction according to the magnitude of the layer's exchange coupled force with the first magnetic layer 3 and third magnetic layer 5, respectively. The base layer 2 and the protective layer 6 serve to protect the magnetic layers from oxidation. The base layer 2 also serves to give an enhance effect to enhance magneto-optical signals.

Figure 6:
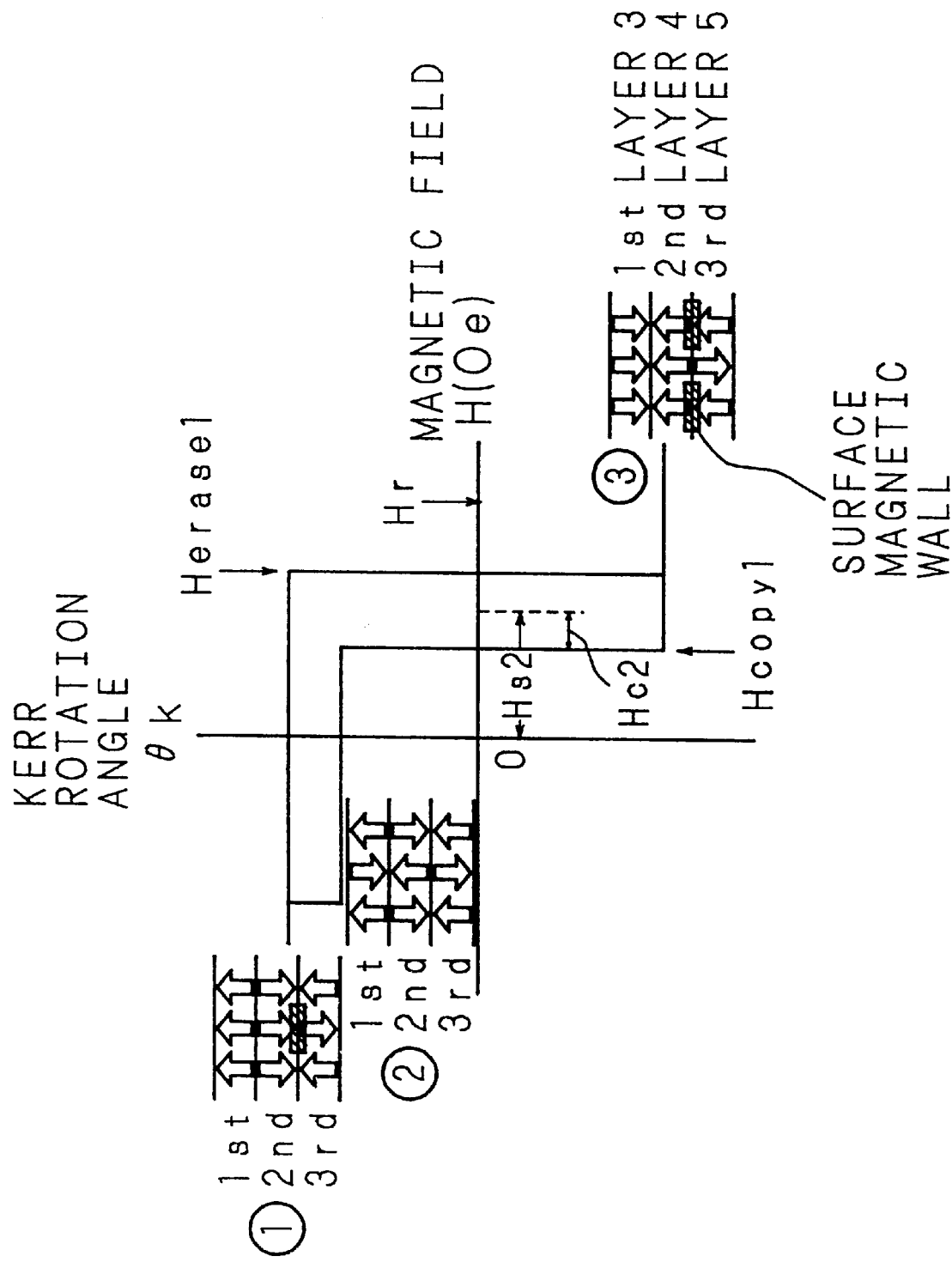
FIG. 6 is a diagram showing a hysteresis loop for Kerr rotation angle in a low-temperature condition and magnetization states in that condition.

FIG. 6 is a diagram showing a hysteresis loop for the Kerr rotation angle θk measured in an external magnetic field H smaller than the coercivity of the third magnetic layer 5 in a low-temperature condition (near room temperature) when a bit was recorded on the above-structured magneto-optical disk (in the third magnetic layer 5), and magnetization states in that hysteresis loop. In the third magnetic layer 5, the downward magnetized region corresponds to the recorded bit. In FIG. 6, Herase1 represents the field magnitude when the magnetization of non-bit regions in the first magnetic layer 3 and second magnetic layer 4 is reversed by an external magnetic field Hcopy1 represents the field magnitude where the reversed magnetization in the first magnetic layer 3 and second magnetic layer 4 moves back when the external magnetic field is removed. Here, if the external magnetic field is set at a larger value than Herase1 (for example, at Hr), the magnetization in the second magnetic layer 4 can be aligned in the same direction as the direction of the external magnetic field; furthermore, the magnetization in the first magnetic layer 3, exchange-coupled with the second magnetic layer 4, can be aligned in the direction opposite to the magnetization direction of the second magnetic layer 4 (that is, in the direction opposite to the direction of the external magnetic field) (see ③ in the figure).

The shift amount, Hs2, in the hysteresis loop, corresponds to the magnitude of the exchange coupled force between the second magnetic layer 4 and the third magnetic layer 5. Hc2 corresponds to the coercive force of the hysteresis loop. Hence, Herase1=Hs2+Hc2 and also Hcopy1=Hs2−Hc2.

Figure 7:
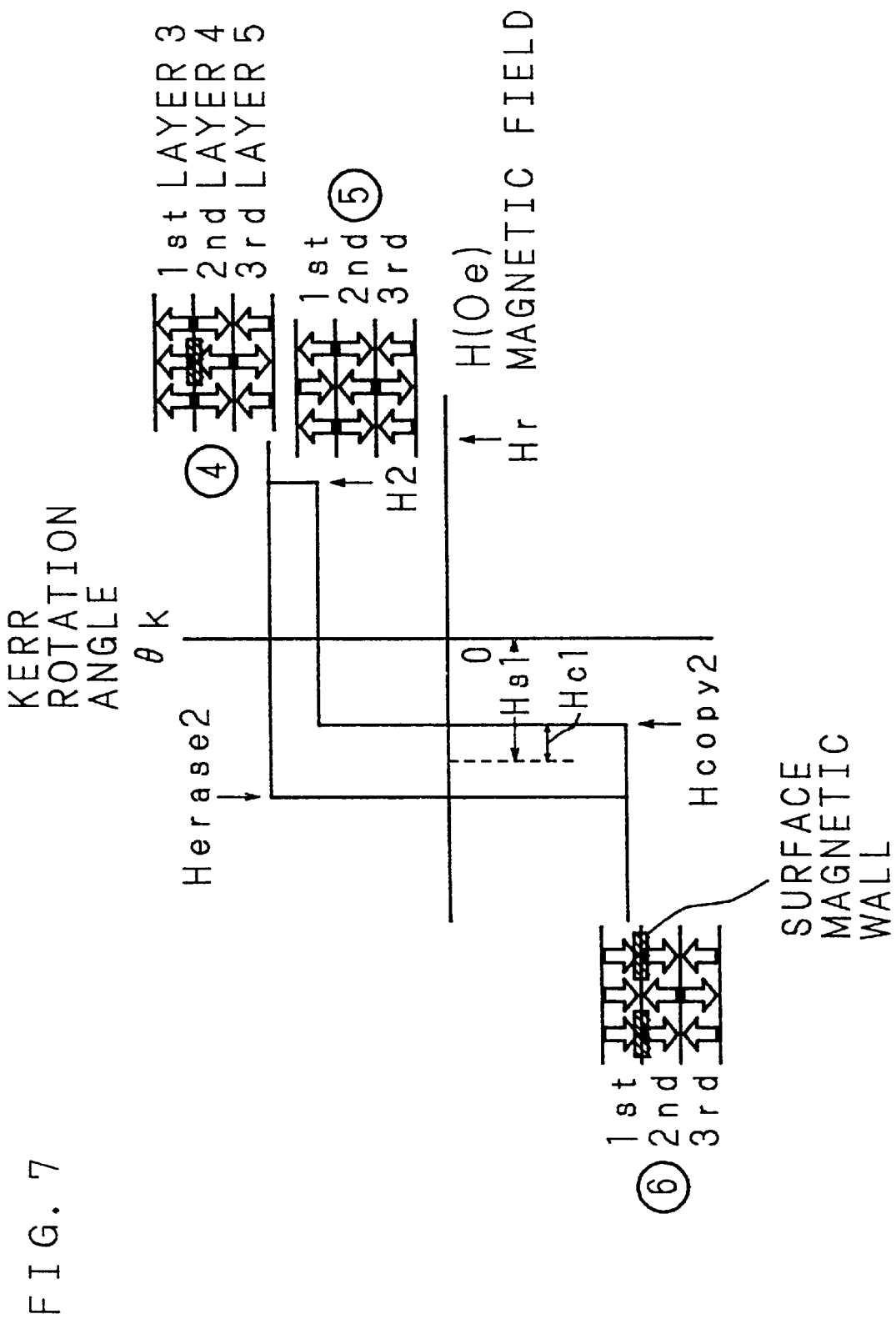
FIG. 7 is a diagram showing a hysteresis loop for Kerr rotation angle in a high-temperature condition and magnetization states in that condition.

FIG. 7 is a diagram showing a hysteresis loop for the Kerr rotation angle θk in a high-temperature condition and magnetization states in that hysteresis loop. In FIG. 7, Herase2 represents the field magnitude when the magnetization of non-bit regions in the first magnetic layer 3 is reversed by an eternal magnetic field Hcopy2 represents the field magnitude where the reversed magnetization in the first magnetic layer 3 moves back when the external magnetic field is removed. The shift amount, Hs1, in the hysteresis loop, corresponds to the magnitude of the exchange coupled force between the first magnetic layer 3 and the second magnetic layer 4. Hc1 corresponds to the coercive force of the hysteresis loop. In FIG. 7, H2 represents the field magnitude when the magnetization of the bit region in the first magnetic layer 3 is reversed by the external magnetic field and aligned with the magnetization direction of the non-bit regions. Here, H2=|−Hs1−Hc1|.

Figure 8:
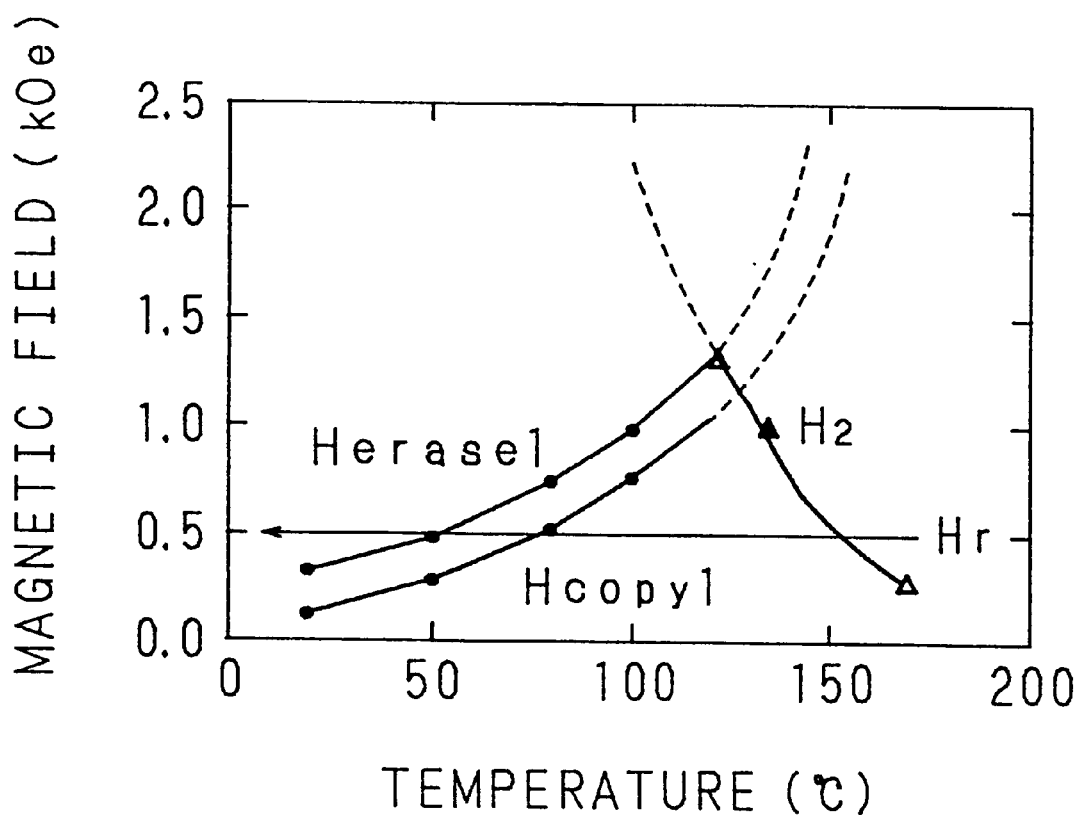
FIG. 8 is a diagram showing the temperature dependence of the magnetic field Herase1 and Hcopy1 shown in FIG. 6 and the magnetic field H2 shown in FIG. 7.

FIG. 8 is a graph showing the temperature dependence of the above-described Herase1, Hcopy1, and H2. Herase1−Hc2 and Hcopy1+Hc2 each correspond to the shift amount Hs2 in the hysteresis loop of FIG. 6, that is, the magnitude of the exchange coupled force between the second magnetic layer 4 and the third magnetic layer 5, while H2−Hc1 corresponds to the shift amount Hs1 in the hysteresis loop of FIG. 7, that is, the magnitude of the exchange coupled force between the first magnetic layer 3 and the second magnetic layer 4. The exchange coupled force between the second magnetic layer 4 and the third magnetic layer 5 increases with increasing disk temperature, while the exchange coupled force between the first magnetic layer 3 and the second magnetic layer 4 decreases with increasing the disk temperature. When disk temperature rises and Hcopy1 becomes greater than a constant bias magnetic field Hr being applied, that is, when Hs2−Hc2>Hr, the recorded bit in the third magnetic layer 5 can be transferred to the first magnetic layer 3. In a temperature region where H2<Hr, the magnetization of the bit regions in the first magnetic layer 3 can be aligned with the direction of the bias magnetic field Hr (see ④ in FIG. 7). In this way, despite the Curie temperature of the second magnetic layer 4 being as high as 230° C., the magnetization in the first magnetic layer 3 can be oriented in the direction of the bias magnetic field Hr at temperatures not exceeding that Curie temperature.

Figure 9:
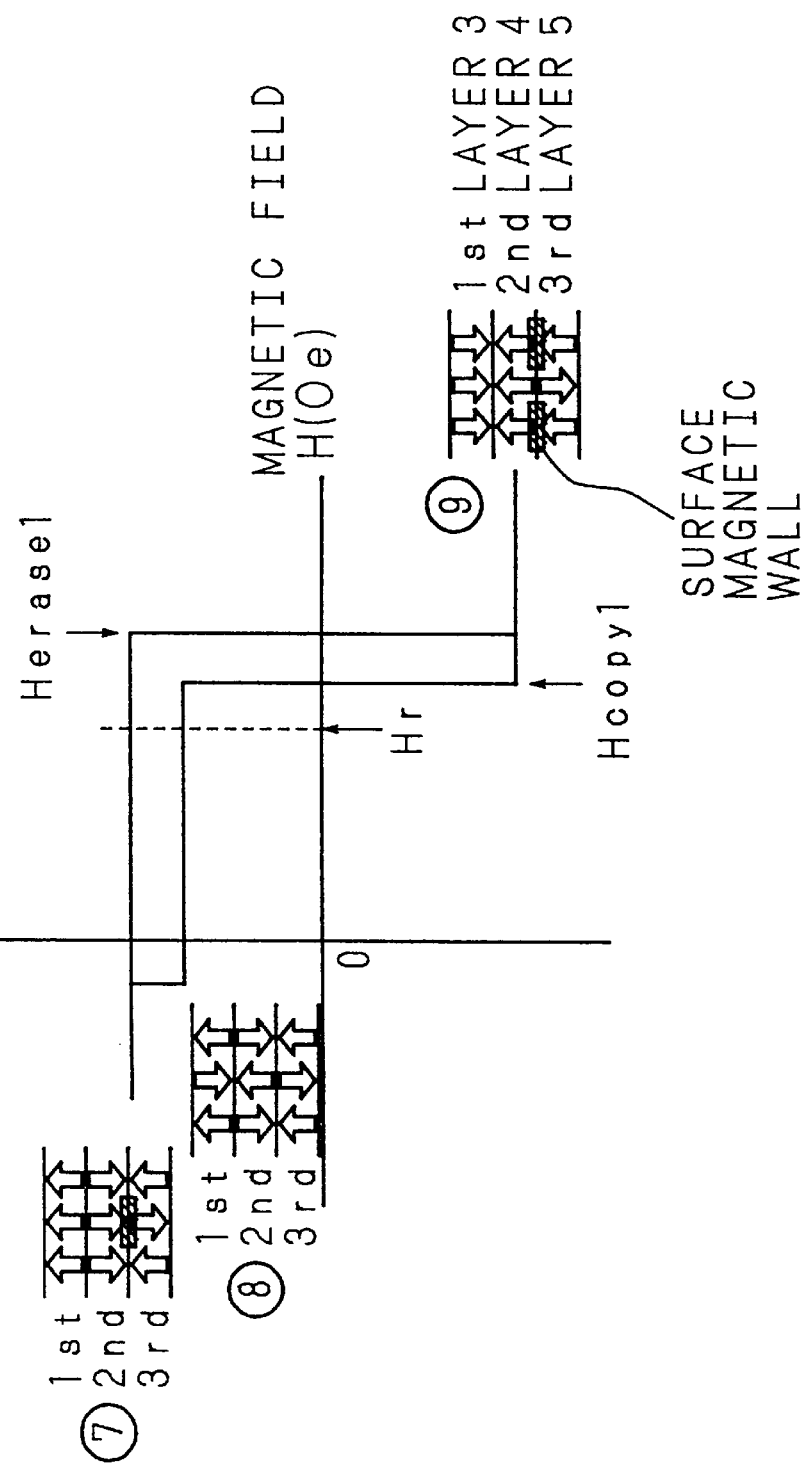
FIG. 9 is a diagram showing a hysteresis loop for Kerr rotation angle in an intermediate-temperature condition and magnetization states in that condition.

FIG. 9 is a diagram showing a hysteresis loop for the Kerr rotation angle θk in an intermediate-temperature condition intermediate between the low- and high-temperature conditions, and magnetization states in that hysteresis loop. FIG. 9 shows a condition in which the graph of FIG. 6 is substantially shifted to the right as the temperature rises. Since Hcopy1>Hr, the bits in the third magnetic layer 5 are transferred to the first magnetic layer 3 regardless of the external magnetic field Hr (see ⑧ in the figure).

Figure 10:
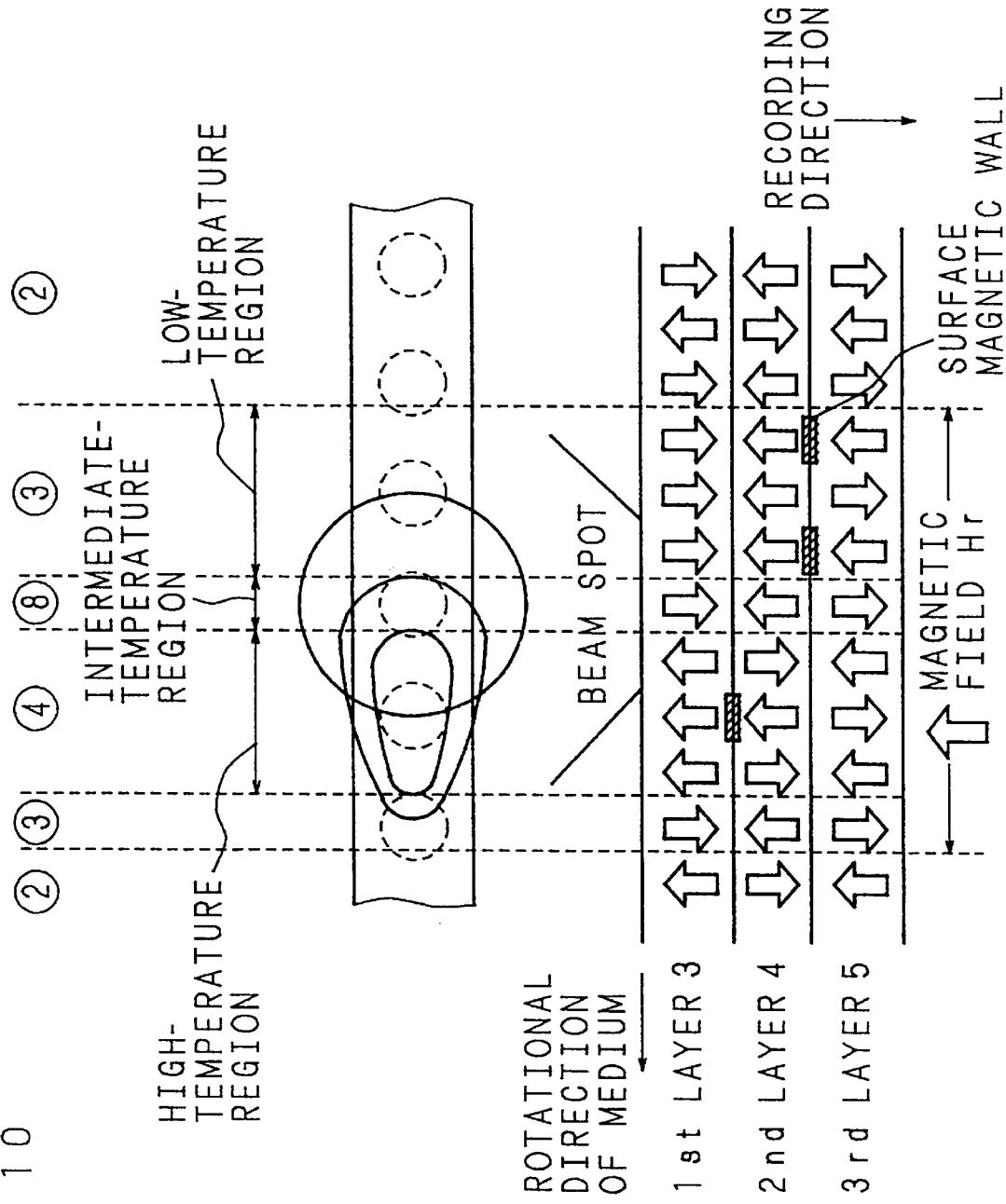
FIG. 10 is a diagram showing magnetization states during playback of the magneto-optical recording medium of the present invention.

FIG. 10 is a schematic diagram showing the magnetization states in the above magneto-optical disk during playback. Within a beam spot, a low-temperature region, an intermediate temperature region, and a high-temperature region are formed in this order as viewed in the direction of disk rotation In the low-temperature region, the magnetization in the first magnetic layer 3, exchange-coupled with the second magnetic layer 4 magnetized in the direction of the bias magnetic field Hr, is oriented in the direction opposite to the direction of the bias magnetic field Hr (the state of ③ in FIG. 6); therefore, this region acts as a mask region, preventing the recorded bits in the third magnetic layer 5 from being transferred to the first magnetic layer 3. In the low-temperature region, the condition Hs2+Hc2<Hr is satisfied (see FIG. 6).

On the other hand, in the high-temperature region, the first magnetic layer 3, whose exchange coupled force with the second magnetic layer 4 has weakened, becomes magnetized in the same direction as the bias magnetic field Hr (the state of ④ in FIG. 7); therefore, this region acts as a mask region, preventing the recorded bits in the third magnetic layer 5 from being transferred to the first magnetic layer 3. In the high-temperature region, the condition |−Hs1−Hc1|<Hr is satisfied (see FIG. 7).

In the intermediate-temperature region, the recorded bit in the third magnetic layer 5 is transferred to the first magnetic layer 3 (the state of ⑨ in FIG. 9). Necessary conditions for a recorded bit in the third magnetic layer 5 to be transferred to the first magnetic layer 3 are Hs2−Hc2>Hr and |−Hs1−Hc1|>Hr, but before that, the condition Hs2+Hc2<Hr must be satisfied in the low-temperature region Encircled numbers in FIG. 10 correspond to the same numbers shown in FIGS. 6, 7, and 9.

In this way, since the low- and high-temperature regions formed within the beam spot act as mask regions where the recorded bits in the third magnetic layer 5 are prevented from being transferred to the first magnetic layer 3, this in effect produces the same effect as when the beam is focused into a smaller spot, and thus achieves a high reading resolution.

Figure 11:
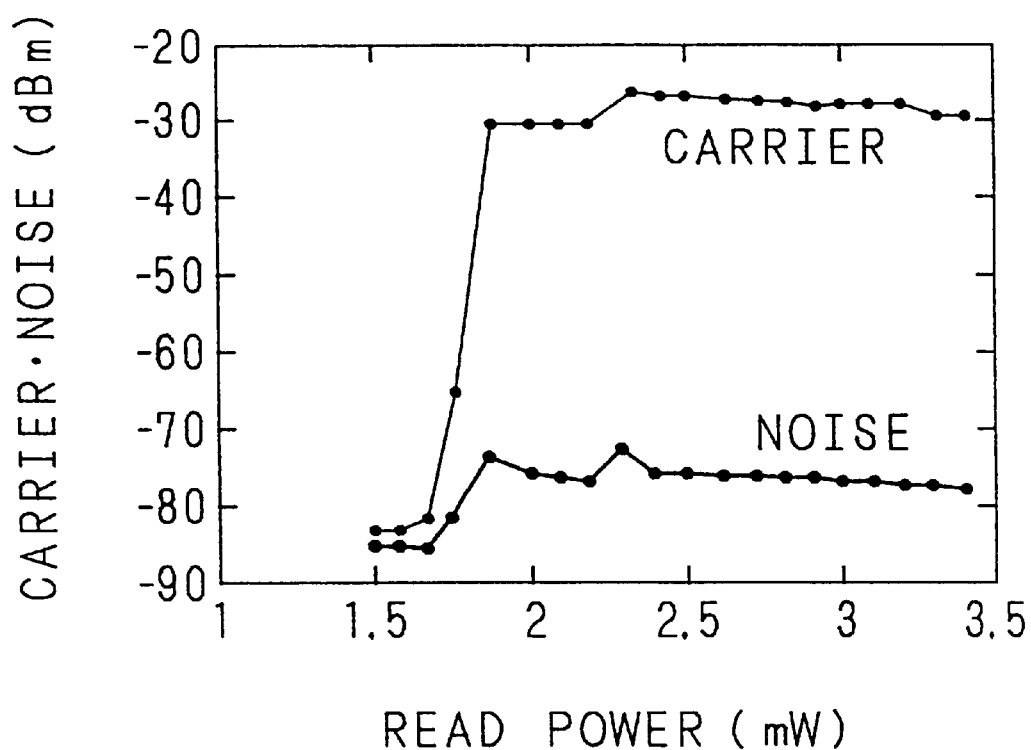
FIG. 11 is a graph showing the dependence of carrier/noise on read power during playback.

Bits were recorded on the above-constructed magneto-optical disk at a linear velocity of 9 m/sec., a duty ratio of 25%, a recording power of 8.3 mW, and a recording frequency of 11.3 MHz, and the recorded bits were read out. When reading the bits, a bias magnetic field Hr of 300 Oe was applied in the direction opposite to the direction in which the recorded bits were oriented. FIG. 11 is a graph showing the dependence of carrier and noise on the read power during playback. In FIG. 11, it is shown that the carrier increases in two steps as the read power increases. The first step in carrier increase occurs because of the formation of the magnetization state of the low-temperature region in the first magnetic layer 3, and the second step is due to the formation of the magnetization state of the high-temperature region. From the result shown in FIG. 11, it can be seen that a sufficiently high reading resolution was achieved.

Figure 12:
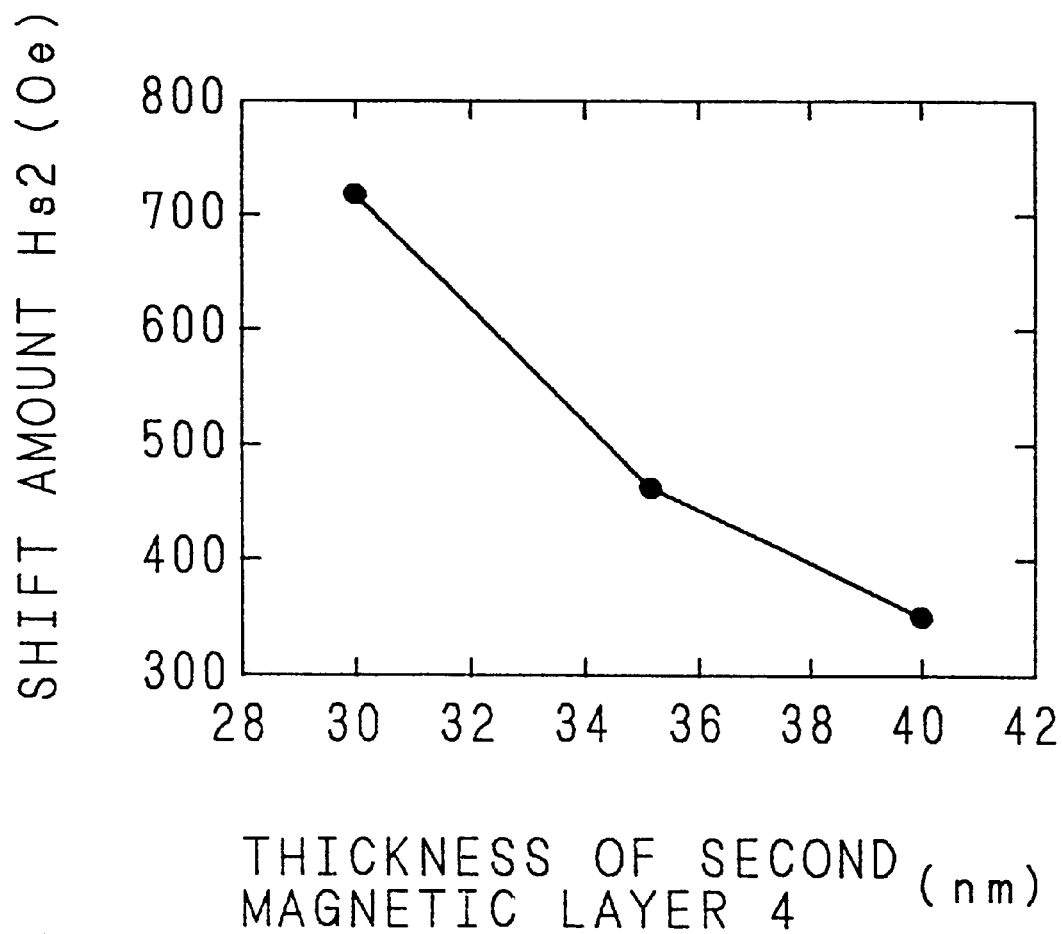
FIG. 12 is a graph showing the dependence of a shift amount Hs2 in the hysteresis loop for Kerr rotation angle in the low-temperature condition, on the thickness of a second magnetic layer.

The shift amount Hs2 in the hysteresis loop in the low-temperature condition was measured by varying the thickness of the second magnetic layer 4 while holding the thickness of each of the first magnetic layer 3 and third magnetic layer 5 constant (40 nm). FIG. 12 is a graph showing the results of the measurements. As shown, when the second magnetic layer 4 is extremely thin, the shift amount Hs2 becomes so large that the condition (Hs2+Hc2<Hr) in the low-temperature region cannot be satisfied. Conversely, when the second magnetic layer 4 is extremely thick, the shift amount Hs2 becomes so small that the condition for transfer (Hs2−Hc2>Hr) cannot be satisfied. Accordingly, the thickness of the second magnetic layer 4 must be made approximately the same as the thickness (40 nm) of the first magnetic layer 3 and third magnetic layer 5.

Next, we will describe an example of a magneto-optical disk according to the present invention, that has three magnetic layers and on which a double mask is formed.

In the structure shown in FIG. 5, a substrate 1 is made of a polycarbonate resin, with a track pitch of 1.1 μm. On the substrate 1, there are formed, one on top of another in the order listed below, a base layer 2 formed from a SiN film (thickness: 70 nm), a first magnetic layer 3 as a readout layer formed from a $Gd_2Fe_{66}Co_{10}$ film (thickness: 40 nm, Curie temperature: 360° C., Dominant: TM rich), a second magnetic layer 4 as an intermediate layer formed from a $Gd_{32}Fe_{68}$ film (thickness: 40 nm, Curie temperature: 200° C., Dominant: RE rich), a third magnetic layer 5 as a recording layer formed from a $Tb_4Fe_{56}Co_{20}$ film (thickness: 30 nm, Curie temperature: 260° C., Dominant: TM rich), and a protective layer 6 formed from a SiN film (thickness: 100 nm).

A fabrication method and film deposition conditions for the above-structured magneto-optical disk will be described below. First, the substrate 1 is set in a sputter chamber and targets of Si, GdFeCo, GdFe, and TbFeCo are loaded into the chamber. After decompressing the chamber to $1 \times 10^{-5}$ Pa, the base layer 2 (SiN film) is formed under the following conditions.

Gas pressure: 0.3 Pa, Sputtering gas: Argon and nitrogen (pressure ratio 6:4), Operating power: 0.8 kW Thereafter, the-chamber is again decompressed to $1 \times 10^{-5}$ Pa, and the first magnetic layer 2, the second magnetic layer 4, and the third magnetic layer 5 are successively deposited on the base layer 2, under the following conditions.

Gas pressure: 1 Pa, Sputtering gas: Argon, Operating power: 1 kW

Then, the protective layer 6 (SiN film) is deposited on the third magnetic layer 5, under the same conditions as for the deposition of the base layer 2.

The recording and playback characteristics of the thus fabricated magneto-optical disk were measured, to obtain the following results. A laser beam with 680-nm wavelength was used. First, a laser beam of 9 mW erasing power was applied, along with an upward-directed erasing magnetic field of 500 Oe, to erase the entire surface of the magneto-optical disk. Next, while rotating the magneto-optical disk at a linear velocity of 6 m/sec., a laser beam of 10 mW recording power was applied, along with a downward-directed recording magnetic field of 500 Oe, to perform recording at a frequency of 7.5 MHz and a duty ratio of 26%. The recorded bit length was approximately 0.4 μm in the direction of disk rotation.

The magneto-optical disk was played back while applying an upward-directed read magnetic field of 500 Oe. When a laser beam was applied with a read power of 1.5 mW, an output of a magneto-optical signal corresponding to the recorded bits could not be obtained. This was presumably because of a mask formed in the first magnetic layer 3 within the beam spot, or in other words, because the exchange coupled force between the second magnetic layer 4 and the third magnetic layer 5 was weak. When the laser beam was applied with a read power of 1.6 mW, an output of a magneto-optical signal was obtained, with the direction of magnetization in the third magnetic layer 5 being transferred to the first magnetic layer 3 via the second magnetic layer 4. This was presumably because the spot irradiated with the laser beam was heated to a temperature high enough to allow the direction of magnetization in the third magnetic layer 5 to be transferred to the second magnetic layer 4, forming a mask and an aperture.

When the laser beam was applied with a read power of 2.4 mW, a double mask was formed masking both sides of the aperture (see FIG. 6). In the low-temperature region, the magnetization in the second magnetic layer 4 is oriented in the direction of the read magnetic field Hr. And, because of the exchange coupled force between the first magnetic layer 3 and the second magnetic layer 4, the magnetization in the first magnetic layer 3 is oriented in the direction opposite to the direction of the second magnetic layer 4, thus forming a mask. In the intermediate-temperature region, the exchange coupled force between the third magnetic layer 5 and the first magnetic layer 3 via the second magnetic layer 4 increases, and the shift amount (reversal magnetic field) Hs in a minor loop for the first magnetic layer 3 becomes greater than 500 Oe. As a result, the direction of magnetization in the third magnetic layer 5 is transferred to the first magnetic layer 3, thus forming an aperture. In the high-temperature region, the exchange coupling between the first magnetic layer 3 and the second magnetic layer 4 weakens, and the reversal magnetic field Hs for the first magnetic layer 3 decreases below 500 Oe. As a result, the magnetization is oriented in the direction of the read magnetic field Hr, thus forming a mask.

In this way, in the high-temperature region at the leading edge of the laser beam, a mask is formed with the magnetization in the first magnetic layer 3 oriented in the direction of the read magnetic field, while in the low-temperature region at the trailing edge of the laser beam, a mask is formed with the magnetization oriented in the direction opposite to the direction of the read magnetic field. In the intermediate-temperature region between them, the direction of magnetization in the third magnetic layer 5 is transferred to the first magnetic layer 3, and the recorded bit is thus read out.

When the laser beam was applied with a read power of 3.4 mW or greater, the recorded bits in the third magnetic layer 5 began to deform and noise was introduced into the a playback signal. It was therefore shown that in the case of the above magneto-optical disk a double mask is formed with a read power somewhere between 2.4 and 3.4 mW, achieving magnetically-induced super-resolution readout. It should also be added that with a read power of 3 mW the CNR of the playback signal was 48 dB, achieving a satisfactory CNR level.

For the magneto-optical disk having the above-described magnetic layers, we studied the construction that can reduce the read magnetic field required to read from the first magnetic layer 3 and yet produce a high-resolution playback signal. We measured the reversal magnetic field for the first magnetic field and the CNR of the playback signal by varying the Gd composition ratio and thickness of the first magnetic layer 3, the Gd composition ratio and thickness of the second magnetic layer 4, and the thickness of the third magnetic layer 5. The results are shown below.

EXAMPLE 1

Figure 13:
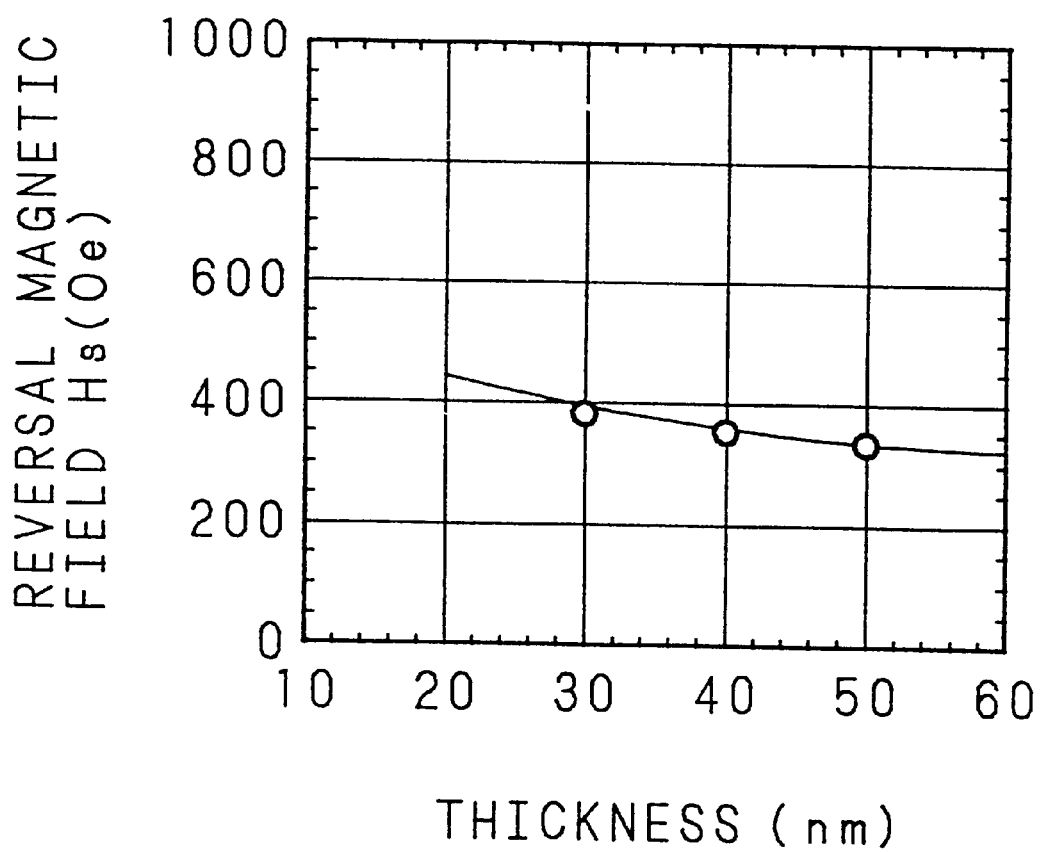
FIG. 13 is a graph plotting reversal magnetic field against the thickness of a first magnetic layer.
Figure 14:
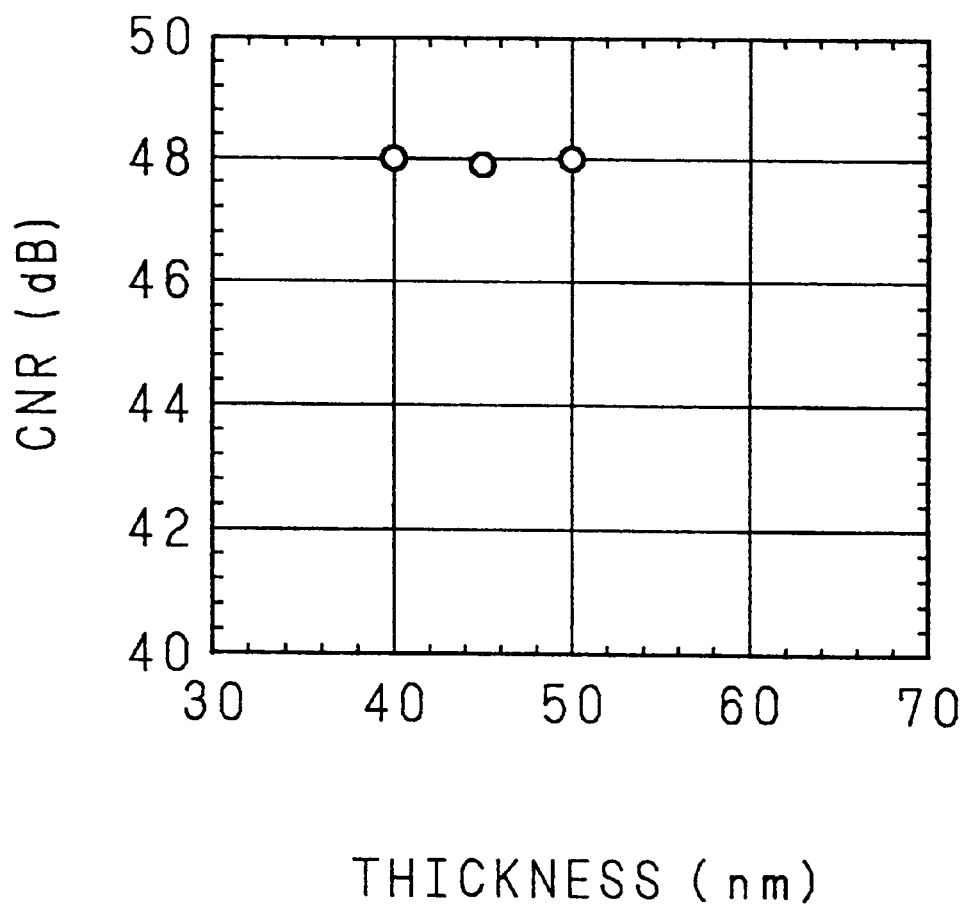
FIG. 14 is a graph plotting CNR against the thickness of the first magnetic layer.

Magneto-optical disks having the film compositions shown in Table 1 were fabricated. The fabrication was performed under the same conditions as already described. Magneto-optical disks were fabricated by varying the thickness of the first magnetic layer 3, and the reversal magnetic field Hs for the first magnetic layer 3 and the CNR of the playback signal were measured on each disk. The results are shown in FIGS. 13 and 14. In FIG. 13, the ordinate represents the reversal magnetic field Hs for the first magnetic layer 3, and the abscissa the thickness of the first magnetic layer 3. In FIG. 14, the ordinate represents the CNR of the playback signal, and the abscissa the thickness of the first magnetic layer 3.

TABLE 1

| Composition | Film Thickness (nm) | Curie Temperature (°C.) | Compensation Temperature (°C.) | Dominant |
|---|---|---|---|---|
| First Magnetic Layer $Gd_{24.5}Fe_{66}Co_{9.5}$ | | 310 | — | TM |
| Second Magnetic Layer $Gd_{32}Fe_{68}$ | 40 | 200 | — | RE |
| Third Magnetic Layer $Tb_{24}Fe_{56}Co_{20}$ | 30 | 260 | — | TM |

As shown in FIG. 13, no significant change occurs in the reversal magnetic field Hs when the thickness of the first magnetic layer 3 is changed, but a slight decrease in the reversal magnetic field occurs as the thickness is increased. It is shown that the reversal magnetic field Hs has a small value ranging from 400 to 350 Oe when the thickness of the first magnetic layer 3 is within a range of 25 to 60 nm. Further, as shown in FIG. 14, a sufficient CNR of 48 dB or higher is obtained when the film thickness on the magneto-optical disk is set within a range of 30 to 50 nm. Since the laser beam penetrates to a depth of 20 to 30 nm below the magnetic layer surface, the first magnetic layer 3 needs to have a thickness of about 25 nm at minimum, and about 60 nm at maximum so that the irradiation power of the laser beam need not be increased unnecessarily. That is, the thickness of the first magnetic layer 3 should be set within a range of 25 to 60 nm, and preferably within a range of 30 to 60 nm.

EXAMPLE 2

Figure 15:
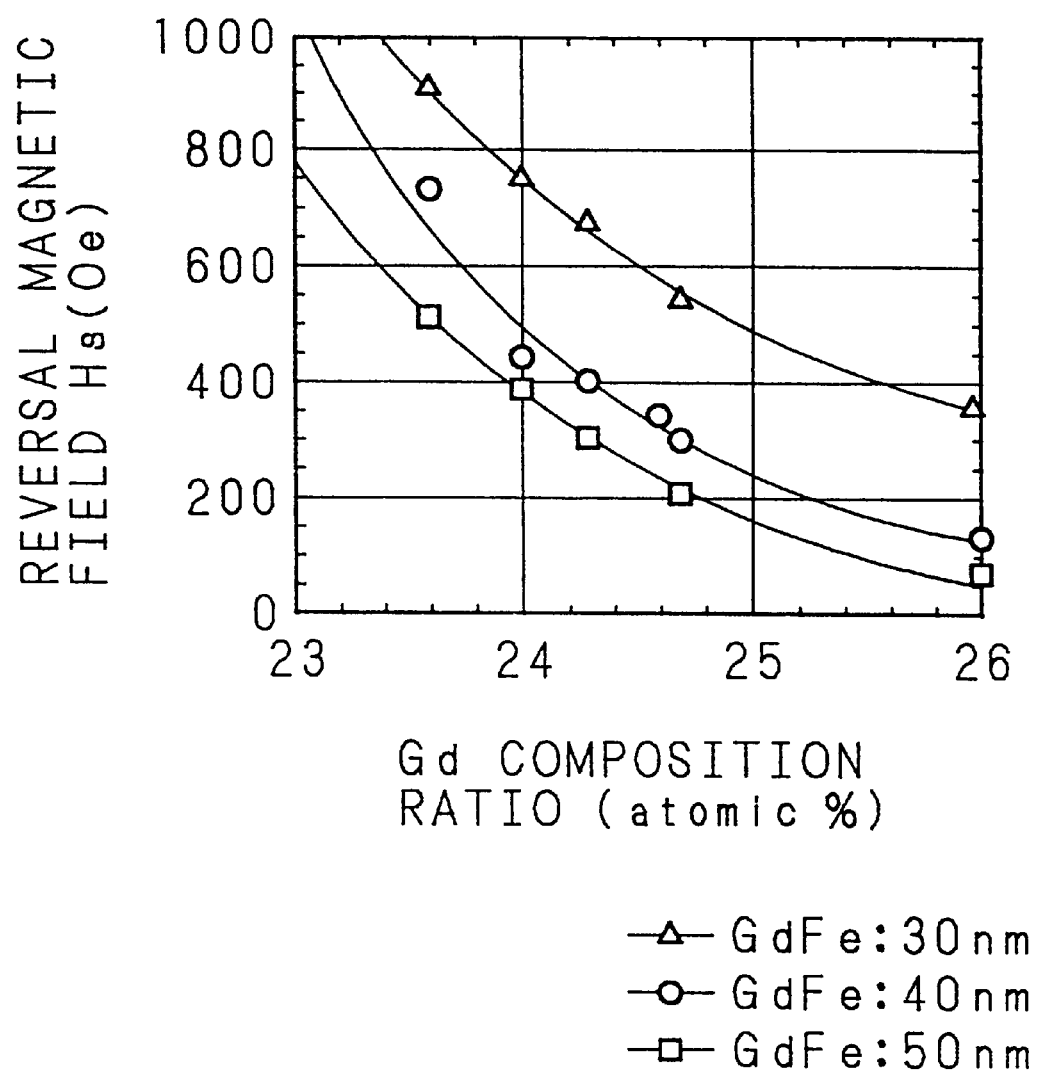
FIG. 15 is a graph plotting reversal magnetic field against the Gd composition ratio in the first magnetic layer.

Magneto-optical disks having the film compositions shown in Table 2 were fabricated. Magneto-optical disks were fabricated by varying the Gd composition ratio in the first magnetic layer 3, and the reversal magnetic field Hs for the first magnetic layer 3 at room temperature was measured. The results are shown in FIG. 15, in which the ordinate represents the reversal magnetic field Hs and the abscissa the Gd composition ratio in the first magnetic layer 3. Further, measurements were made likewise by varying the Gd composition ratio in the first magnetic layer 3, and by setting the thickness of the second magnetic layer 4 to 30 nm and to 40 nm, respectively. The results are also shown in FIG. 15. In the graph, '-Δ-' indicates a sample with GdFe: 30 nm, '-○-' a sample with GdFe: 40 nm, and '-□-' a sample with GdFe: 50 nm.

TABLE 2

| Composition | Film Thickness (nm) | Curie Temperature (° C.) | Compensation Temperature (° C.) | Dominant |
|---|---|---|---|---|
| First Magnetic Layer GdFeCo | 40 | 310 | — | TM |
| Second Magnetic Layer $Gd_{32}Fe_{68}$ | 40 / 30 / 50 | 200 | — | RE |
| Third Magnetic Layer $Tb_{24}Fe_{56}Co_{20}$ | 30 | 260 | — | TM |

From FIG. 15, it can be seen that with the thickness of the second magnetic layer 4 set to 30 nm, magnetic reversal is possible with a magnetic field not exceeding 1 kOe when the composition ratio of Gd in the first magnetic layer 3 is about 23.5 to 26 atomic %, and with the thickness of the second magnetic layer 4 set to 40 nm and 50 nm, magnetic reversal is possible with a magnetic field not exceeding 1 kOe when the composition ratio of Gd in the first magnetic layer 3 is about 23 to 26 atomic %. In terms of the Gd compensation ratio, the Gd composition ratio in the first magnetic layer 3 should be within ±2 atomic % of the Gd compensation ratio, and preferably within ±1 atomic %. In example 2, the Gd compensation ratio in the first magnetic layer 3 was about 24.5 atomic %. If the Gd composition ratio is increased beyond 26 atomic %, the temperature required to transfer the recorded bi in the third magnetic layer 5 to the first magnetic-layer 3 will tend to increase, requiring an increase in read power, ar in some cases, in the intermediate-temperature region the reversal magnetic field for the first magnetic layer 3 may not become greater than the read magnetic field, and the recorded bit in the third magnetic layer 5 may not be transferred to the first magnetic layer 3.

EXAMPLE 3

Figure 16:
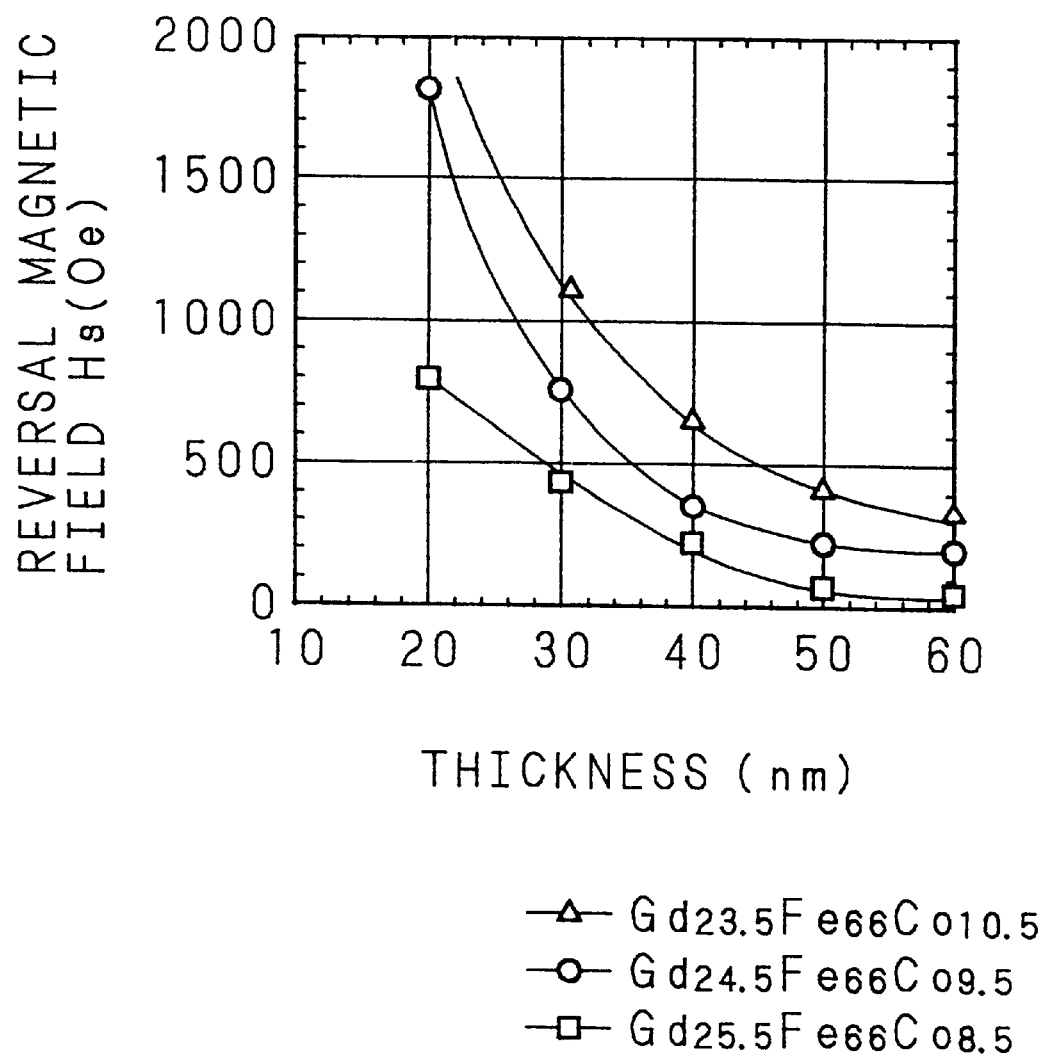
FIG. 16 is a graph plotting reversal magnetic field for the first magnetic layer against the thickness of the second magnetic layer.
Figure 17:
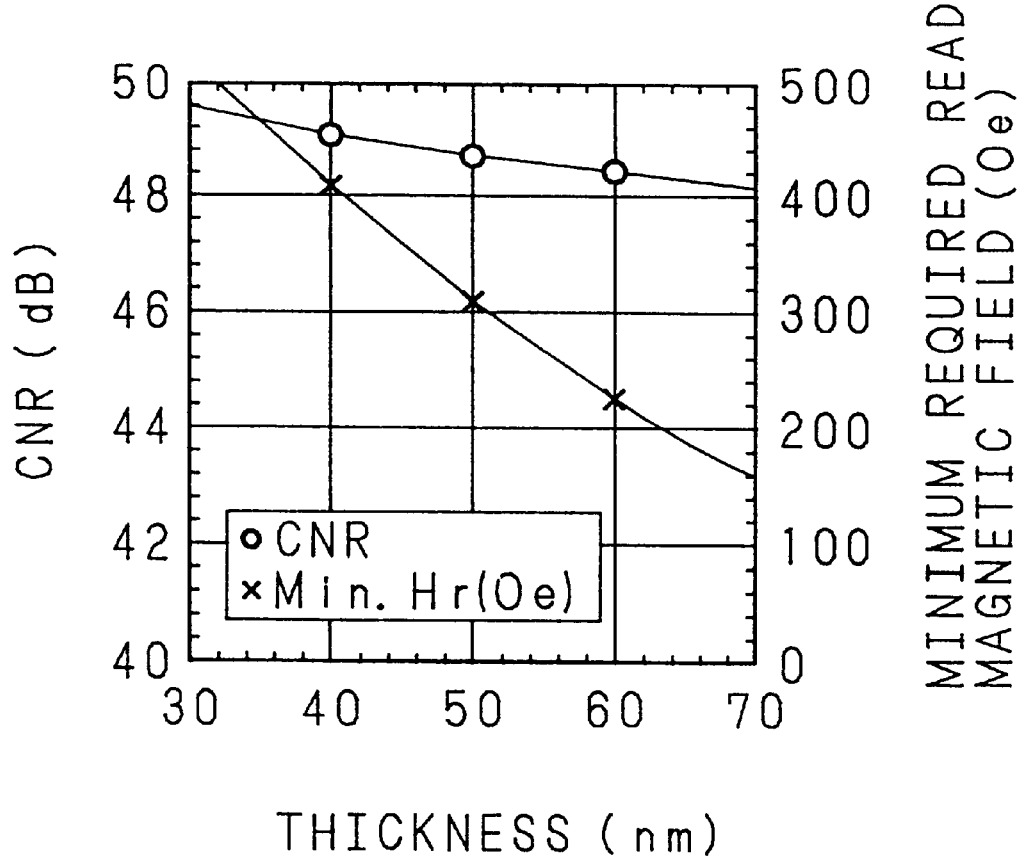
FIG. 17 is a graph plotting CNR and minimum required read magnetic field against the thickness of the second magnetic layer.

Magneto-optical disks having the film compositions shown in Table 3 were fabricated. Magneto-optical disks were fabricated by varying the thickness of the second magnetic layer 4, and the reversal magnetic field Hs for the first magnetic layer 3 at room temperature, the CNR of the playback signal, and the minimum required read magnetic field for the second magnetic layer 4 were measured. The results are shown in FIGS. 16 and 17. In FIG. 16, the ordinate represents the reversal magnetic field for the first magnetic layer 3, and the abscissa represents the thickness of the second magnetic layer 4. Further, measurements were made likewise by varying the thickness of the second magnetic layer 4, and by setting the Gd composition ratio in the first magnetic layer 3 to 23.5 atomic % and to 25.5 atomic %, respectively. The results are also shown in FIG. 16. In the graph, '-Δ-' indicates a sample with $Gd_{23.5}Fe_{66}Co_{10.5}$, '-○-' a sample with $Gd_{24.5}Fe_{66}Co_{9.5}$, and '-□-' a sample with $Gd_{25.5}Fe_{66}Co_{8.5}$. In FIG. 17, the ordinate represents the CNR of the playback signal on one side and the minimum required read magnetic field on the other side, and the abscissa represents the thickness of the second magnetic layer 4. In the graph, '-○-' indicates the CNR and '-×-' the minimum required reading magnetic field.

TABLE 3

| Composition | Film Thickness (nm) | Curie Temperature (° C.) | Compensation Temperature (° C.) | Dominant |
|---|---|---|---|---|
| First Magnetic Layer $Gd_{24.5}Fe_{66}Co_{9.5}$ | 40 | 310 | — | TM |
| $Gd_{23.5}Fe_{66}Co_{10.5}$ | | | | |
| $Gd_{25.5}Fe_{66}Co_{8.5}$ | | | | |
| Second Magnetic Layer $Gd_{32}Fe_{68}$ | | 200 | — | RE |
| Third Magnetic Layer $Tb_{24}Fe_{56}Co_{20}$ | 30 | 260 | — | TM |

From FIG. 16, it can be seen that the reversal magnetic field Hs decreases rapidly as the thickness of the second magnetic layer 4 increases; in the case of the Gd composition ratio in the first magnetic layer 3 set to 24.5 atomic %, when the thickness of the second magnetic layer 4 is around 20 nm, the reversal magnetic field Hs for the first magnetic layer 3 is 1 kOe or higher, but when the thickness is 25 nm or greater, the reversal magnetic field Hs is lower than 1 kOe. It is also shown that in the case of the Gd composition ratio in the first magnetic layer 3 set to 23.5 atomic %, the reversal magnetic field Hs is lower than 1 kOe when the thickness of the second magnetic layer 4 is 30 nm or greater, and in the case of the Gd composition ratio in the first magnetic layer 3 set to 25.5 atomic %, the reversal magnetic field Hs is lower than 1 kOe when the thickness of the second magnetic layer 4 is 20 nm or greater. The upper limit of the thickness should preferably be set at around 60 nm so that the irradiation power of laser beam need not be increased unnecessarily.

Further, as shown in FIG. 17, the minimum required read magnetic field for the second magnetic field 4 decreases with increasing thickness. It can be seen that when the thickness is 30 nm or greater, with a read magnetic field of 1 kOe or less the second magnetic layer 4 is magnetized in the direction of the reading magnetic field and a satisfactory CNR of 48 dB or higher is obtained. Accordingly, the thickness of the second magnetic layer 4 should be set within a range of 20 to 60 nm, and preferably within a range of 30 to 60 nm.

EXAMPLE 4

Figure 18:
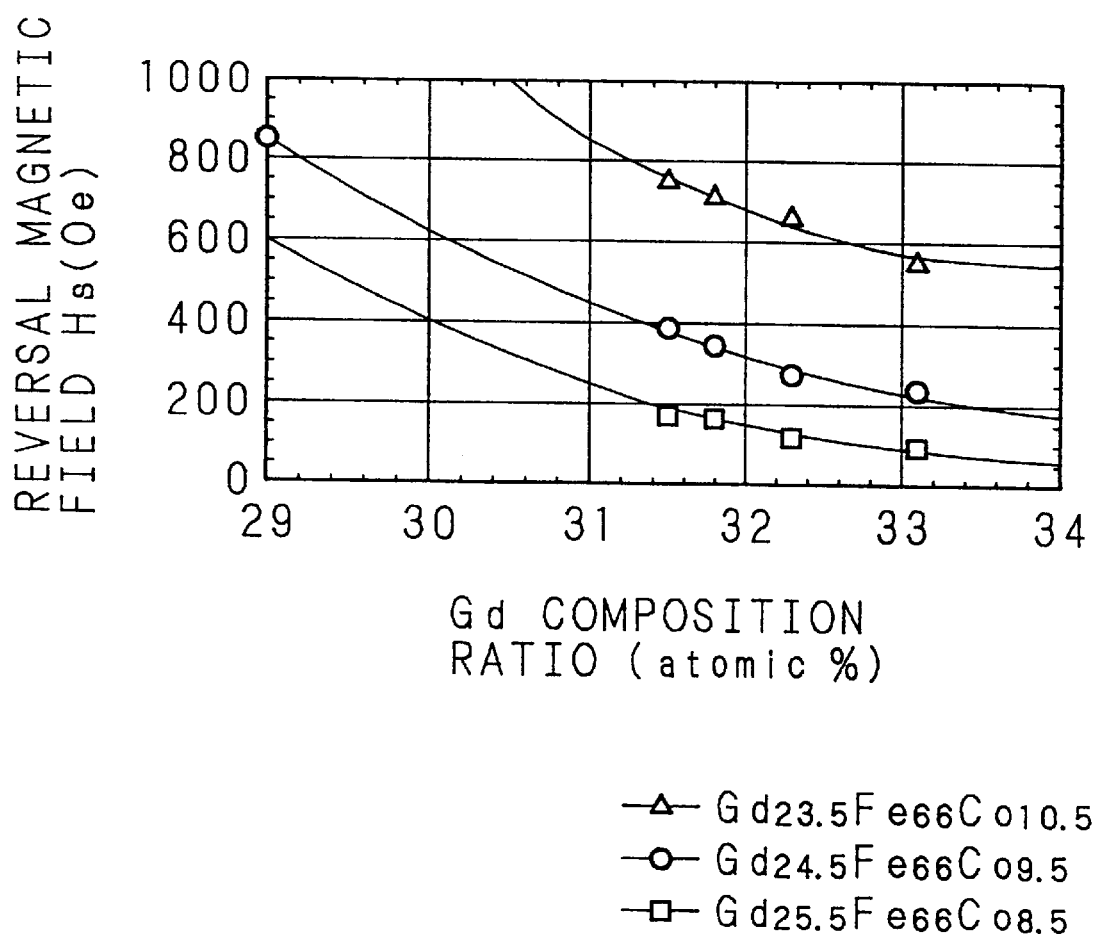
FIG. 18 is a graph plotting reversal magnetic field for the first magnetic layer against the Gd composition ratio in the second magnetic layer.
Figure 19:
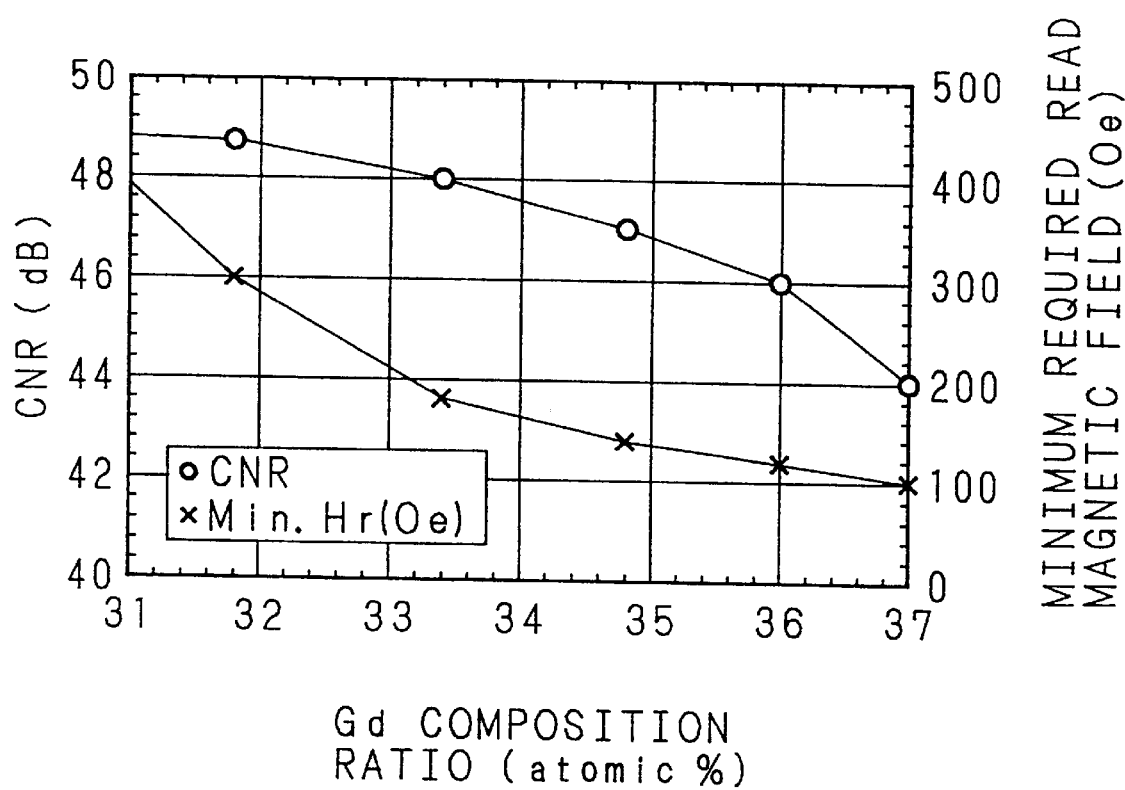
FIG. 19 is a graph plotting CNR and minimum required read magnetic field against the Gd composition ratio in the second magnetic layer.

Magneto-optical disks having the film compositions shown in Table 4 were fabricated. Magneto-optical disks were fabricated by varying the Gd composition ratio of the second magnetic layer 4, and the reversal magnetic field Hs for the first magnetic layer 3 at room temperature, the CNR of the playback signal, and the minimum required read magnetic field for the second magnetic layer 4 were measured. The results are shown in FIGS. 18 and 19. In FIG. 18, the ordinate represents the reversal magnetic field for the first magnetic layer 3, and the abscissa the Gd composition ratio of the second magnetic layer 4. Further, measurements were made likewise by varying the Gd composition ratio in the second magnetic layer 4, and by setting the Gd composition ratio in the first magnetic layer 3 to 23.5 atomic % and to 25.5 atomic %, respectively. The a results are also shown in FIG. 18. In the graph, '-△-' indicates a sample with $Gd_{23.5}Fe_{66}Co_{10.5}$, '-○-' a sample with $Gd_{24.5}Fe_{66}Co_{9.5}$, and '-□-' a sample with $Gd_{25.5}Fe_{66}Co_{8.5}$. In FIG. 19, the ordinate represents the CNR of the playback signal on one side and the minimum required read magnetic field on the other side, and the abscissa represents the Gd composition ratio in the second magnetic layer 4. In the graph, '-○-' indicates the CNR and '-×-' the minimum required magnetic field.

TABLE 4

| Composition | Film Thickness (nm) | Curie Temperature (° C.) | Compensation Temperature (° C.) | Dominant |
|---|---|---|---|---|
| First Magnetic Layer $Gd_{24.5}Fe_{66}Co_{9.5}$ | 40 | 310 | — | TM |
| ⎡ $Gd_{23.5}Fe_{66}Co_{10.5}$ ⎣ $Gd_{25.5}Fe_{66}Co_{8.5}$ | | | | |
| Second Magnetic Layer GdFe | 40 | 200 | — | RE |
| Third Magnetic Layer $Tb_{24}Fe_{56}Co_{20}$ | 30 | 260 | — | TM |

As shown in FIG. 18, the reversal magnetic field Hs for the first magnetic layer 3 decreases as the Gd composition ratio in the second magnetic layer 4 increases. It can be seen that with the Gd composition ratio in the first magnetic layer 3 set to 24.5 atomic % or 25.5 atomic %, when the Gd composition ratio in the second magnetic layer 4 is about 29 atomic % or greater, the reversal magnetic field Hs for the first magnetic layer 3 is lower than 1 kOe, and with the Gd composition ratio in the first magnetic layer 3 set to 23.5 atomic %, when the Gd composition ratio in the second magnetic layer 4 is about 30 atomic % or greater, the reversal magnetic field Hs for the first magnetic layer 3 is lower than 1000 Oe.

Further, as shown in FIG. 19, as the Gd composition ratio in the second magnetic layer 4 increases, the minimum required read magnetic field for the second magnetic layer 4 decreases, but the CNR also deteriorates; it is shown that the playback E characteristic degrades when the Gd composition ratio in the second magnetic layer 4 exceed 35 atomic %. Accordingly, the Gd composition ratio in the second magnetic layer 4 should be set within a range of 29 to 35 atomic %, and preferably within a range of 30 to 35 atomic %.

EXAMPLE 5

Figure 20:
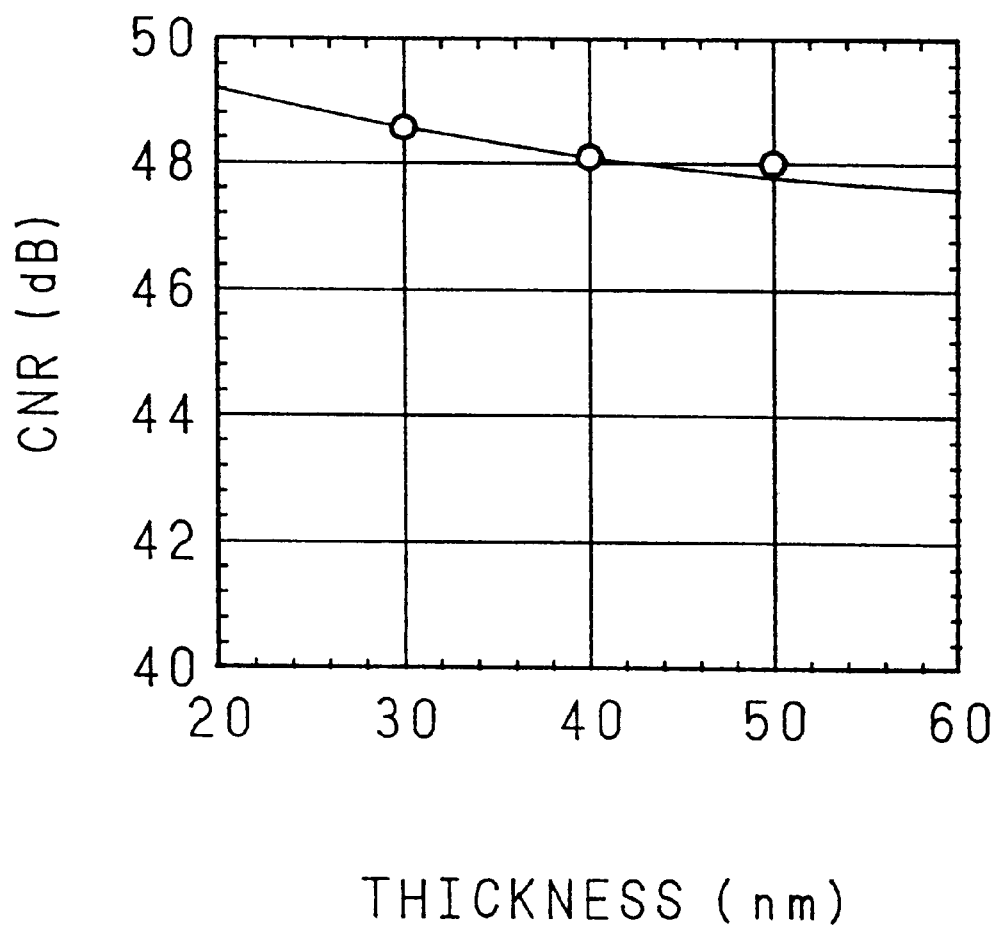
FIG. 20 is a graph plotting CNR against the thickness of a third magnetic layer.

Magneto-optical disks having the film compositions shown in Table 5 were fabricated Magneto-optical disks were fabricated by varying the thickness of the third magnetic layer 5, and the CNR was measured on each disk. The results are shown in FIG. 20. In FIG. 20, the ordinate represents the CNR, and the abscissa the thickness of the third magnetic layer 5.

TABLE 5

| Composition | Film Thickness (nm) | Curie Temperature (°C.) | Compensation Temperature (°C.) | Dominant |
|---|---|---|---|---|
| First Magnetic Layer $Gd_{24.5}Fe_{66}Co_{9.5}$ | 40 | 310 | — | TM |
| Second Magnetic Layer $Gd_{32}Fe_{68}$ | 40 | 200 | — | RE |
| Third Magnetic Layer $Tb_{24}Fe_{56}Co_{20}$ | | 260 | — | TM |

From FIG. 20, it can be seen that no significant change occurs in the CNR when the thickness of the third magnetic layer 5 is changed, and a satisfactory CNR of 48 dB or higher is obtained. The thickness of the third magnetic layer 5 should be set within a range of 25 to 60 nm, and preferably within a range of 30 to 60 nm, as in the case of the first magnetic layer 3.

EXAMPLE 6

Figure 21:
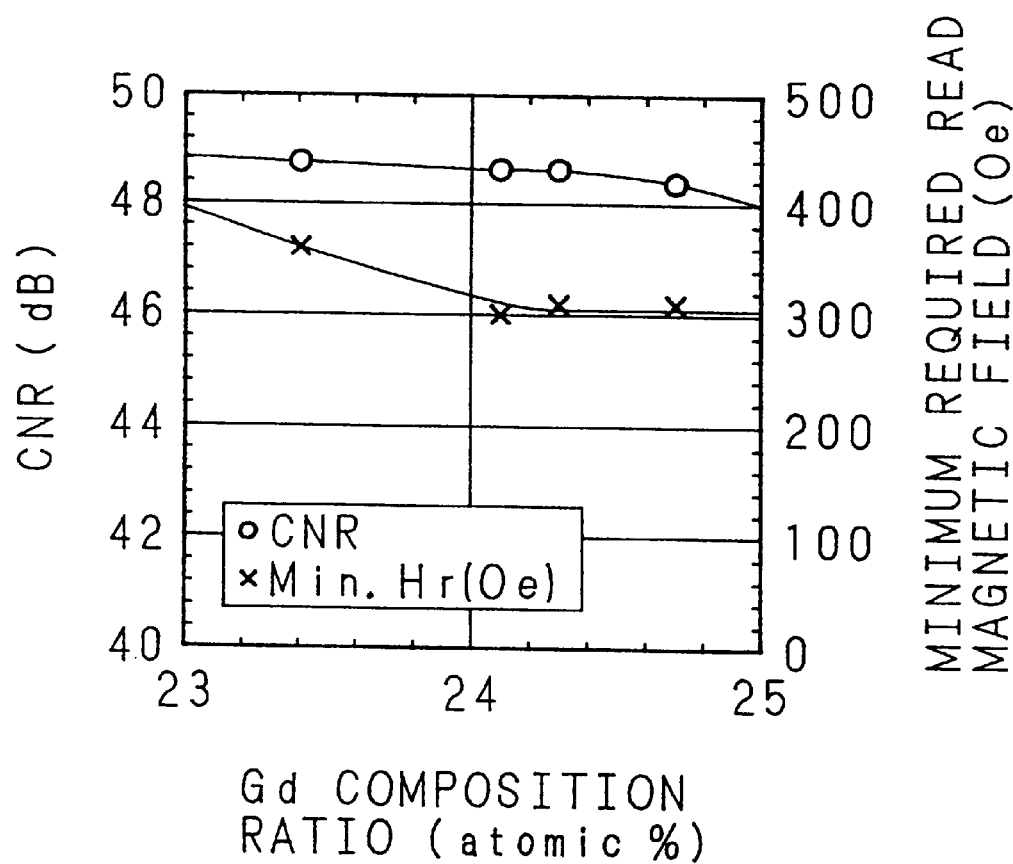
FIG. 21 is a graph plotting CNR and minimum required read magnetic field against the Gd composition ratio in the first magnetic layer.

Magneto-optical disks having the film compositions shown in Table 6 were fabricated. The film was fabricated under the same conditions as previously described. Magneto-optical disks were fabricated by varying the Gd composition ratio in the first magnetic layer 3, and the CNR was measured on each disk. The results are shown in FIG. 21. In FIG. 21, the ordinate represents the CNR on one side and the minimum required read magnetic field for the second magnetic layer 4 on the other side, and the abscissa represents the Gd composition ratio in the first magnetic layer 3.

TABLE 6

| Composition | Film Thickness (nm) | Curie Temperature (°C.) | Compensation Temperature (°C.) | Dominant |
|---|---|---|---|---|
| First Magnetic Layer GdFeCo | 40 | 310 | — | TM |
| Second Magnetic Layer $Gd_{32}Fe_{68}$ | 50 | 200 | — | RE |
| Third Magnetic Layer $Tb_{24}Fe_{56}Co_{20}$ | 30 | 260 | — | TM |

As shown in FIG. 21, over a wide range from 23 to 25 atomic % of the Gd composition ratio in the first magnetic layer 3, magnetic reversal was possible with a minimum required read magnetic field of 1 kOe or smaller, and over this range, a CNR of 48.5 dB or higher was obtained. The Gd composition ratio in the first magnetic layer 3 should preferably be within a range of 23 to 25 atomic %, approximately the same range as shown by the results in example 2.

From the above results, it can be seen that the first magnetic layer 3 formed from a GdFeCo film should have a Gd composition ratio within ±2 atomic % of the composition ratio, or a Gd composition ratio within a range of 23 to 26 atomic %, that the second magnetic layer 4, formed from a GdFe film and RE rich below its Curie temperature, should have a Gd composition ratio about 29 to 35 atomic %, and that the thickness of each of the first magnetic layer 3 and second magnetic layer 4 should be set within a range of 25 to 60 nm With a magneto-optical disk thus fabricated, a high-resolution playback signal can be obtained with a small read magnetic field of 1 kOe or lower.

Figure 22:
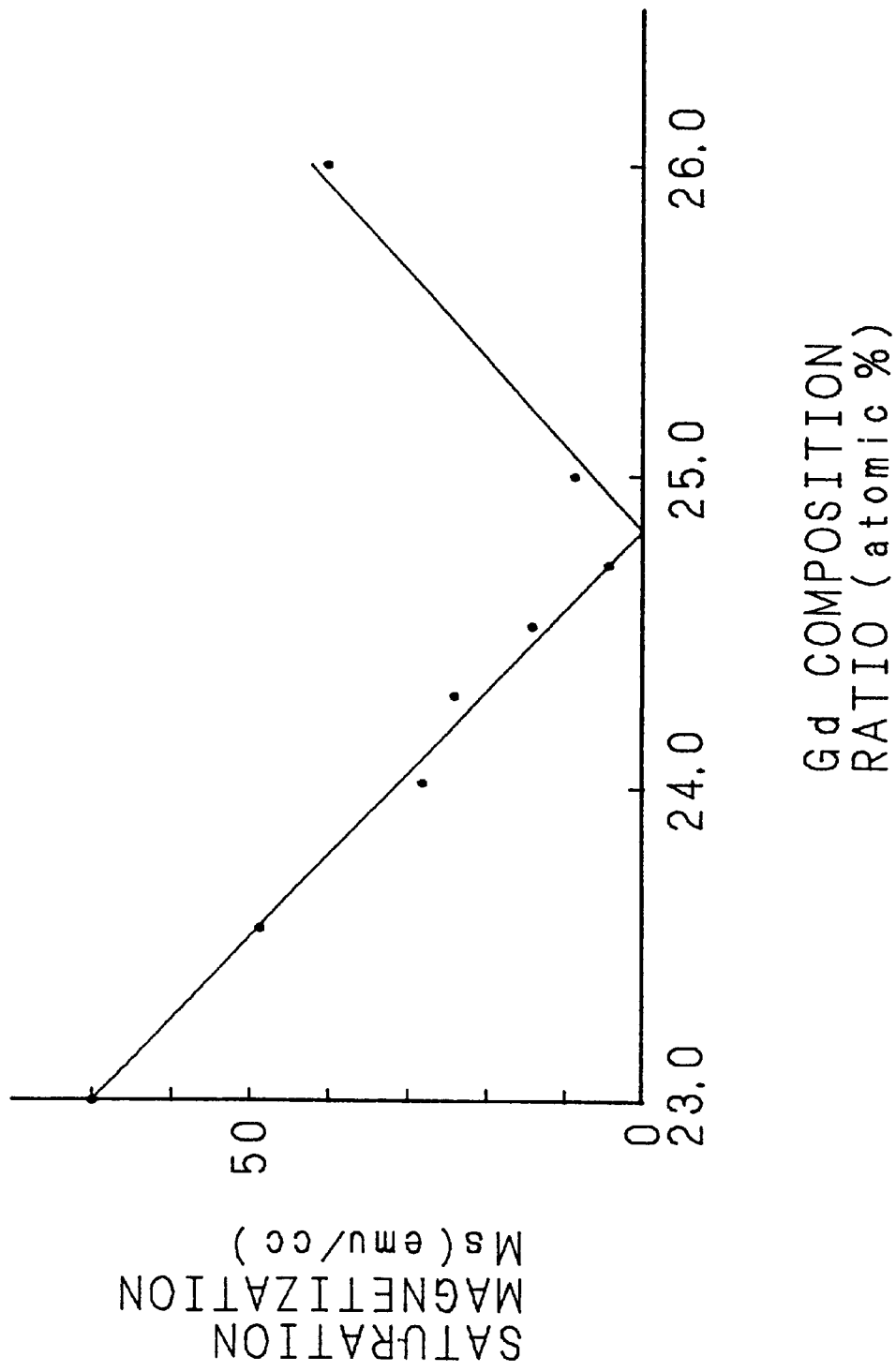
FIG. 22 is a graph showing a saturation magnetization curve plotted against the Gd composition ratio in a GdFeCo film.
Figure 23:
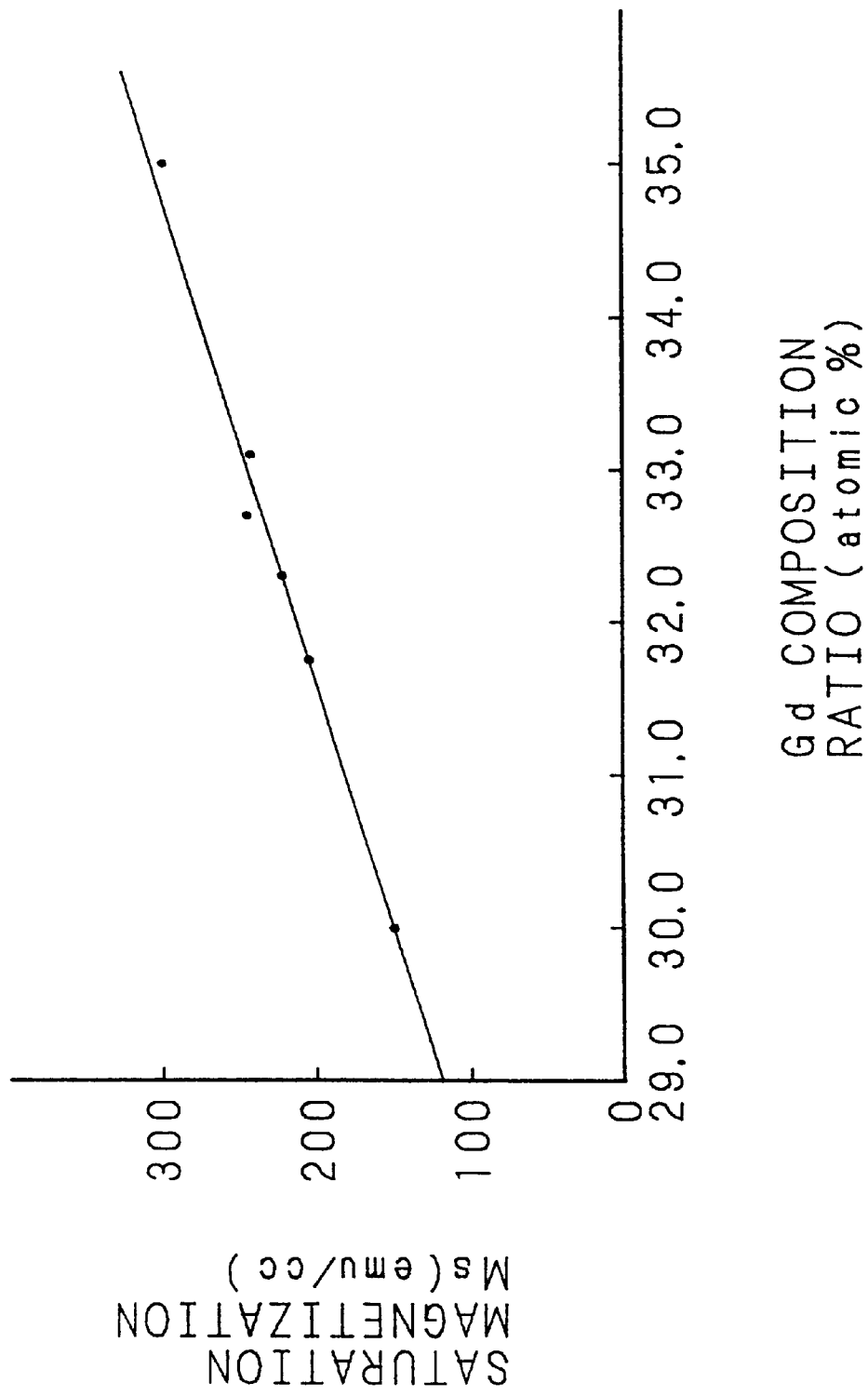
FIG. 23 is a graph showing a saturation magnetization curve plotted against the Gd composition ratio in a GdFe film.

In the above description, these magnetic layers have each been expressed in terms of the composition ratio of their constituent materials, but instead, each magnetic layer may be expressed in terms of its magnetic property. FIGS. 22 and 23 are graphs showing saturation magnetization values for the GdFeCo film and GdFe film, respectively. In each graph, the ordinate plots the saturation magnetization value, and the abscissa the Gd composition ratio. As shown in these graphs, it is preferable that the saturation magnetization of the first magnetic layer 3 be about 70 emu/cc or less and that of the second magnetic layer 4 be within a range of 120 to 300 eum/cc.

EXAMPLE 7

According to an Electric Engineers' Society Research Paper MAG-91-25 (pp. 41–47), the mobility in microdomains in an RE-TM amorphous alloy film deposited by sputtering under high gas pressure conditions is lower than that when the same film is deposited under reduced gas pressure conditions; for example, when irradiated by a high power laser beam while applying an erasing-direction magnetic field, a mark can be recorded, and it is said that this type of film is not suitable for a magneto-optical recording medium However, in the case of a medium having an increased film thickness, such as a magneto-optical disk capable of magnetically-induced super-resolution readout, if the domain mobility of the recording layer is high, a mark cannot be recorded accurately, as a result of which jitter increases and S/N ratio degrades. It is therefore believed that the noise can be reduced by decreasing the domain mobility and magnetic wall moving speed, by increasing the sputtering gas pressure for the deposition of magnetic layers during the fabrication of a magneto-optical recording medium capable of magnetically-induced super-resolution readout. We measured S/N ratios on magneto-optical disks fabricated using different gas pressure conditions. The results will be shown below.

Magneto-optical disks having the film compositions shown in Table 7 were fabricated After depositing the first magnetic layer 3 and second magnetic layer 4 with a gas pressure of 1 Pa, the third magnetic layer 5 was deposited by varying the gas pressure condition from disk to disk. Table 8 shows the S/N ratios measured on the magneto-optical disks fabricated using different gas pressure conditions.

TABLE 7

| Composition | Film Thickness (nm) | Curie Temperature (°C.) | Compensation Temperature (°C.) | Dominant |
|---|---|---|---|---|
| First Magnetic Layer $Gd_{24.5}Fe_{66}Co_{9.5}$ | 40 | 310 | — | TM |
| Second Magnetic Layer $Gd_{32}Fe_{68}$ | 40 | 200 | — | RE |
| Third Magnetic Layer $Tb_{24}Fe_{56}Co_{20}$ | 30 | 260 | — | TM |

TABLE 8

| Gas Pressure (Pa) | 0.5 | 0.6 | 0.7 | 1.0 | 1.5 | 2.0 | 3.0 | 5.0 | 7.0 |
|---|---|---|---|---|---|---|---|---|---|
| S/N Ratio (dB) | 14 | 14 | 15 | 16 | 17 | 17 | 17 | 16 | 14 |

As can be seen from Table 8, the tendency is such that the S/N ratio increases as the gas pressure is increased, but begins to decrease when the gas pressure exceeds 5 Pa. This shows that a good S/N ratio can be obtained when the third magnetic layer 5 is formed with a gas pressure of about 0.7 to 5.0 Pa. When cross sections of third magnetic layers 5, one formed with a gas pressure of 0.5 Pa and the other with a gas pressure of 0.7 Pa, were observed under a transmission electron microscope, column-like structures growing perpendicularly to the film surface were observed in the magnetic layer formed with 0.7 Pa, but such structures were not observed in the magnetic layer formed with 0.5 Pa. As described, for a magnetically-induced super-resolution medium having an increased magnetic layer thickness and requiring a relatively high power for reading, the stability of the recording layer and recorded bits can be increased by setting the sputtering gas pressure for magnetic layer deposition within a range of 0.7 to 5.0 Pa.

Next, we will describe modified examples of the magneto-optical disk of the invention, that has three magnetic layers and on which a double mask is formed.

MODIFIED EXAMPLE 1

Figure 24:
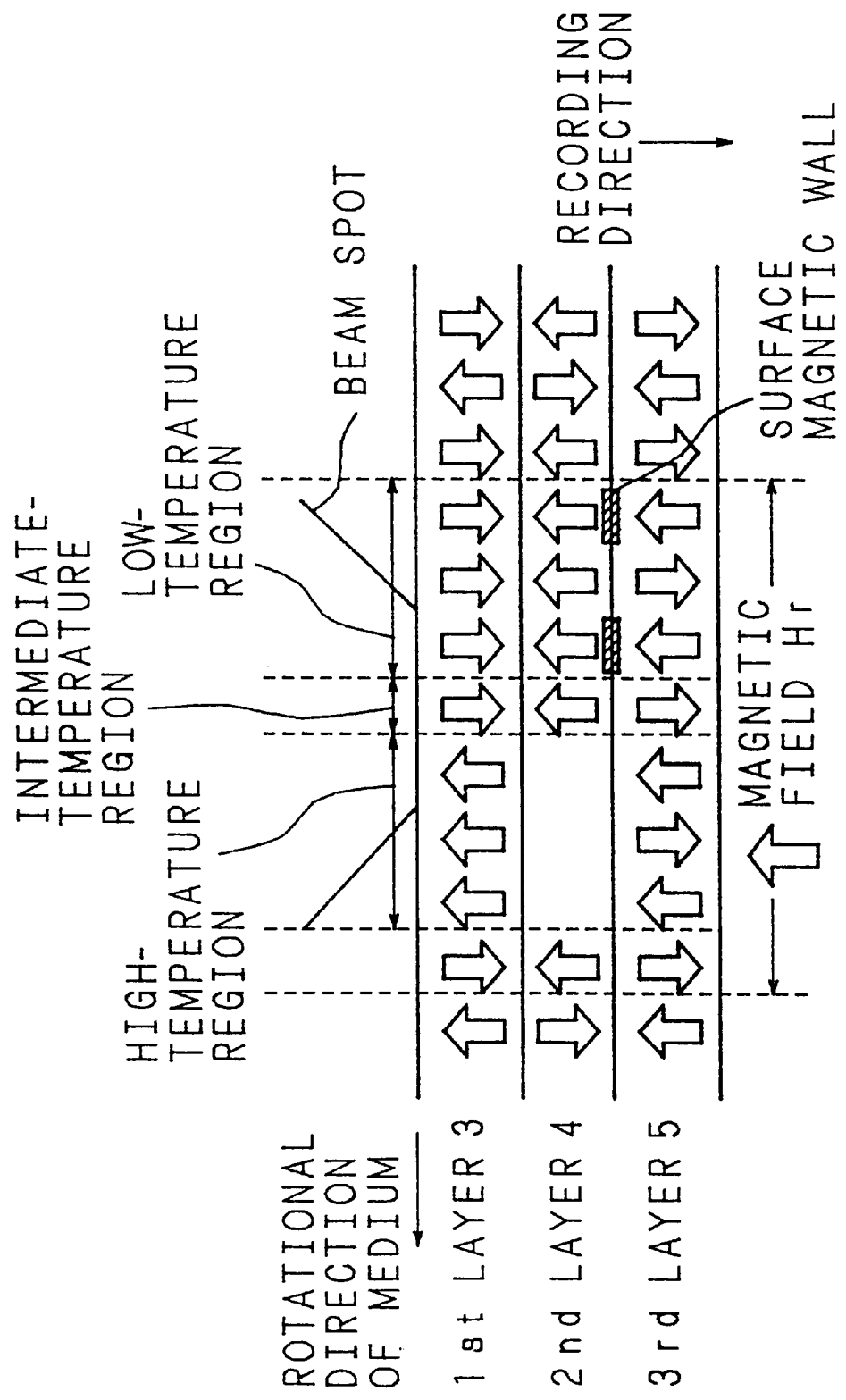
FIG. 24 is a diagram showing magnetization states when reading a magneto-optical disk according to a modified example of the present invention.

FIG. 24 is a schematic diagram illustrating magnetization states when reading a magneto-optical disk according to modified example 1. In modified example 1, the second magnetic layer 4 has a lower Curie temperature than the one described in a the previous example. For example, a GdFe film with Si added to it (Curie temperature: 140° C.) is used as the second magnetic layer 4. Otherwise, the structure is the same as that described in the previous example. Here, the second magnetic layer 4 may also be formed from a GdFe film with Al added to it or a GdFeCo film with Si, Al, etc. added to it.

A low-temperature region and a high-temperature region are formed within a beam spot, and these regions act as mask regions where the magnetization in the third magnetic layer 5 cannot be transferred to the first magnetic layer 3, in effect producing the same effect as when the beam is focused into a smaller spot. The magnetization states in the first magnetic layer 3 and second magnetic layer 4 in the low-temperature region are the same as those described in the previous example. That is, when the condition Hs2+Hc2<Hr is satisfied, a mask region is formed in the low-temperature region. On the other hand, in the high-temperature region, since the second magnetic layer 4 is heated above its Curie temperature, the exchange coupled force between the first magnetic layer 3 and the third magnetic layer 5 is broken off, as a result of which the magnetization in the first magnetic layer 3 is oriented in the direction of the bias magnetic field Hr, thus forming a mask region. The necessary conditions for the magnetization in the third magnetic layer 5 to be transferred to the first magnetic layer 3 in the intermediate-temperature region are Hs2−Hc2>Hr and |−Hs1−Hc1|>Hr, which are the same as in the first embodiment.

MODIFIED EXAMPLE 2

Figure 25:
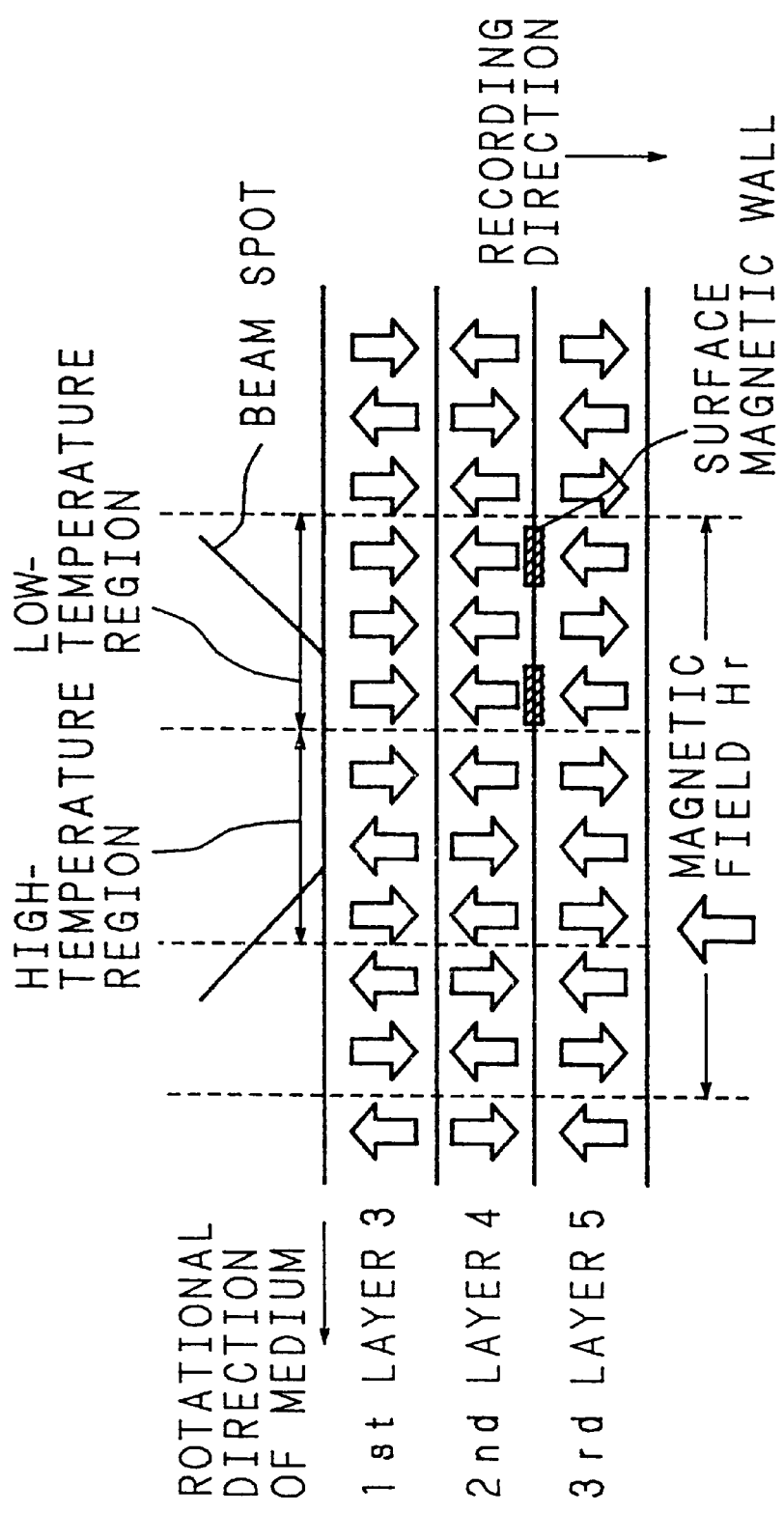
FIG. 25 is a diagram showing magnetization states when reading a magneto-optical disk according to another modified a example of the present invention.

FIG. 25 is a schematic diagram illustrating magnetization states when reading a magneto-optical disk according to modified example 2. In modified example 2, the second magnetic layer 4 has a higher Curie temperature than the one described in the previous example. For example, a GdFe film with a Curie temperature of 250° C. is used as the second magnetic layer 4. Otherwise, the structure is the same as that described in the previous example. Here, the second magnetic layer 4 may also be formed from a GdFeCo film or the like.

A low-temperature region is formed within the beam spot, and this region acts as a mask region where the magnetization in the third magnetic layer 5 cannot be transferred to the first magnetic layer 3, in effect producing the same effect as when the beam is focused into a smaller spot. The magnetization states in the first magnetic layer 3 and second magnetic layer 4 in the low-temperature region are the same as those described in the previous example. That is, when the condition Hs2+Hc2<Hr is satisfied, a mask region is formed in the low-temperature region. On the other hand, in the high-temperature region, the conditions Hs2−Hc2>Hr and |−Hs1−Hc1|>Hr are satisfied, allowing the magnetization in the third magnetic layer 5 to be transferred to the first magnetic layer 3. That is, in modified example 2, the magnetization states in the high-temperature region are the same as those in the intermediate-temperature region in the previous example. In modified example 2, the magnetization in the first magnetic layer 3 in the high-temperature region does not turn in the direction of the bias magnetic field Hr, because a temperature region that satisfies the condition |−Hs1−Hc1|<Hr cannot be formed within the beam spot due to the high Curie temperature of the second magnetic layer 4.

MODIFIED EXAMPLE 3

Figure 26:
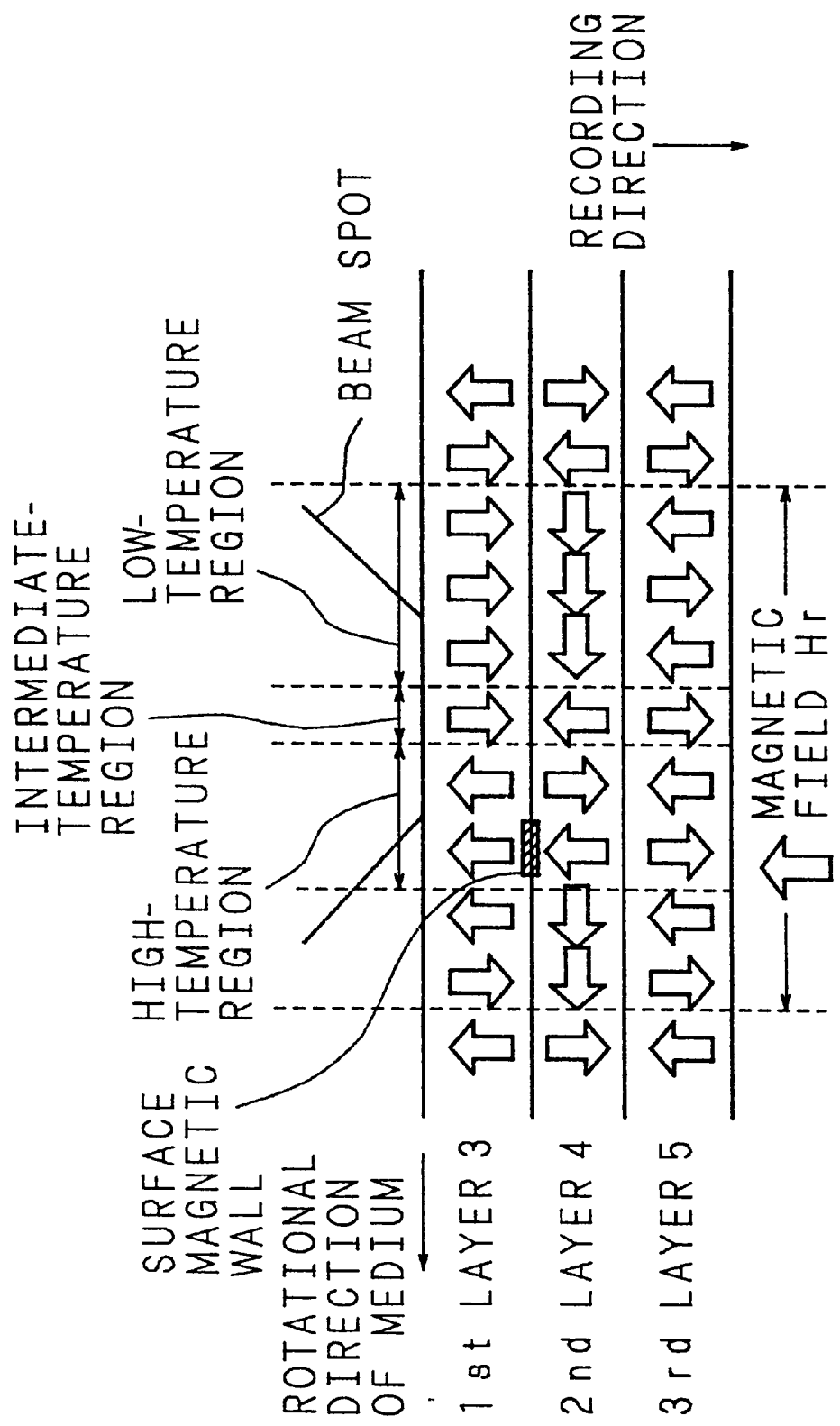
FIG. 26 is a diagram showing magnetization states when reading a-magneto-optical disk according to still another modified example of the present invention.

FIG. 26 is a schematic diagram illustrating magnetization states when reading a magneto-optical disk according to modified example 3. In modified example 3, an in-plane magnetized film (for example, an RE-rich GdFe film) having an easy axis of magnetization in the in-plane direction is used as the second magnetic layer 4. Otherwise, the structure is the same as that described in the previous example. Here, the second magnetic layer 4 may be formed from a RE-rich GdFeCo film or another in-plane magnetized film.

A low-temperature region and a high-temperature region are formed within a beam spot, and these regions act as regions where the magnetization in the third magnetic layer 5 cannot be transferred to the first magnetic layer 3, in effect producing the same effect as when the beam is focused into a smaller spot. The magnetization state in the first magnetic layer 3 in the low-temperature region is the same as that of the previous example. That is, when the condition Hs2+Hc2<Hr is satisfied, a mask region is formed in the low-temperature region. On the other hand, in the high-temperature region, the condition |−Hs1−Hc1|<Hr is satisfied and the magnetization in the first magnetic layer 3 is oriented in the direction of the bias magnetic field Hr, forming a mask region. The second magnetic layer 4 in modified example 3 is by itself an in-plane magnetized film, but with the three-layered structure, it becomes magnetized in oblique directions, and a shift amount occurs in its hysteresis loop due to the perpendicular magnetic component, as in the previously described example. The necessary conditions for the magnetization in the third magnetic layer 5 to be transferred to the first magnetic layer 3 in the intermediate-temperature region are Hs2−Hc2>Hr and |−Hs1−Hc1|>Hr, which are the same as in the previous example. In modified example 3, since an in-plane magnetized film is used as the second magnetic layer 4, the exchange coupled force between the second magnetic layer 4 and the third magnetic layer 5 is reduced, so that a mask region can be formed in the low-temperature region if the applied bias magnetic field Hr is reduced.

We will next describe another method of reading the magneto-optical disk of the invention, which is characterized by a unique method for forming a double mask during reading.

Figure 27:
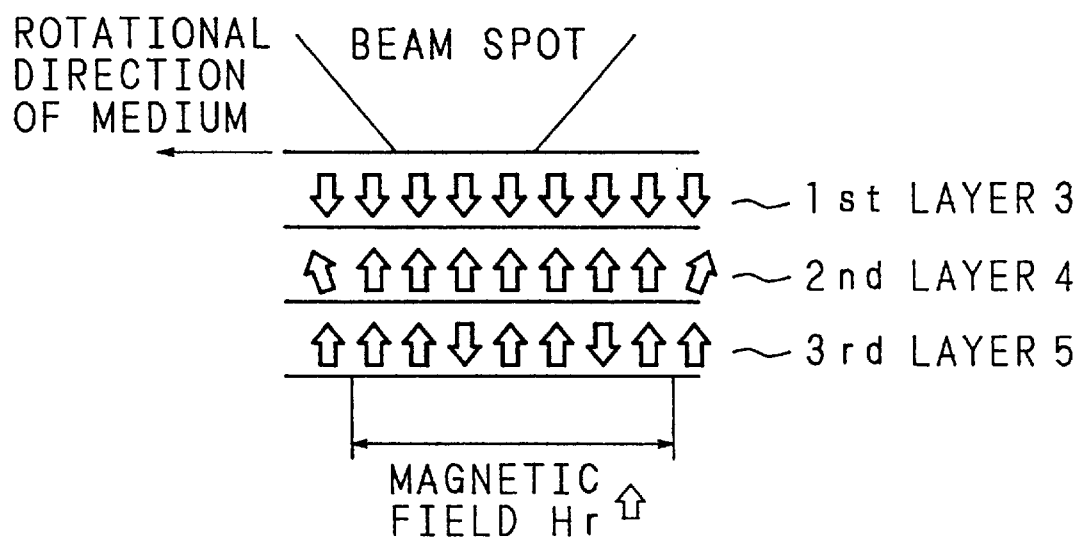
FIG. 27 is a diagram showing a double-mask forming process (front mask only)
Figure 28:
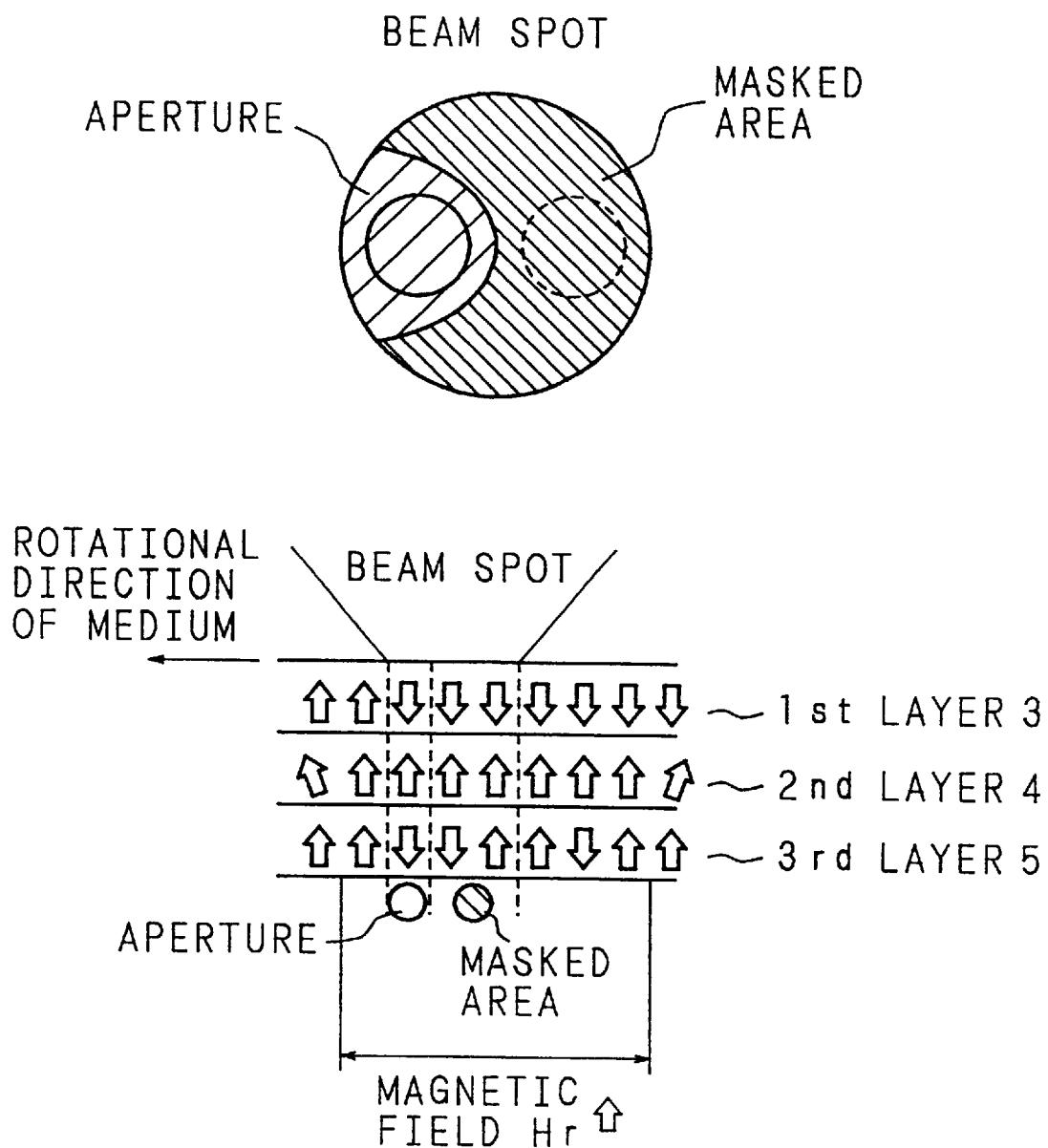
FIG. 28 is a diagram showing a double-mask forming process (front mask+aperture)
Figure 29:
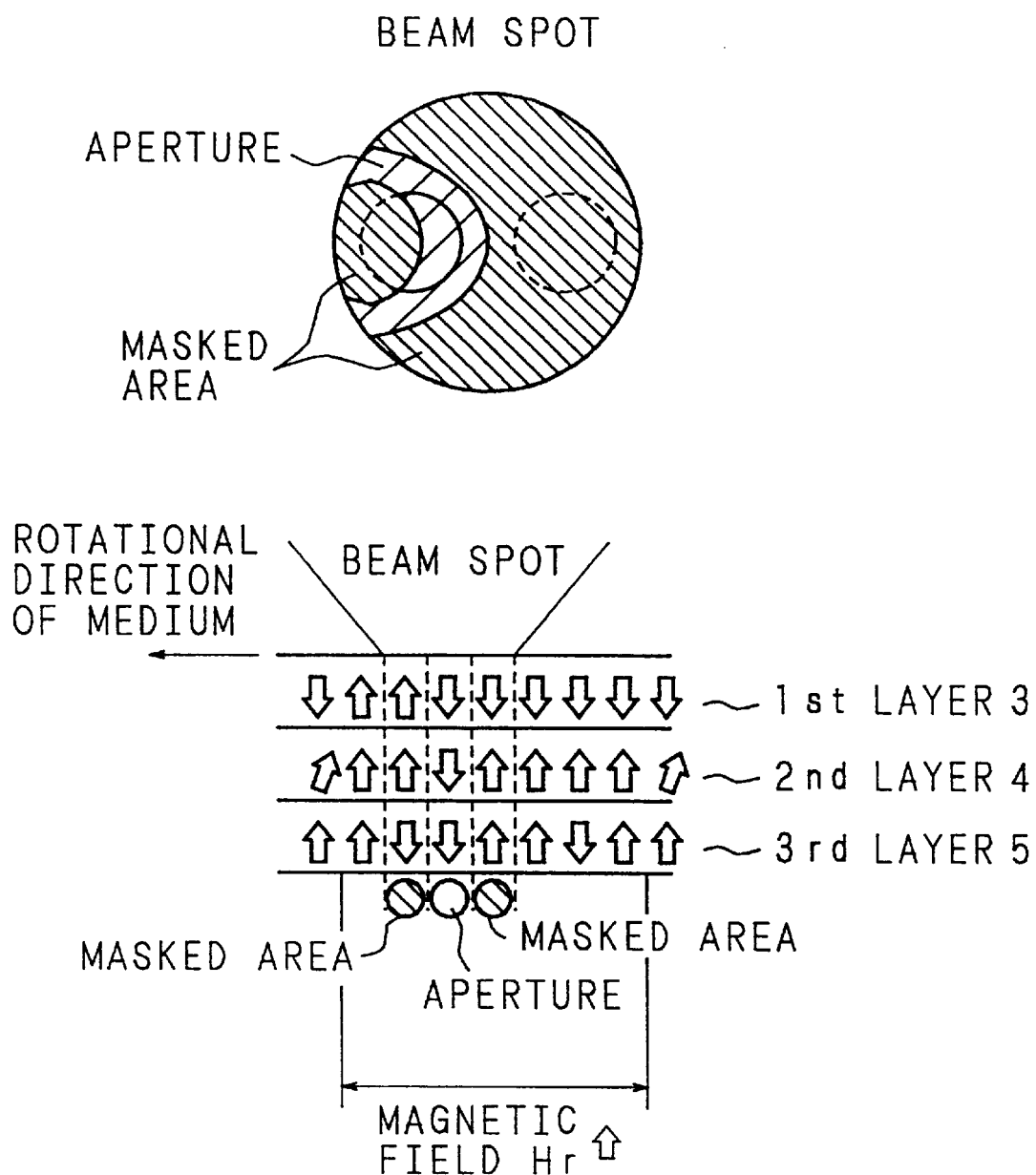
FIG. 29 is a diagram showing a double-mask forming process (front mask+aperture+rear mask)

First, a description will be given of a double mask forming process for the previously described magneto-optical disk. FIGS. 27 to 29 are diagrams illustrating magnetization states during reading, for explaining the double mask forming process. A read magnetic field Hr is applied to orient the magnetization in the first magnetic layer (readout layer) 3 in a specific direction (the direction opposite to the direction of the read magnetic field) (see FIG. 27). As a result, the entire region within the beam spot becomes a mask (a front mask). Then the temperature rises, the magnetization in the third magnetic layer (recording layer) 5 is transferred to the first magnetic layer 3 through the second magnetic layer (intermediate layer) 4 (see FIG. 28). This occurs because part of the front mask region within the beam spot turns into a transfer region (forming an aperture). Then the temperature further rises, the magnetization in the first magnetic layer 3 becomes oriented in another specific direction (the direction of the read magnetic field) (see FIG. 29). As a result, a mask (a rear mask) is formed in the high-temperature region, thus forming a double mask together with the front mask in the low-temperature region The above change can be explained in relation to the change of the laser power as follows. When the read power is low, the magnetization in the first magnetic layer 3 within the beam spot is oriented in the same direction. When the read power is increased, a region is formed where information recorded in the third magnetic layer 5 is transferred to the first magnetic layer 3 (front mask+transfer region). When the read power is further increased, a high-temperature region, where the magnetization of the first magnetic layer 3 is oriented in one specific direction, is formed (front mask+transfer region+rear mask).

An MSR magneto-optical disk of a three-layered structure having the film compositions shown in Table 9 was fabricated, and its recording and playback characteristics were measured

TABLE 9

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $Gd_{30}Fe_{70}$ | 30 | 200 | — | RE |
| Third Magnetic Layer $Tb_{19}Fe_{73}Co_8$ | 30 | 220 | — | TM |

A laser beam with 680-nm wavelength was used. First, a laser beam of 9 mW erasing-power was applied, along with an upward-directed erasing magnetic field of 500 Oe, to erase the entire surface of the magneto-optical disk. Next, while rotating the magneto-optical disk at a linear velocity of 9 m/sec., a laser beam of 10 mW recording power was applied, along with a downward-directed recording magnetic field of 300 Oe, to perform recording at a frequency of 11.3 MHz and a duty ratio of 26%. The recorded bit length was approximately 0.4 µm in the direction of disk rotation.

Figure 30:
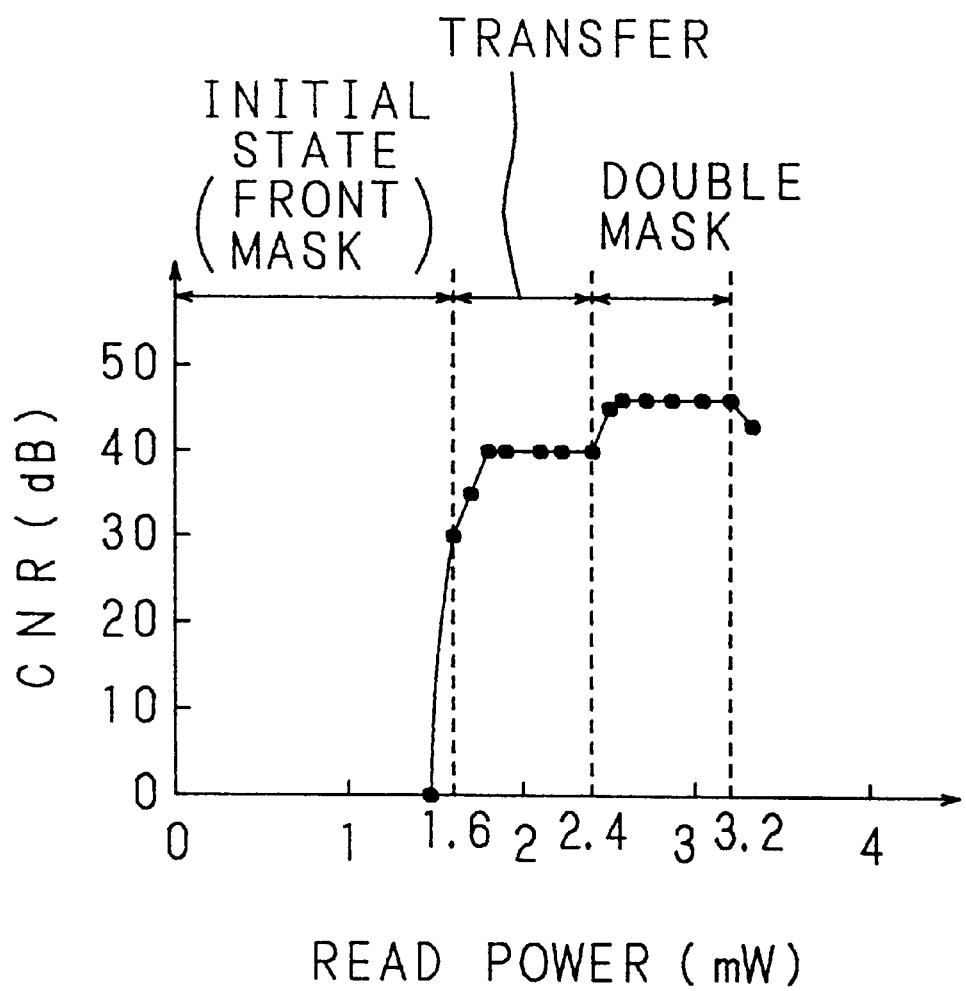
FIG. 30 is a graph showing a playback characteristic of a magneto-optical disk (multi-stage double-mask formation)

Next, an upward-directed read magnetic field was applied, and playback characteristics were measured. FIG. 30 is a graph showing its playback characteristics. With a read power of 1.5 mW, a magneto-optical signal corresponding to the information recorded in the third magnetic layer 5 could not be detected. This was due to the front mask formed in the entire region of the first magnetic layer 3 within the beam spot. With a read power of 1.6 mW, the direction of the magnetization in the third magnetic layer 5 was transferred to the first magnetic layer 3 through the second magnetic layer 4, and a magneto-optical signal was obtained This was because, in addition to the front mask, a region or an aperture was formed where the temperature was high enough to allow the magnetization direction of the third magnetic layer 5 to be transferred to the second magnetic layer 4.

With a read power of 2.4 mW, the CNR further improved. This was because the rear mask was formed in the high-temperature region, achieving a double mask condition. When the read power was raised above 3.2 mW, noise increased. This was because the recorded marks began to deform due to heat. Accordingly, in this example, a high CNR can be obtained at a read power within a range of 2.4 to 3.2 mW (a 0.8-mW wide range).

The value of the read power at which a high signal output is obtained is practical enough, but if the read-power range over which the magnetically-induced super-resolution readout is achieved can be widened, design requirements, operating requirements, etc. for magneto-optical apparatus can be further relaxed. To widen the optimum read-power range, a transfer region and a rear mask are simultaneously formed as the read power is raised, directly from the state in which the front mask is formed over the entire region within the beam spot. In this case, as the read power is raised, a transition is made from the state shown in FIG. 27 directly to the state shown in FIG. 29 without passing through the state shown in FIG. 28. Examples achieving such a configuration will be described below.

An MSR magneto-optical disk of a three-layered structure having the film compositions shown in Table 10 was fabricated, and its recording and playback characteristics were measured. The measuring conditions are the same as those for the magneto-optical disk shown in Table 9.

TABLE 10

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $Gd_{30}Fe_{70}$ | 50 | 200 | — | RE |
| Third Magnetic Layer $Tb_{19}Fe_{73}Co_8$ | 30 | 220 | — | TM |

Figure 31:
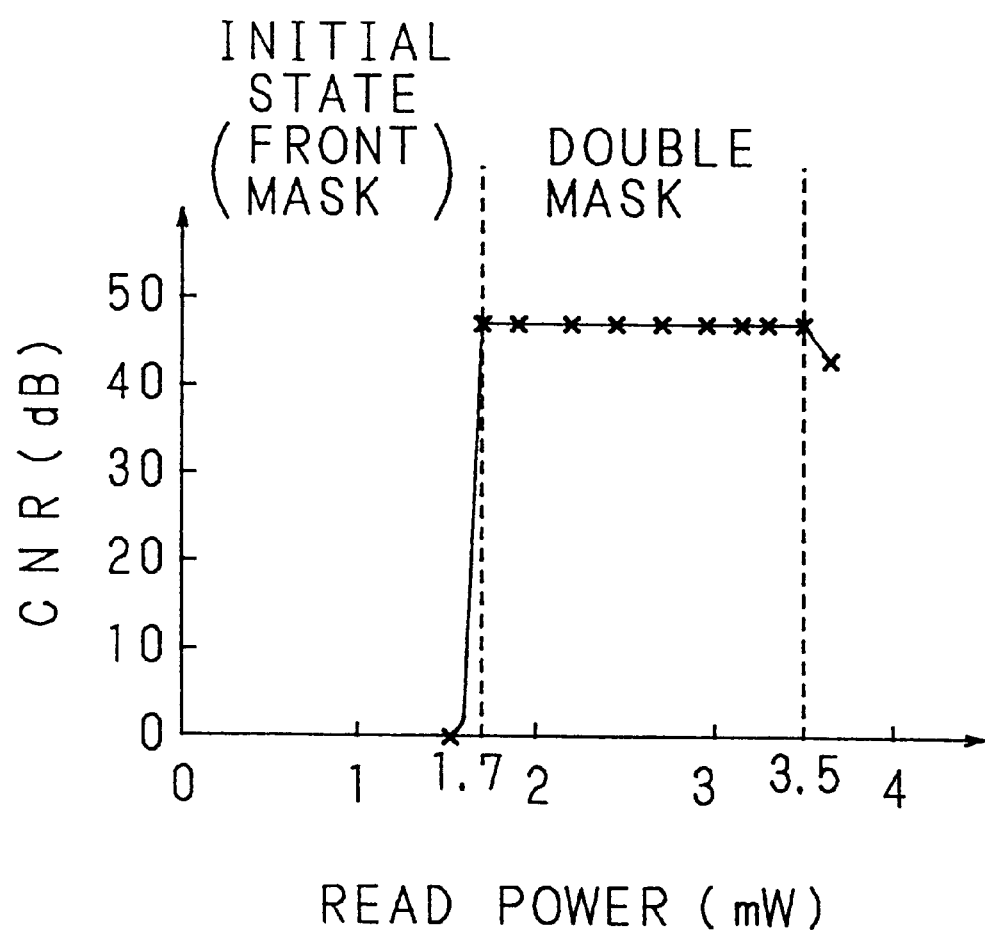
FIG. 31 is a graph showing a playback characteristic of a magneto-optical disk (single-stage double-mask formation)

FIG. 31 is a graph showing its playback characteristics. When the read power was raised to 1.7 mW or higher, a high-output magneto-optical signal corresponding to the information recorded in the third magnetic layer 5 was detected. This was because the transfer region and the rear mask were formed simultaneously, achieving a double mask condition at a relatively low temperature. The high quality condition of the signal was retained up to a read power of 3.5 mW. This means that the optimum read-power range is from 1.7 to 3.5 mW, that is, the width of the optimum range was more than doubled (to 1.8 mW) compared with that of the optimum range (see FIG. 30) achieved for the magneto-optical disk shown in Table 9.

The method for forming the transfer region simultaneously with the rear mask achieves the double mask condition in a single step directly from the front mask state, by lowering the rear mask forming temperature close to the transfer temperature. The rear mask is a mask formed by orienting the magnetization in the first magnetic layer 3 in the direction of the read magnetic field; that is, the exchange coupled force required to transfer the recorded marks in the third magnetic layer 5 to the first magnetic layer 3 through the second magnetic layer 4 is broken off by the read magnetic field. The magnitude of the exchange coupled force depends on the thickness of the second magnetic layer 4, the magnitude decreasing with increasing thickness. As can be seen from the comparison between Table 9 and Table 10, by increasing the thickness of the second magnetic layer 4 (from 30 nm to 50 nm), it becomes possible to break off the exchange coupled force at a lover temperature, allowing a decrease in the rear mask forming temperature and thus achieving the double mask condition at a relatively low temperature.

An MSR magneto-optical disk of a three-layered structure having the film compositions shown in Table 11 was fabricated, and its recording and playback characteristics were measured.

TABLE 11

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $Gd_{32}Fe_{64}Si_4$ | 50 | 170 | — | RE |
| Third Magnetic Layer $Tb_{22}Fe_{63}Co_{15}$ | 50 | 270 | — | TM |

After erasing the entire surface of the magneto-optical disk, a laser beam of 11 mW recording power was applied, along, with a recording magnetic field of 300 Oe, to perform recording at a frequency of 7.73 MHz and a duty ratio of 30%, while rotating the disk at a linear velocity of 6 m/sec. The recorded bit length was 0.39 $\mu$m in the direction of disk rotation. Next, an upward-directed read magnetic field was applied, and playback characteristics were measured. The results showed that the transfer region and the rear mask were simultaneously formed, forming a double mask at once, and a playback signal of high CNR was obtained over a 1.7-mW wide read-power range.

In this example, silicon is added to the second magnetic layer 4 to lower its Curie temperature, thereby reducing the exchange coupled force acting between the first magnetic layer 3 and the third magnetic layer 5 so that the exchange coupled force can be broken off at a lower temperature. As a result, the rear mask forming temperature is lowered close to the transfer temperature, achieving the double mask condition in a single step.

We will now describe in detail conditions for achieving the double mask condition in a single step by simultaneously forming the transfer region and the rear mask on the three-layered MSR medium.

Figure 32:
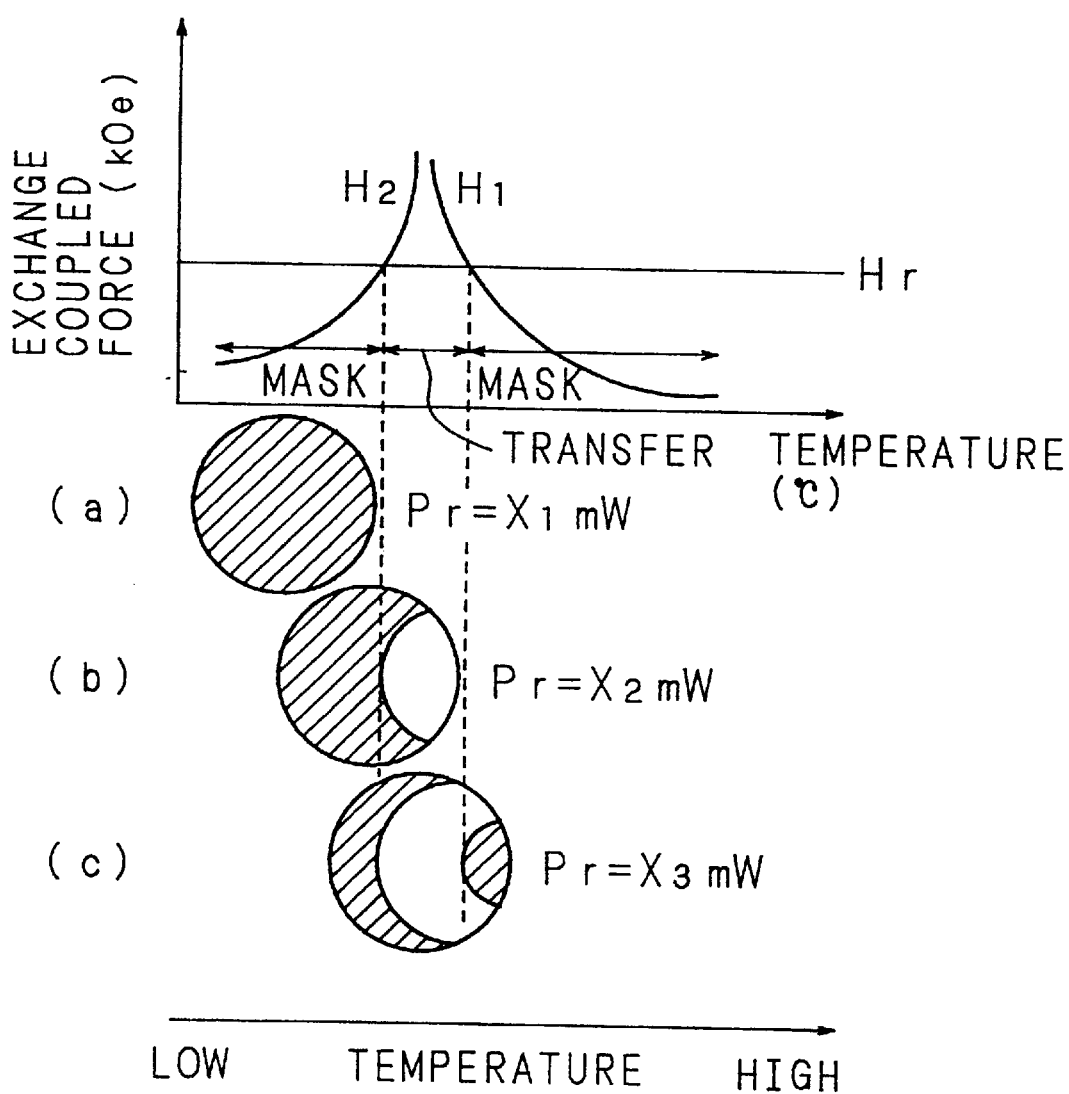
FIG. 32 is a diagram showing a double-mask forming process.

FIG. 32 is a graph showing the temperature dependence of magnetic field H2 for forming a mask (front mask) in the low-temperature region and magnetic field H1 for forming a mask (rear mask) in the high-temperature region. When the magnitude of the fields H1 and H2 is smaller than the applied read field Hr, a mask is formed, and when the field magnitude is larger than the applied read field Hr, a transfer condition is achieved. Shown below the graph are a series of patterns (a), (b), and (c) that illustrate how the masks are formed in the beam spot as the temperature changes.

When read power Pr is X1 mW, in the beam spot there is only a region where Hr>H2, so that the entire region is a low-temperature mask region (front mask) as shown in the pattern (a). When the read power Pr is increased to X2 mW, a transfer region where Hr<H2 appears, as shown in the pattern (b). When the read power Pr is further increased to X3 mW, a region where Hr>H1 appears, as shown in the pattern (c), forming a high-temperature mask region (rear mask) and thus achieving the double mask condition As a result, the CNR increases in two steps as shown in FIG. 30.

To form the double mask in a single step, the pattern (c) must be achieved directly without passing through the state of the pattern (b), by increasing the read power Pr from X1 mW by the smallest possible value. This can be accomplished by making adjustments to reduce-the width of the transfer region. To achieve this, the following changes are made to the conditions shown in FIG. 32.

(1) Decrease H1 to the lower temperature side. Specifically, this can be accomplished by raising saturation magnetization MS1 (reducing the Gd composition ratio) of the first magnetic layer, by increasing the thickness t1 thereof, or by lowering the Curie temperature Tc2 of the second magnetic layer 4.

(2) Decrease H2 to the higher temperature side. Specifically, this can be accomplished by raising saturation magnetization MS2 (increasing the Gd composition ratio) of the second magnetic layer 4, by increasing the thickness t2 thereof, by lowering saturation magnetization MS1 of the first magnetic layer 3, or by reducing the thickness t1 thereof.

(3) Increase read magnetic field Hr.

(4) Change temperature distribution in the beam spot. Specifically, this can be accomplished by increasing the linear velocity, or by reducing the combined thickness of the three magnetic layers.

In the above (1), if MS1 or t1 is increased, H2 will increase at the same time, and the double mask may not be achieved in a single step; however, since the rear mask forming temperature decreases, this has the effect of widening the optimum read-power range. In (2), if MS1 or t1 is reduced, H1 will increase at the same time, increasing the rear mask forming temperature. Therefore, this method is not effective. In (3), by increasing the read field Hr, the double-mask can be formed in a single step, but the read power with which the carrier begins to rise slightly increases.

Figure 33:
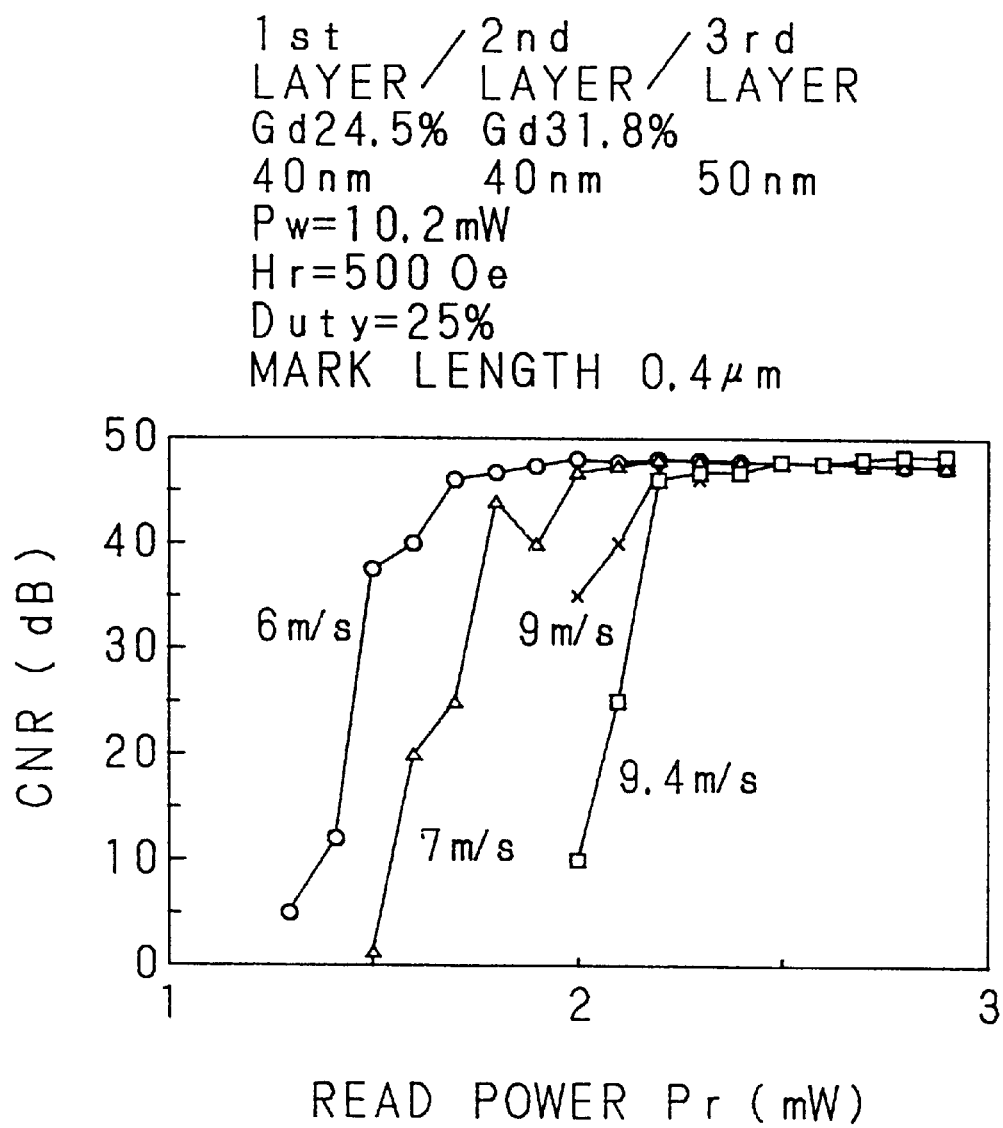
FIG. 33 is a graph showing the dependence of CNR on read power for various values of linear velocity.

Further, in (4), if the linear velocity is increased, the double mask can be formed in a single step, but medium temperature becomes difficult to rise; this increases the read power with which the carrier begins to raise. Furthermore, since the read power when the carrier begins to drop increases, this method is not very effective in widening the optimum read-power range. FIG. 33 is a graph showing the dependence of CNR on read power when the linear velocity is varied. In a medium having a small combined film thickness and hence an increased sensitivity to the read power, the carrier rises at a lower read power.

Based on the above study, the following methods are considered effective to achieve the objective of widening the optimum read-power range.

(A) Increase MS1 or t1.

(B) Increase MS2 or t2

(C) Lower Tc2.

(D) Reduce combined film thickness.

Of these methods, the method of increasing t2 in (B) and the method of lowering Tc in (C) have already been described in connection with the example-shown in Table 10 and the example shown in Table 11, respectively. The following description therefore deals with the method of increasing MS1 in (A), the method of increasing t1 in (A), the method of increasing MS2 in (B), and the method of reducing the combined film thickness in (D).

(Method of increasing MS1)

Figure 34:
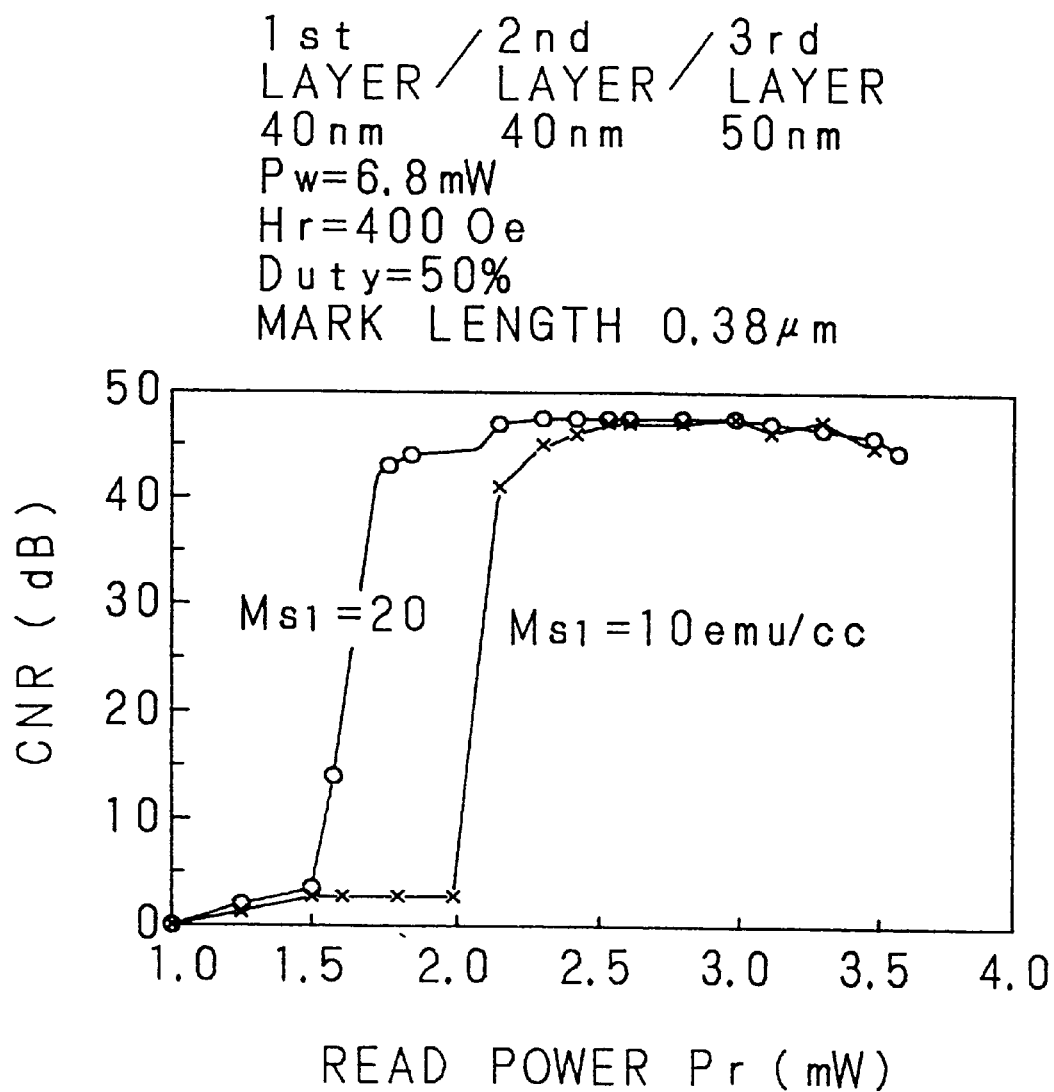
FIG. 34 is a graph showing the dependence of CNR on read power for various values of saturation magnetization of the first magnetic layer (readout layer)

Magneto-optical disks having the film compositions shown in Table 9 were fabricated, with the thicknesses of the first magnetic layer 3, the second magnetic layer 4, and the third magnetic layer 5 set to 40 nm, 40 nm, and 50 nm, respectively, and the CNR was measured by varying the saturation magnetization MS1 of the first magnetic layer 3. The results of the measurements are shown in FIG. 34 In the graph of FIG. 34, '-x-' indicates a sample with MS1=10 emu/cc and '-○-' a sample with MS1=20 emu/cc. The linear velocity was set to 6 m/sec. Other recording and playback conditions are as shown in FIG. 34. When MS1 was increased, the double mask condition was achieved by undergoing a two-stage change, not in a single step. However, since the second-stage carrier rise was shifted to the lower read power side, the optimum read-power range was widened.

(Method of increasing t1)

Figure 35:
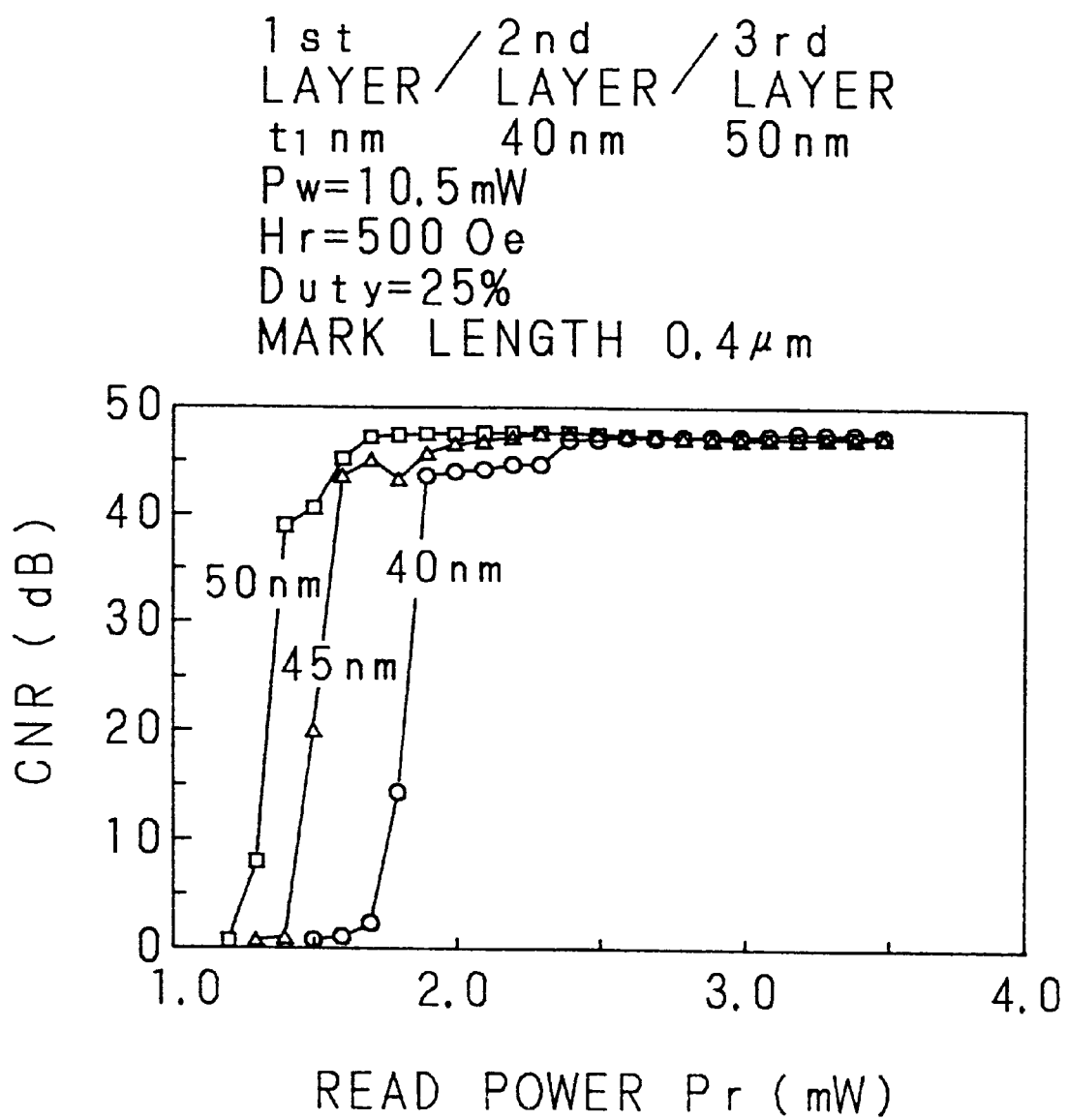
FIG. 35 is a graph showing the dependence of CNR on read power for various values of thickness of the first magnetic layer (readout layer)

Magneto-optical disks having the film compositions shown in Table 9 were fabricated, with the thicknesses of the first magnetic layer 3, the second magnetic layer 4, and the third magnetic layer 5 set to t1 nm, 40 nm, and 50 nm, respectively, and the CNR was measured by varying the thickness t1 of the first magnetic layer 3. The results of the measurements are shown in FIG. 35. In the graph of FIG. 35, '-○-' indicates a sample with t1=40 nm, '-△-' a sample with t1=45 nm, and '-□-' a sample with t1=50 nm. The linear velocity was set to 6 a m/sec. Other recording and playback conditions are as shown in FIG. 35. When the thickness of the first magnetic layer 3 was increased, the carrier rise was shifted to the lower read power side; as a result, a high signal output was obtained quickly and the optimum read-power range was thus widened.

(Method of increasing MS2)

Figure 36:
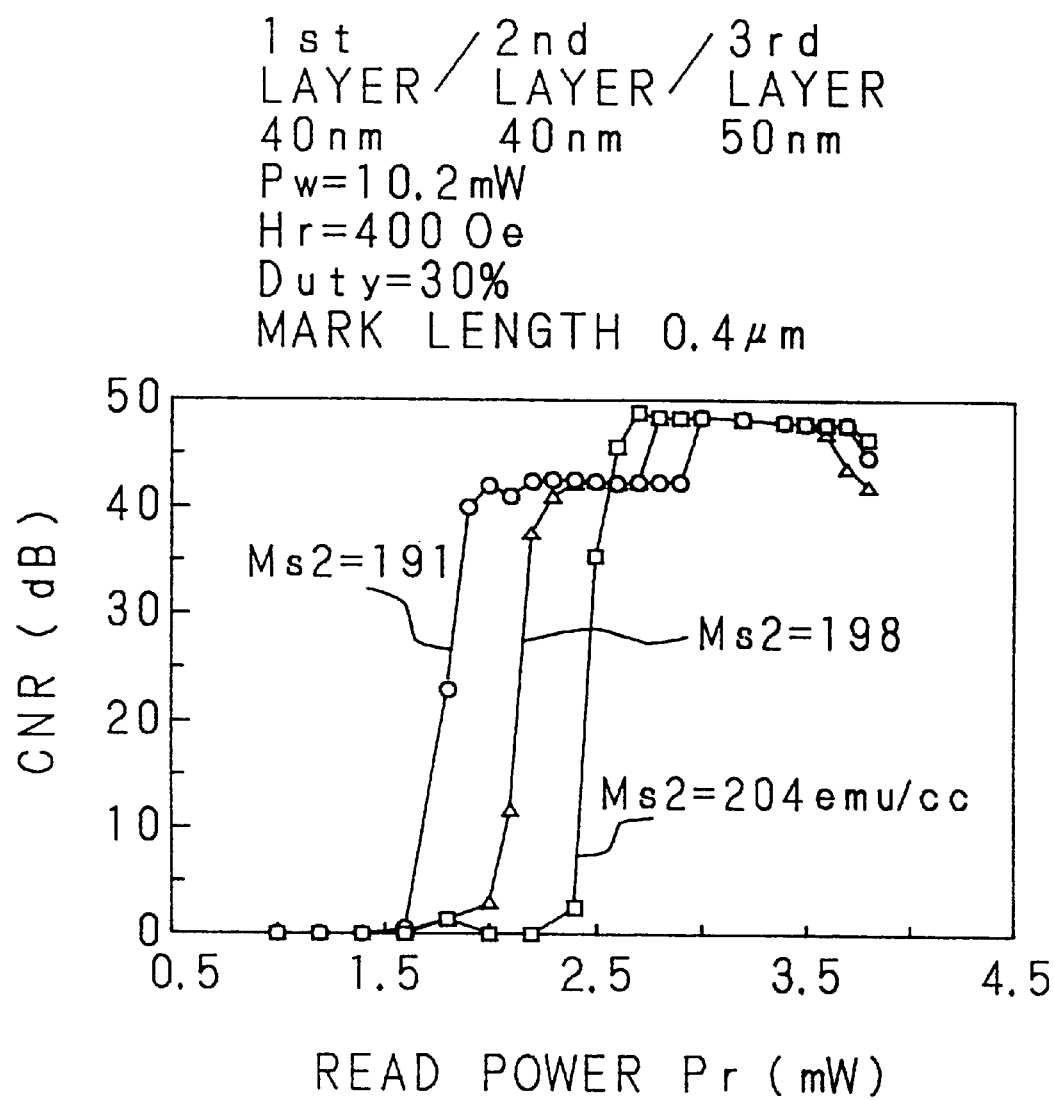
FIG. 36 is a graph showing the dependence of CNR on read power for various values of saturation magnetization of the second magnetic layer (intermediate layer)

Magneto-optical disks having the film compositions shown in Table 9 were fabricated, with the thicknesses of the first magnetic layer 3, the second magnetic layer 4, and the third magnetic layer 5 set to 40 nm, 40 nm, and 50 nm, respectively, and the CNR was measured by varying the saturation magnetization MS2 of the second magnetic layer 4. The results of the measurements are shown in FIG. 36. In the graph of FIG. 36, '-○-' indicates a sample with MS2=191 emu/cc, '-△-' a sample with MS2=198 emu/cc, and '-□-' a sample with MS2=204 emu/cc. The linear velocity was set to 6 m/sec. Other recording and playback conditions are as shown in FIG. 36. As MS2 was increased, the first carrier rise was shifted to the higher read power side, but-the second-stage carrier rise was shifted to the lower read power side; as a result, the double mask condition was achieved in a single step, and the optimum read power-range was widened.

(Method of reducing the combined film thickness)

Figure 37:
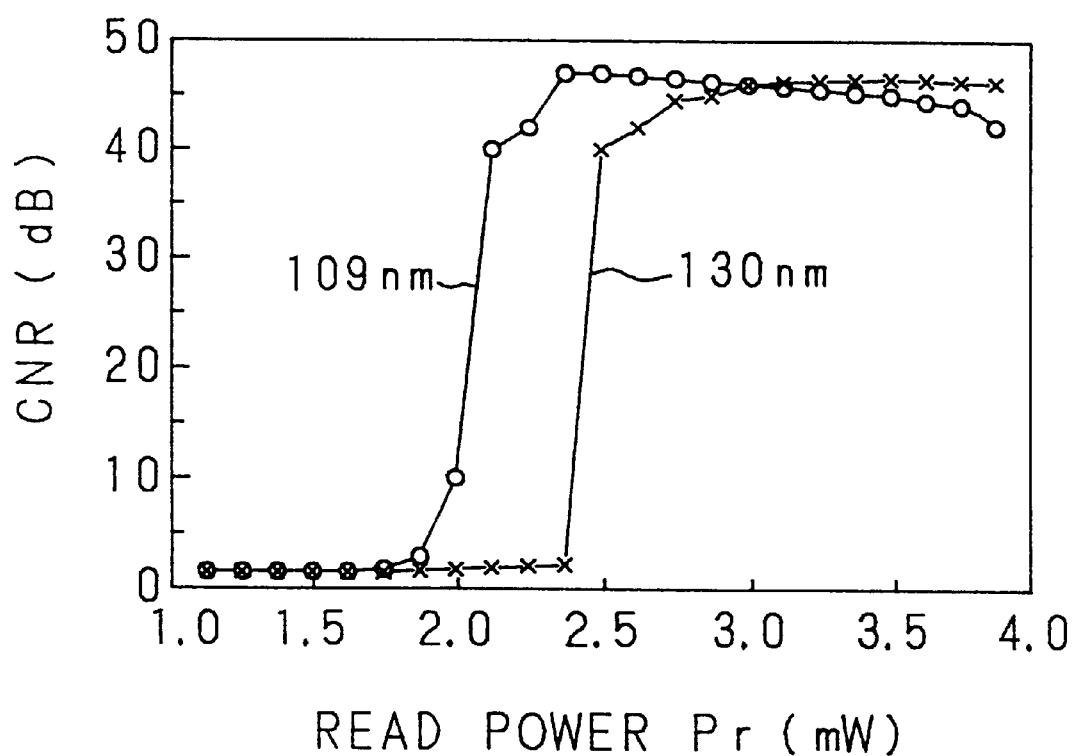
FIG. 37 is a graph showing the dependence of CNR on read power for various values of combined thickness.

Magneto-optical disks having the film compositions shown in Table 9 were fabricated, and the CNR was measured by varying the combined thickness of the first magnetic layer 3, the second magnetic layer 4, and the third magnetic layer 5. The results of the measurements are shown in FIG. 37. In the graph of FIG. 37, '-○-' indicates a sample with a combined film thickness of 109 nm (the thicknesses of the first magnetic layer 3, the second magnetic layer 4, and the third magnetic layer 5 being set to 33 nm, 36 nm, and 40 nm, respectively) and '-x-' indicates a sample with a combined film thickness of 130 m (the thicknesses of the first magnetic layer 3, the second magnetic layer 4, and the third magnetic layer 5 being set to 40 nm, 40 nm, and 50 nm, respectively). The linear velocity was set to 6 m/sec. Other recording and playback conditions are as shown in FIG. 37. As shown, the magneto-optical disk with the smaller combined film thickness achieved a carrier rise at a lower read power, and hence a wider optimum read-power range.

There are various methods of forming a double mask in a single step and widening the optimum read-power range, as described above, but each parameter in these methods is a trade-off with each other parameter; therefore, values for all involved parameters (MS1, t1, MS2, t2, Tc2, Hr, line velocity, combined film thickness) must be judged comprehensively and determined appropriately.

Examples of forming a double mask in a single step on a four-layered magneto-optical disk will be described next. Four-layered MSR magneto-optical disks having the film compositions shown in Table 12 and Table 13, respectively, were fabricated, and their recording and playback characteristics were measured. The measuring conditions are the same as those for the magneto-optical disk shown in Table 9.

TABLE 12

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $(Tb_{19}Fe_{73}Co_8)_{91}Si_9$ | 15 | 180 | — | TM |
| Third Magnetic Layer $Gd_{35}Fe_{35}Co_{30}$ | 20 | 350 | — | RE |
| Fourth Magnetic Layer $Tb_{19}Fe_{73}Co_8$ | 30 | 220 | — | TM |

TABLE 13

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $(Tb_{19}Fe_{73}Co_8)_{89}Si_{11}$ | 15 | 150 | — | TM |
| Third Magnetic Layer $Gd_{35}Fe_{35}Co_{30}$ | 20 | 350 | — | RE |
| Fourth Magnetic Layer $Tb_{19}Fe_{73}Co_8$ | 30 | 220 | — | TM |

In the case of the magneto-optical disk shown in Table 12, at a read power of 2.0 to 2.5 mW the front mask and the transfer region were formed, while, at a read power of 2.6 to 3.2 mW, the front mask, transfer region, and rear mask were formed and a high-output playback signal was obtained. The width of the optimum read-power range in this case is 0.6 mW. On the other hand, in the case of the magneto-optical disk shown in Table 13, at a read power of 1.9 mW the transfer region and the rear mask were simultaneously formed, thus forming a double mask, and a high-output playback signal was obtained. The high-output playback signal was retained up to a read power of 3.2 mW. The width of the optimum read-power range in this case is 1.3 mW.

When the magneto-optical disks shown in Tables 12 and 13 are compared, the proportion of silicon added to the second magnetic layer is higher by 2 percentage point in the magneto-optical disk shown in Table 13, and its Curie temperature is lower by 30° C. Accordingly, in the case of a magneto-optical disk of a four-layered structure, by reducing the Curie temperature of the second magnetic layer, the double mask can be formed in a single step, and at the same time, the optimum read-power range can be widened.

Next, an example of an MSR medium capable of direct overwriting will be described.

Figure 38:
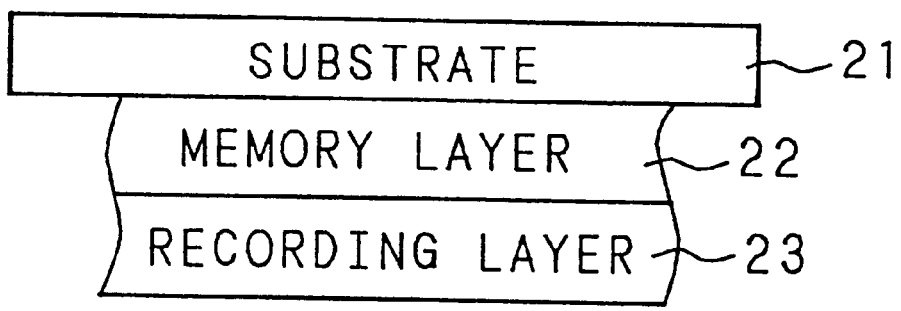
FIG. 38 is a diagram showing the basic structure of an overwritable medium.
Figure 39:
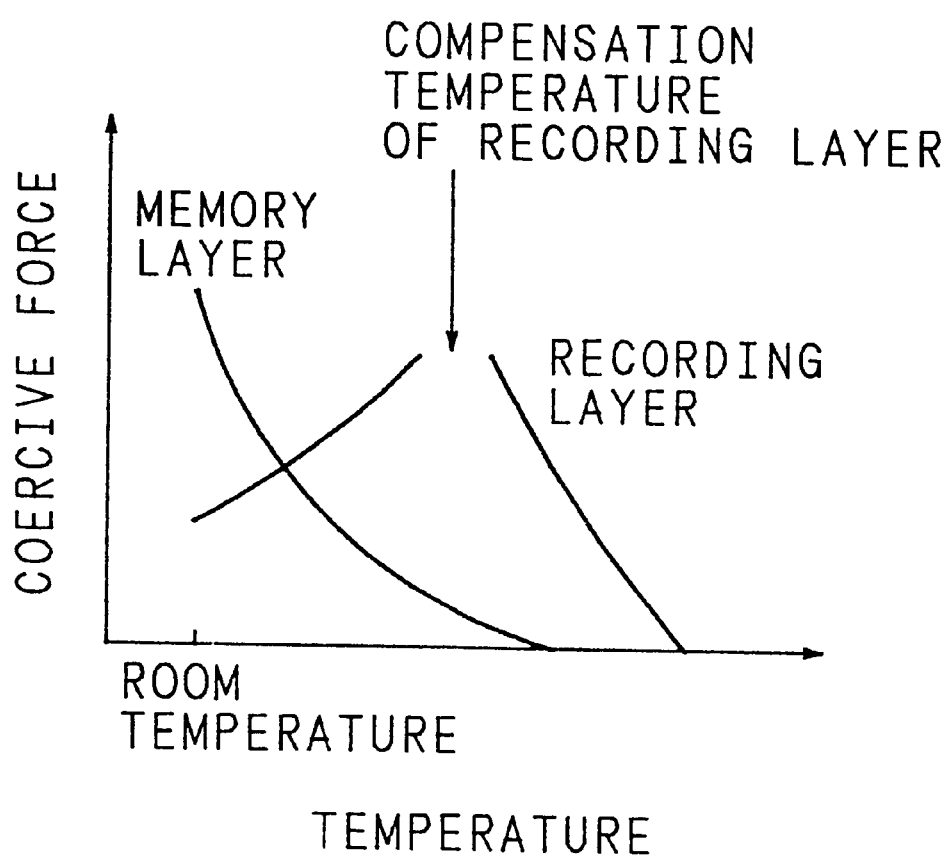
FIG. 39 is a graph showing the magnetic properties of magnetic layers in the overwritable medium.

Direct overwrite is a technique for recording new data over old data by applying a high-power erasing laser beam and a low-power recording laser beam to a magnetic film of multiple layers having different magnetic properties A multilayer magnetic film structure for implementing this direct overwrite technique is shown in FIG. 38. The structure shown in FIG. 38 is an example of a multi-layer magnetic film consisting of a memory layer 22 and a recording layer 23 deposited on a substrate 21. FIG. 39 is a graph showing the magnetic properties of the memory layer 22 and recording layer 23.

The principle in direct overwrite will be described first. FIG. 40 is a diagram showing how magnetization states change during direct overwriting. In FIG. 40, the upper layer is the memory layer 22 and the lower layer is the recording layer 23 Temperature is plotted along the abscissa, where Troom is room temperature, TcompW is the compensation temperature of the recording layer 23, Tcopy is the temperature at which the magnetization direction of the recording layer 23 is transferred to the memory layer 22, Tcg is the Curie temperature of the memory layer 22, and TcW is the Curie temperature of the recording layer 23. Solid arrows indicate an erasing process, and dotted arrows a recording process. In each layer, the hollow arrow indicates the direction of magnetization (total magnetization) in the memory layer 22 or the recording layer 23, and the thin solid arrow indicates the spin direction of transition metal (the direction of transition metal sublattice magnetization). Further, in the graph showing laser power, Pr, PL, and PH are powers for the read process, erasing process, and recording process, respectively.

First, after recording data in the recording layer 23, the recording layer 23 is initialized. Then, overwriting is performed When a laser beam of relatively low power (PL) is applied, the magnetization in the memory layer 22 is aligned with the magnetization in the recording layer 23, erasing data. When a laser beam of relatively high power (PH) is applied, the magnetization in the recording layer 23 is reversed first, and then the magnetization in the memory layer 22 is aligned with the magnetization in the recording layer 23, thus recording data.

This will be described in more detail with reference to FIG. 40. Magnetization near room temperature is determined at either (A) (erasing) or (B) (recording). To perform erasing from the state of (A), a laser beam of erasing power PL is applied to raise the temperature from (A) to (1), (2), and finally to (5), after which the temperature is lowered from (5) to (2), (1), and finally to (A). That is, the erasing process is performed by raising the medium temperature up to the state of (5) with the application of the laser beam of power PL.

To perform recording from the state of (A), first a laser beam of recording power PH is applied to raise the temperature from (A) to (1), (2), (5), and finally to (6) where an upward-directed bias magnetic field is applied; after that the temperature is lowered from (6) to (7), (8), (9), and finally to (10). Further, in the state of (10), an initializing magnetic field is applied to reverse the magnetization in the recording layer 23 alone, as a result of which the state of (B) is achieved, completing the recording process. That is, recording is done by raising the medium temperature up to the state of (6) with the application of the laser beam of power PH.

To perform erasing from the state of (B), a laser beam of erasing power PL is applied to raise the temperature from (B) to (3), (4), and to (5) (heating process), and then the temperature is lowered from (5) to (2), (1), and to (A) (cooling process), to complete the erasing process. On the other hand, to perform recording from the state of (B), a laser beam of recording power PH is applied to raise the temperature from (B) to (3), (4), (5), and to (6) (heating process), and then the temperature is lowered from (6) to (7), (8), (9), and to (10) (cooling process) where an initializing magnetic field is applied to achieve the state of (B), completing the recording process.

We will next describe an example of a magneto-optical recording medium combining such a two-layer medium capable of direct overwriting with a three-layer MSR medium capable of achieving the magnetically-induced super-resolution effect. In the combined structure, the information reading layer (memory layer 22) in the overwritable medium and the information recording layer (third magnetic layer 5) in the MSR medium are formed as the same layer.

An overwritable MSR magneto-optical disk of a four-layered structure having the film compositions shown in Table 14 was fabricated, and its recording and playback characteristics were measured.

TABLE 14

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $Gd_{30}Fe_{70}$ | 30 | 200 | — | RE |
| Third Magnetic Layer $Tb_{19}Fe_{73}Co_8$ | 30 | 220 | — | TM |
| Fourth Magnetic Layer $Dy_{25}Fe_{50}Co_{25}$ | 50 | 260 | 80 | RE |

A laser beam with 680-nm wavelength was used. First, a laser beam of 9 mW erasing power was applied, along with an upward-directed erasing magnetic field of 500 Oe, to erase the entire surface of the magneto-optical disk. Next, while rotating the magneto-optical disk at a linear velocity of 9 m/sec., a laser beam of 10 mW recording power was applied, along with a downward-directed recording magnetic field of 300 Oe, to perform recording at a frequency of 11.3 MHz and a duty ratio of 26%. The recorded bit length was approximately 0.4 µm in the direction of disk rotation.

Next, an upward-directed read bias field was applied, and playback characteristics were measured. For an overwrite experiment to be conducted later, an initializing field of 4 kOe was applied to the magneto-optical disk to orient the magnetization in the fourth magnetic layer (recording layer) in one direction.

Figure 41:
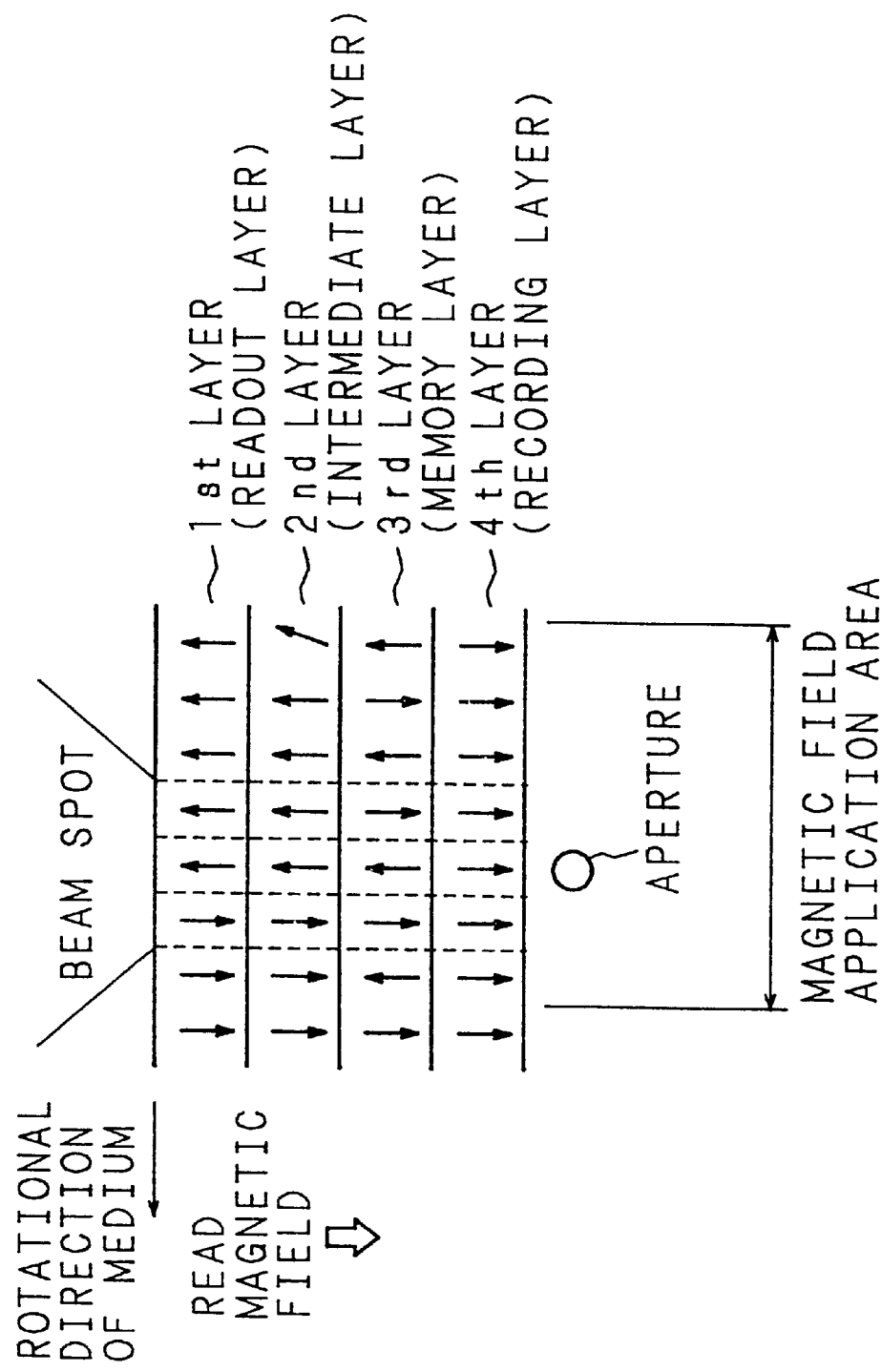
FIG. 41 is a diagram showing magnetization directions during the reading of an overwritable MRS medium.

At a read power of 1.5 mW, a magneto-optical signal corresponding to the information recorded in the third magnetic layer (memory layer) could not be detected. This was due to the front mask formed in the entire region of the first magnetic layer (readout layer) within the beam spot, preventing the exchange coupling between the second magnetic layer (intermediate layer) and the third magnetic layer. At a read power of 1.6 mW, the direction of the magnetization in the third magnetic layer was transferred to the first magnetic layer through the second magnetic layer, and a magneto-optical signal was obtained. This was because of the formation within the beam spot of a region where the temperature was high enough to allow the magnetization direction of the third magnetic layer to be transferred to the second magnetic layer. At a read power of 2.4 mW, a rear mask was formed in the high-temperature region, achieving a double mask condition. FIG. 41 shows the directions of transition metal sublattice magnetizations in each magnetic layer when the super-resolution readout was achieved. When the read power was raised up to 3.2 mW or higher, the recorded marks began to deform due to heat, and noise increased.

Since the magnetically-induced super-resolution effect was confirmed as described above, an experiment on overwrite operations was conducted With an erasing power at 5 mW and recording power at 8 mW, a signal of 1 MHz was recorded, after which a signal of 11.3 MHz was recorded using the same power levels. The result showed that direct overwrite was possible and magnetically-induced super-resolution readout was also possible.

Figure 42:
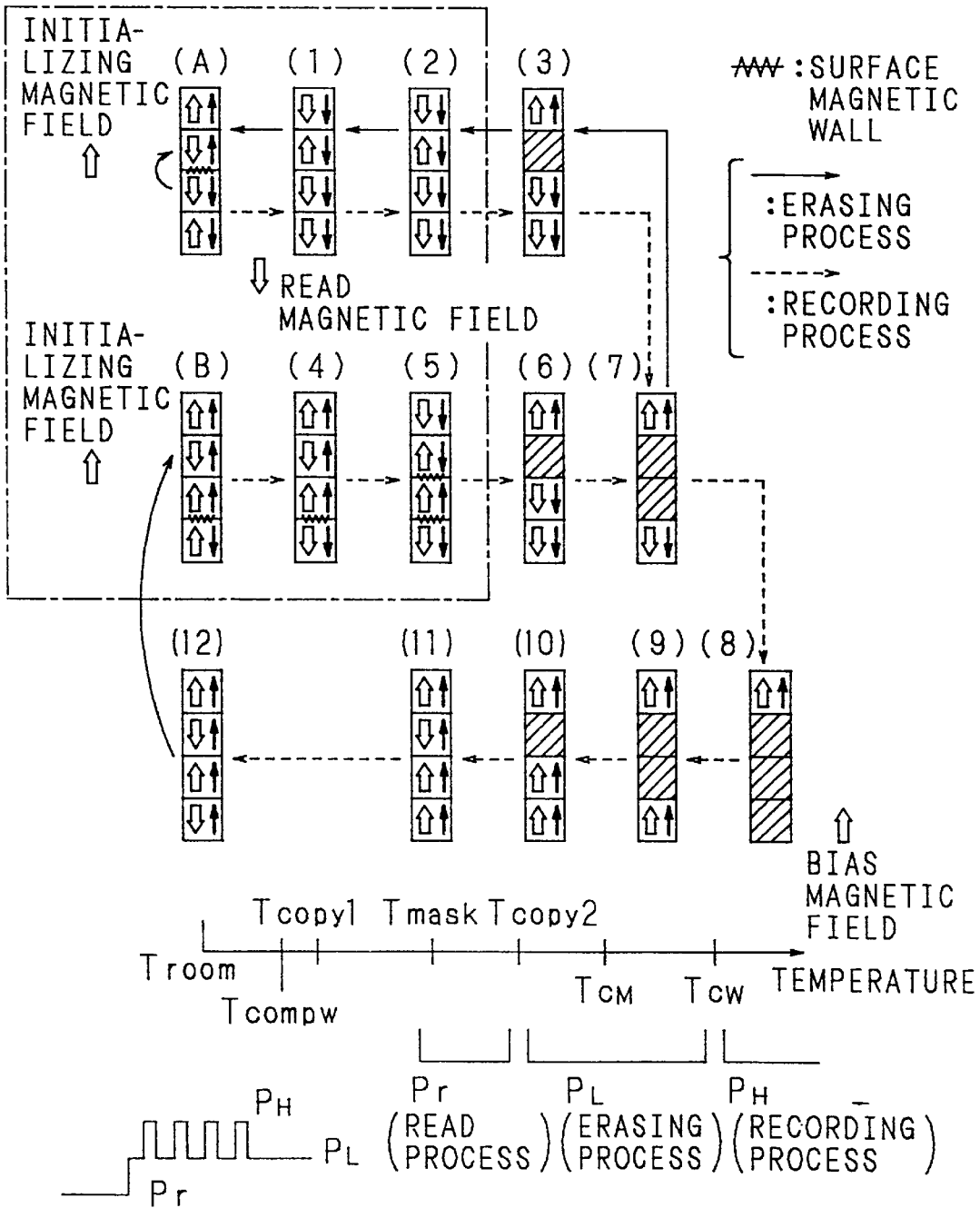
FIG. 42 is a diagram showing how magnetization states change in the overwritable MSR medium.

FIG. 42 is a diagram illustrating how magnetization states change in the four-layer, overwritable MSR magneto-optical disk during read and direct overwrite operations. In FIG. 42, from the top to the bottom of each column are shown the first magnetic layer (readout layer), the second magnetic layer (intermediate layer), the third magnetic layer (memory layer), and the fourth magnetic layer (recording layer). Temperature is plotted along the abscissa, where Troom is room temperature, TcompW is the compensation temperature of the recording layer 23, Tcopy1 is the temperature at which the magnetization direction of the memory layer is transferred to the readout layer, Tmask is the temperature at which the rear mask is formed, Tcopy2 is the temperature at which the magnetization direction of the recording layer is transferred to the memory layer, TcM is the Curie temperature of the memory layer, and TcW is the Curie temperature of the recording layer. Solid arrows indicate an erasing process, and dotted arrows a recording process. In each layer, the hollow arrow indicates the direction of magnetization (total magnetization) in the memory layer 22 or the recording layer 23, and the thin solid arrow indicates the spin direction of transition metal (the direction of transition metal sublattice magnetization). Further, in the graph showing laser power, Pr, PL, and PH are powers for the read process, erasing process, and recording process, respectively.

Magnetization near room temperature is determined at either (A) (erasing) or (B) (recording). The MSR (magnetically-induced super-resolution) process is carried out within the block enclosed by the semi-dashed lines in FIG. 42. In the MSR process, transfer from the third magnetic layer to the first magnetic layer is performed in a temperature region where the state (1) or (4) is achieved. In a temperature region where the state (2) or (5) is achieved, the magnetization in the first magnetic layer is oriented in the direction of the read magnetic field and the rear mask is formed. In (A) and (B), an-initializing magnetic field is applied and the front mask is formed. That is, when a laser beam of read power Pr is applied, three temperature regions are formed within the beam spot; the temperature region where the state (1) or (4) is achieved acts as a transfer region (an aperture), allowing the magnetization in the third magnetic field to be transferred to the first magnetic field and thus achieving readout of recorded information.

The overwrite process is the same as that shown in FIG. 40. That is, to perform erasing from the state of (A), a laser beam of erasing power PL is applied, causing the temperature to change from (A) to ((1) to (2)), (3), (7), (3), and back to (A). To perform recording from the state of (A), a laser beam of recording power PH is applied, causing the temperature to change from (A) to (3), (7), (8), (9), (10), (11), (12), and to (B). To perform erasing from the state of (B), a laser beam of erasing power PL is applied, causing the temperature to change from (B) to ((4) to (5)), (6), (7), (3), and back to (B). To perform recording from the state of (B), a laser beam of recording power PH is applied, causing the temperature to change from (B) to (6), (7), (8), (9), (10), (11), (12), and back to (B).

The overwritable medium of the two-layered structure shown in FIG. 38 requires the provision of an initializing magnet for aligning the magnetization in the recording layer. There is, on the other hand, an overwritable medium of a four-layered structure that does not require the provision of an initializing magnet. This medium has a structure in which four magnetic layers are formed one on top of another on a substrate in the order of a memory layer, a recording layer, a switch layer, and an initializing layer. This medium does not required the provision of an initializing magnet since the magnetization in the recording layer is aligned by exchange coupled force from the initializing layer.

We will next describe an example of a magneto-optical recording medium combining such a four-layer, overwritable medium, which does not require an initializing magnet, with a three-layer MRS medium capable of achieving the magnetically-induced super-resolution effect. In the combined structure, the information readout layer (memory layer) in the overwritable medium and the information recording layer (third magnetic layer 5) in the MSR medium are formed as the same layer.

An overwritable MSR magneto-optical disk of a six-layered structure having the film compositions shown in Table 15 was fabricated, and its recording and playback characteristics were measured. The recording and playback conditions used are the same as those for the magneto-optical disk shown in Table 14, except that the applied read bias field was 400 Oe.

TABLE 15

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $Gd_{30}Fe_{70}$ | 50 | 200 | — | RE |
| Third Magnetic Layer $Tb_{19}Fe_{73}Co_8$ | 30 | 220 | — | TM |
| Fourth Magnetic Layer $Dy_{25}Fe_{50}Co_{25}$ | 50 | 260 | 80 | RE |
| Fifth Magnetic Layer $Tb_{21}Fe_{79}$ | 15 | 170 | — | TM |
| Sixth Magnetic Layer $Tb_{22}Fe_{50}Co_{28}$ | 30 | 300 | — | TM |

Figure 43:
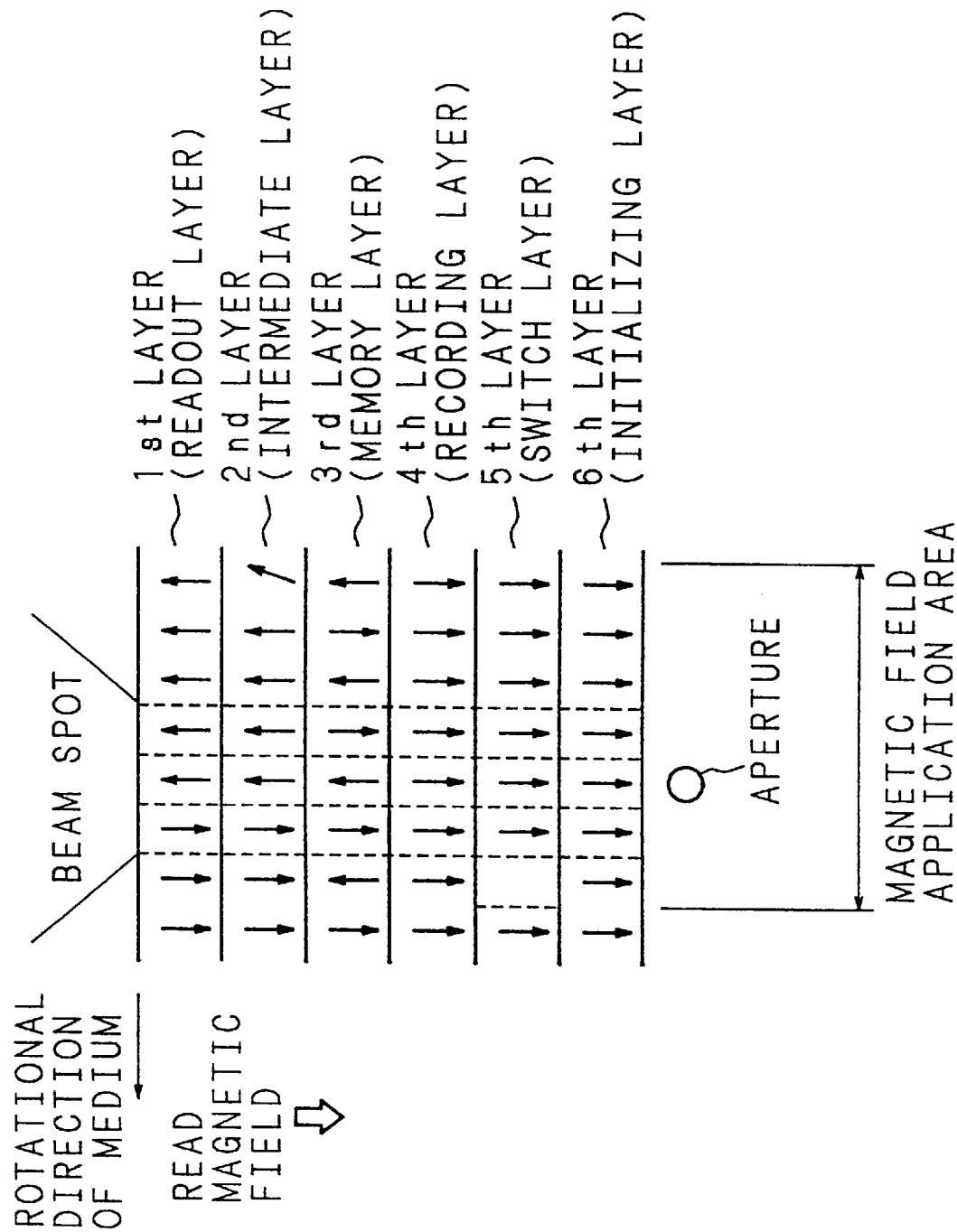
FIG. 43 is a diagram showing magnetization directions during the reading of another overwritable MRS medium.

An experiment on read operations was conducted, and the result showed that, with this magneto-optical disk also, the magnetically-induced super-resolution effect was achieved. FIG. 43 shows the directions of transition metal sublattice magnetizations in each layer when the super-resolution playback condition was achieved. Next, an experiment on overwrite operations was conducted. With an erasing power at 5.5 mW and recording power at 9.5 mW, a signal of 1 MHz was recorded, after which a signal of 11.3 MHz was recorded using the same power levels. As a result, the previously recorded signal of 1 MHz was erased, and only the signal of 11.3 MHz was observed The experiment thus proved that, with the magneto-optical disk shown in Table 15, direct overwrite was possible and magnetically-induced super-resolution readout was also possible, as with the magneto-optical disk shown in Table 14.

Figure 44:
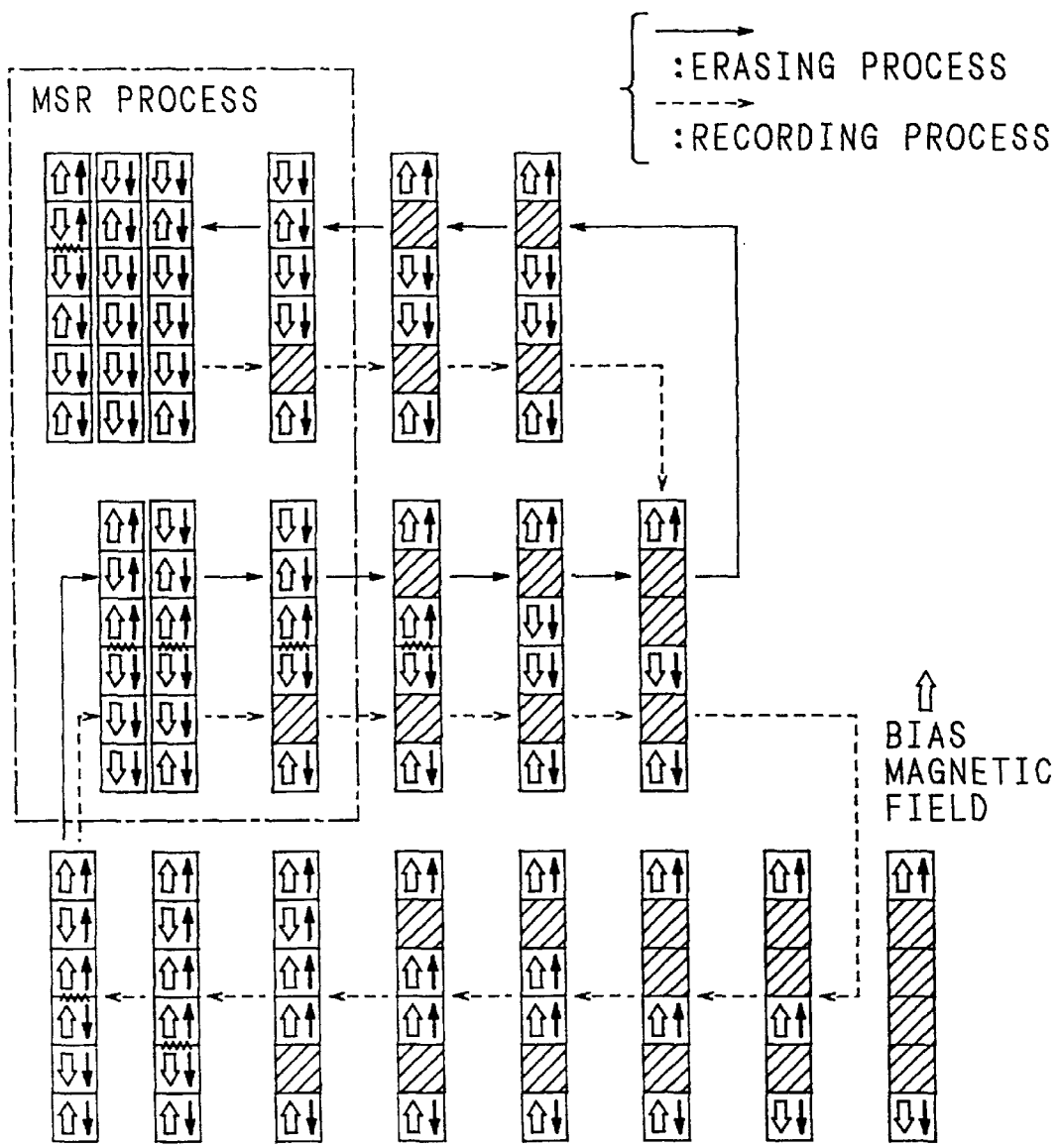
FIG. 44 is a diagram showing how magnetization states change in that other overwritable MSR medium.

FIG. 44 is a diagram illustrating how magnetization states change in the six-layer, overwritable MSR magneto-optical disk during read and direct overwrite operations. In FIG. 44, from the top to the bottom of each column are shown the first magnetic layer (readout layer), the second magnetic layer (intermediate layer), the third magnetic layer (memory layer), the fourth magnetic layer (recording layer), the fifth magnetic layer (switch layer), and the sixth magnetic layer (initializing layer).

The MSR process is carried out within the block enclosed by the semi-dashed lines in FIG. 44. The MSR process and the direct overwrite process are the same as those for the four-layer disk shown in FIG. 42, and explanation of these processes will not be repeated here. It should, however, be noted that the application of the initializing field is not needed since the initialization of the fourth magnetic layer is achieved by the exchange coupling between the fifth magnetic layer and the sixth magnetic layer. The magnetization in the sixth magnetic layer remains unchanged throughout the full temperature range. Further, the fifth magnetic layer has the lowest Curie temperature of all the magnetic layers used. Therefore, in the temperature range during the execution of the MSR process, there always exists at least one region where the temperature is higher than the Curie temperature of the fifth magnetic layer.

With this six-layer magneto-optical disk, since an overwritable medium that does not require an initializing magnet is combined with an MSR medium, a high signal quality can be obtained after overwriting due to the magnetically-induced super-resolution effect, without using an initializing magnet.

Another example of a magneto-optical recording medium combining a two-layer, overwritable medium with a three-layer MRS medium will be described below. An overwritable MSR magneto-optical disk of a five-layered structure having the. film compositions shown in Table 16 was fabricated. The structure shown in Table 16 is different from the structure shown in Table 14, in that a fifth magnetic layer (adjusting layer) for adjusting the exchange coupled force is inserted between the third magnetic layer (memory layer) and the fourth magnetic layer (recording layer).

TABLE 16

| Composition | Film Thickness (nm) | Curie Temperature (°C.) | Compensation Temperature (°C.) | Dominant |
|---|---|---|---|---|
| First Magnetic Layer $Gd_{24}Fe_{63}Co_{13}$ | 40 | 320 | — | TM |
| Second Magnetic Layer $Gd_{30}Fe_{70}$ | 30 | 200 | — | RE |
| Third Magnetic Layer $Tb_{19}Fe_{73}Co_8$ | 30 | 220 | — | TM |
| Fifth Magnetic Layer $Gd_{30}Fe_{65}Co_5$ | 20 | 280 (in-plane) | — | RE |
| Fourth Magnetic Layer $Dy_{25}Fe_{50}Co_{25}$ | 50 | 260 | 80 | RE |

The recording and playback characteristics of the fabricated magneto-optical disk were measured. A laser beam with 680-nm wavelength was used. First, a laser beam-of 9.5 mW erasing power was applied, along with an upward-directed erasing magnetic field of 500 Oe, to erase the entire surface of the magneto-optical disk. Next, while rotating the magneto-optical disk at a linear velocity of 9 m/sec., a laser beam of 10.5 mW recording power was applied, along with a downward-directed recording magnetic field of 300 Oe, to perform recording at a frequency of 11.3 MHz and a duty ratio of 26%. The recorded bit length was approximately 0.4 μm in the direction of disk rotation.

Next, an upward-directed read bias field was applied, and playback characteristics were measured. An initializing field of 3 kOe was applied to the magneto-optical disk to orient the magnetization in the fourth magnetic layer (recording layer) in one direction.

At a read power of 1.7 mW, a magneto-optical signal corresponding to the information recorded in the third magnetic layer (memory layer) could not be detected. At a read power of 1.8 mW, a transfer region was formed and a magneto-optical signal was obtained. At a read power of 2.5 mW, a rear mask was formed, achieving a double mask condition. When the read power was raised up to 3.7 mW or higher, noise increased. In this way, it was confirmed that magnetically-induced super-resolution readout was possible.

Next, an experiment on overwrite operations was conducted. With an erasing power at 6 mW and recording power at 9 mW, a signal of 1 MHz was recorded, after which a signal of 11.3 MHz was recorded using the same power levels. The result showed that direct overwrite was possible and magnetically-induced super-resolution readout was also possible.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magneto-optical recording medium comprising:
   a first magnetic layer which is formed from a rare-earth/transition-metal alloy;
   a second magnetic layer which is formed from a rare-earth/transition-metal alloy and whose magnetic property is rare-earth magnetization dominant; and
   a third magnetic layer which is formed from a rare-earth/transition-metal alloy,
   wherein an exchange coupled force between said first magnetic layer and said second magnetic layer decreases with increasing temperature, while an exchange coupled force between said second magnetic layer and said third magnetic layer increases with increasing temperature.

2. A magneto-optical recording medium according to claim 1, wherein said first magnetic-layer, said second magnetic layer, and said third magnetic layer are substantially equal in thickness.

3. A magneto-optical recording medium according to claim 1, wherein the magnetic property of said first magnetic layer is transition-metal magnetization dominant.

4. A magneto-optical recording medium, comprising:
   a first magnetic layer formed from a GdFeCo film;
   a second magnetic layer formed a GdFe film and whose magnetic property is rare-earth magnetization dominant; and
   a third magnetic layer formed from a rare-earth/transition-metal alloy.

5. A magneto-optical recording medium according to claim 4 wherein said first magnetic layer has a Gd composition ratio within ±2 atomic % of a compensation composition ratio.

6. A magneto-optical recording medium according to claim 4, wherein said second magnetic layer has a Gd composition ration ranging from 29 to 35 atomic %.

7. A magneto-optical recording medium according to claim 4, wherein said first magnetic layer and said second magnetic layer each have a thickness ranging from 25 to 60 nm.

8. A method of reading information recorded in a multi-layered magneto-optical recording medium including a first magnetic layer formed from a GdFeCo film, a second magnetic layer formed from a GdFe film and whose magnetic property is rare-earth magnetization dominant, and the third magnetic layer formed from rare-earth/transition-metal alloy, comprising the steps of:
   applying a reading light beam to the magneto-optical recording medium, along with an external magnetic field; and
   from a state in which the magnetization in said first magnetic layer is oriented in a first specific direction, simultaneously forming within a focused spot of the reading light beam a region where the magnetization in said first magnetic layer is oriented in the direction of magnetization in said third magnetic layer, and a region where the magnetization in said first magnetic layer is oriented in a second specific direction;
   wherein the first specific direction is opposite to the direction of the external magnetic field, and the second specific direction is the same as the direction of the external magnetic field.

9. A method of reading the magneto-optical recording medium according to claim 8, wherein the region where the magnetization in said first magnetic layer is oriented in the direction of magnetization in said third magnetic layer, and the region where the magnetization in said first magnetic layer is oriented in the second specific direction, are simultaneously formed by adjusting at least one parameter selected from a group of parameters consisting of saturation magnetization or film thickness of said first magnetic layer, saturation magnetization, film thickness, or Curie temperature of said second magnetic layer, combined film thickness of said first, second, and third magnetic layers, the applied read magnetic field, and linear velocity of the magneto-optical recording medium.

* * * * *